United States Patent
Bonderson et al.

(10) Patent No.: US 12,387,128 B2
(45) Date of Patent: Aug. 12, 2025

(54) REDUCTION OF QUBIT LATTICE THAT INCLUDES DEAD DATA QUBITS AND AUXILIARY QUBITS

(71) Applicant: Microsoft Technology Licensing, LLC, Redmond, WA (US)

(72) Inventors: Parsa Bonderson, Santa Barbara, CA (US); David Alexander Aasen, Santa Barbara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 127 days.

(21) Appl. No.: 18/485,261

(22) Filed: Oct. 11, 2023

(65) Prior Publication Data

US 2025/0124326 A1   Apr. 17, 2025

(51) Int. Cl.
*G06N 10/20* (2022.01)
*G06N 10/70* (2022.01)

(52) U.S. Cl.
CPC ............. *G06N 10/70* (2022.01); *G06N 10/20* (2022.01)

(58) Field of Classification Search
None
See application file for complete search history.

(56) References Cited

U.S. PATENT DOCUMENTS

| 12,271,714 | B2 * | 4/2025 | Litinski | G06F 13/4022 |
| 2017/0300817 | A1 * | 10/2017 | King | G06N 20/00 |
| 2019/0102690 | A1 * | 4/2019 | Bishop | G06N 10/70 |
| 2019/0378032 | A1 * | 12/2019 | Kliuchnikov | G06F 30/392 |
| 2022/0084085 | A1 * | 3/2022 | Rigetti | H04M 15/8214 |
| 2023/0244459 | A1 * | 8/2023 | Zou | G06F 8/41 717/140 |
| 2024/0193451 | A1 * | 6/2024 | Matsuura | G06N 10/20 |
| 2024/0403689 | A1 * | 12/2024 | Shutty | G06N 10/70 |

OTHER PUBLICATIONS

Auger, et al., "Fault-Tolerance Thresholds for the Surface Code with Fabrication Errors", In Repository of arXiv:1706.04912v1, Jun. 15, 2017, pp. 1-10.
Gidney, Craig, "A Pair Measurement Surface Code on Pentagons", In Repository of arXiv:2206.12780v1, Jun. 26, 2022, pp. 1-16.
Stace, et al., "Thresholds for Topological Codes in the Presence of Loss", In Repository of arXiv:0904.3556v1, Apr. 22, 2009, pp. 1-4.

* cited by examiner

*Primary Examiner* — Mujtaba M Chaudry
(74) *Attorney, Agent, or Firm* — Alleman Hall & Tuttle LLP

(57) ABSTRACT

A computing system including a processor configured to receive an indication of one or more dead data qubits and one or more dead auxiliary qubits among qubits included in a quantum computing device. The qubits are arranged in a lattice that includes plaquettes. Each of the plaquettes includes data qubits and auxiliary qubits. The processor is further configured to compute a reduced lattice by, for each of the plaquettes that includes at least one dead data qubit, computing a respective first reduced plaquette that omits the dead data qubit. For each of the plaquettes that includes at least one dead auxiliary qubit, the processor is further configured to compute the reduced lattice at least in part by computing a respective second reduced plaquette that omits the dead auxiliary qubit. The processor is further configured to output instructions to implement an error correction code on the reduced lattice.

20 Claims, 55 Drawing Sheets

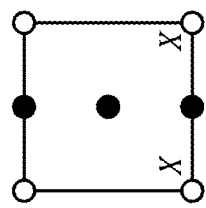
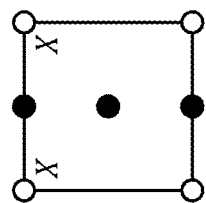
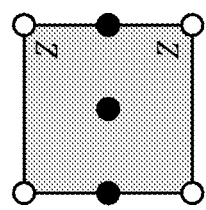
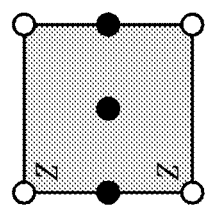
FIG. 16

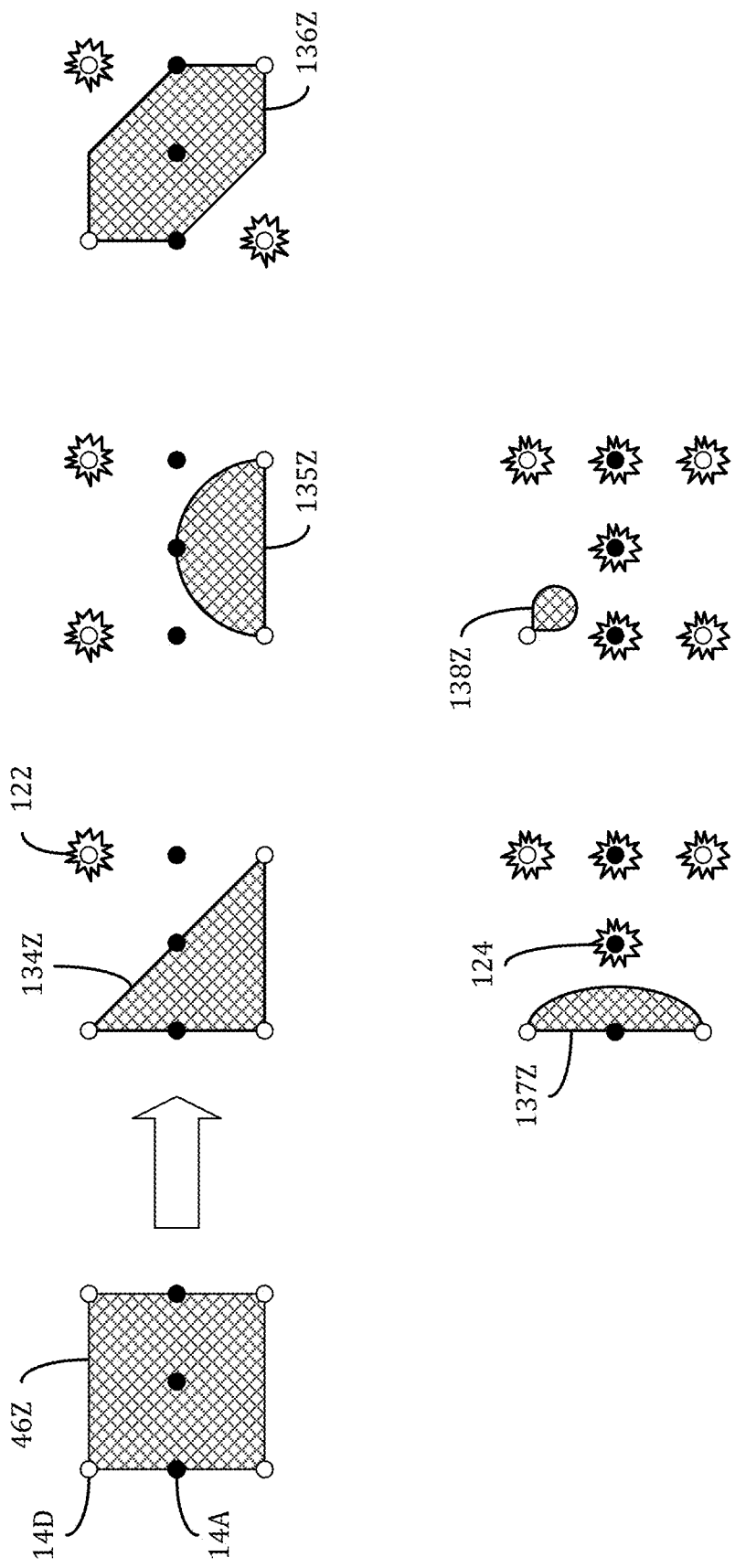

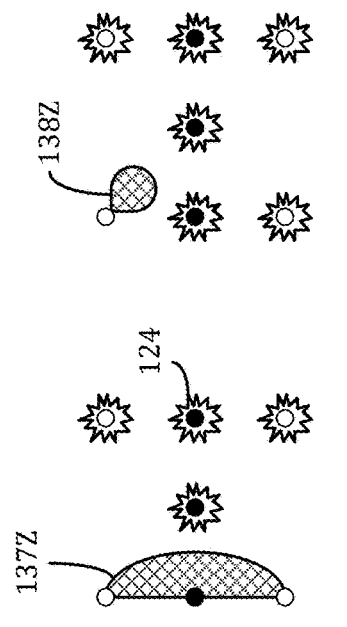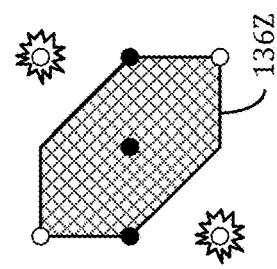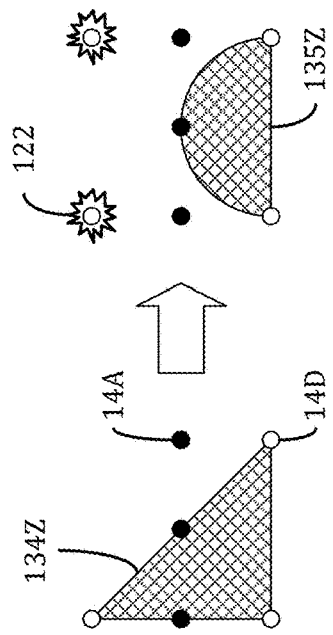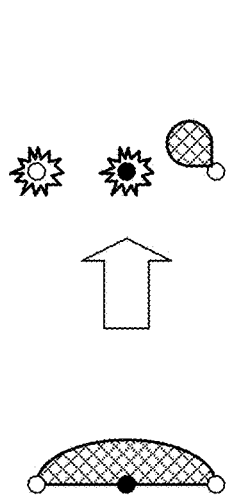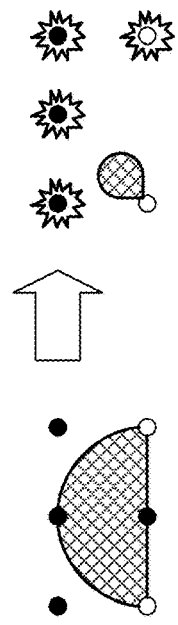
FIG. 33B

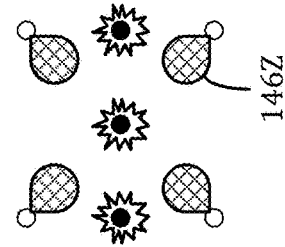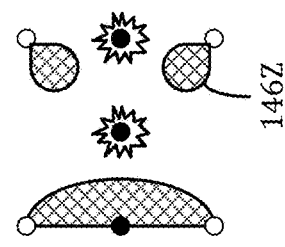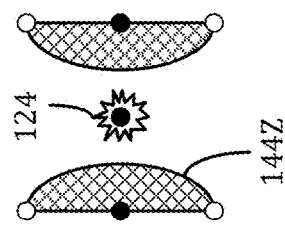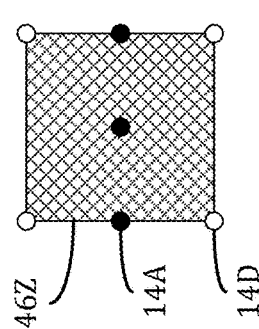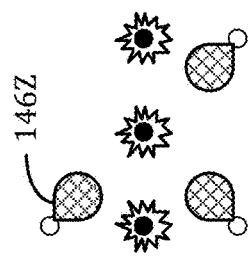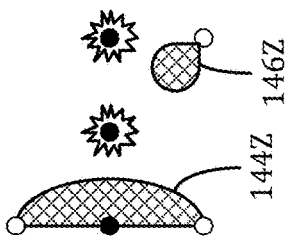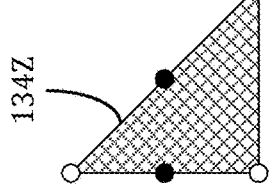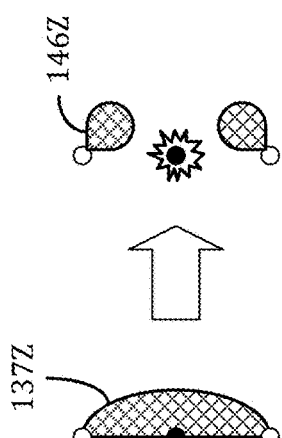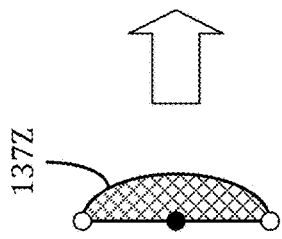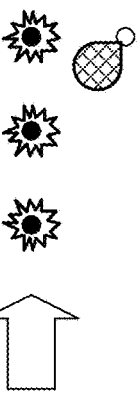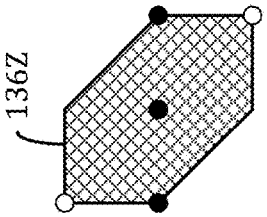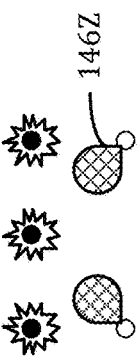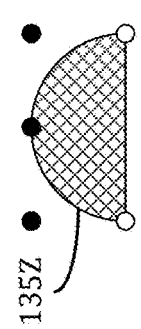
FIG. 33C

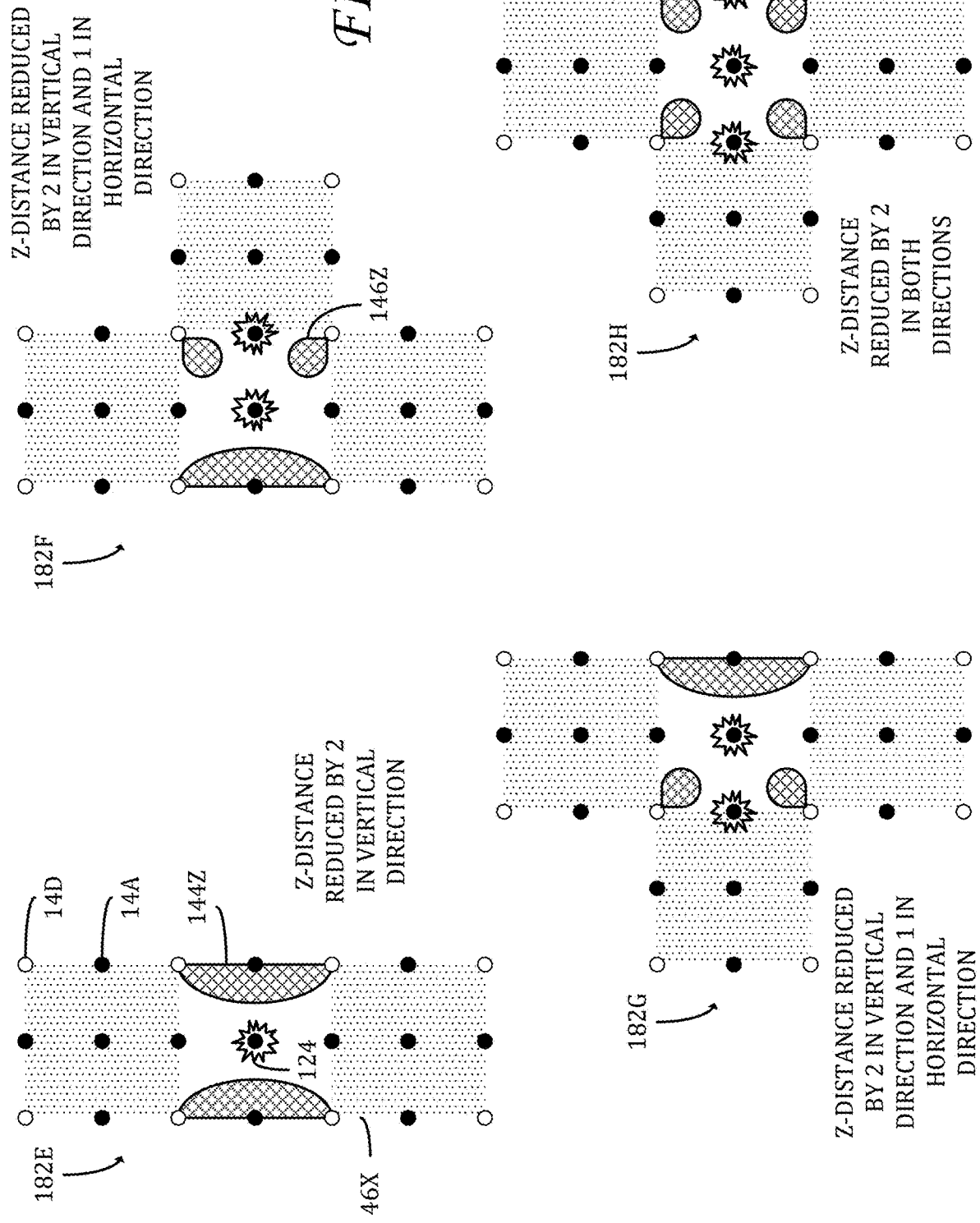

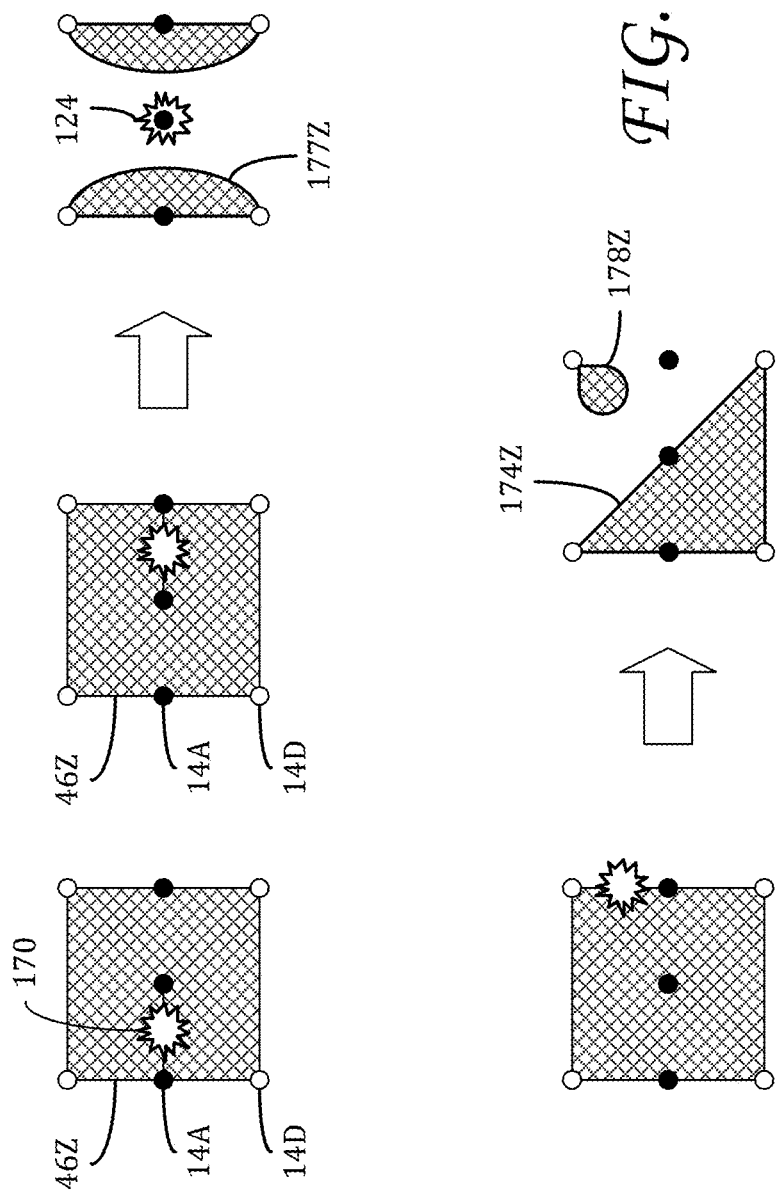

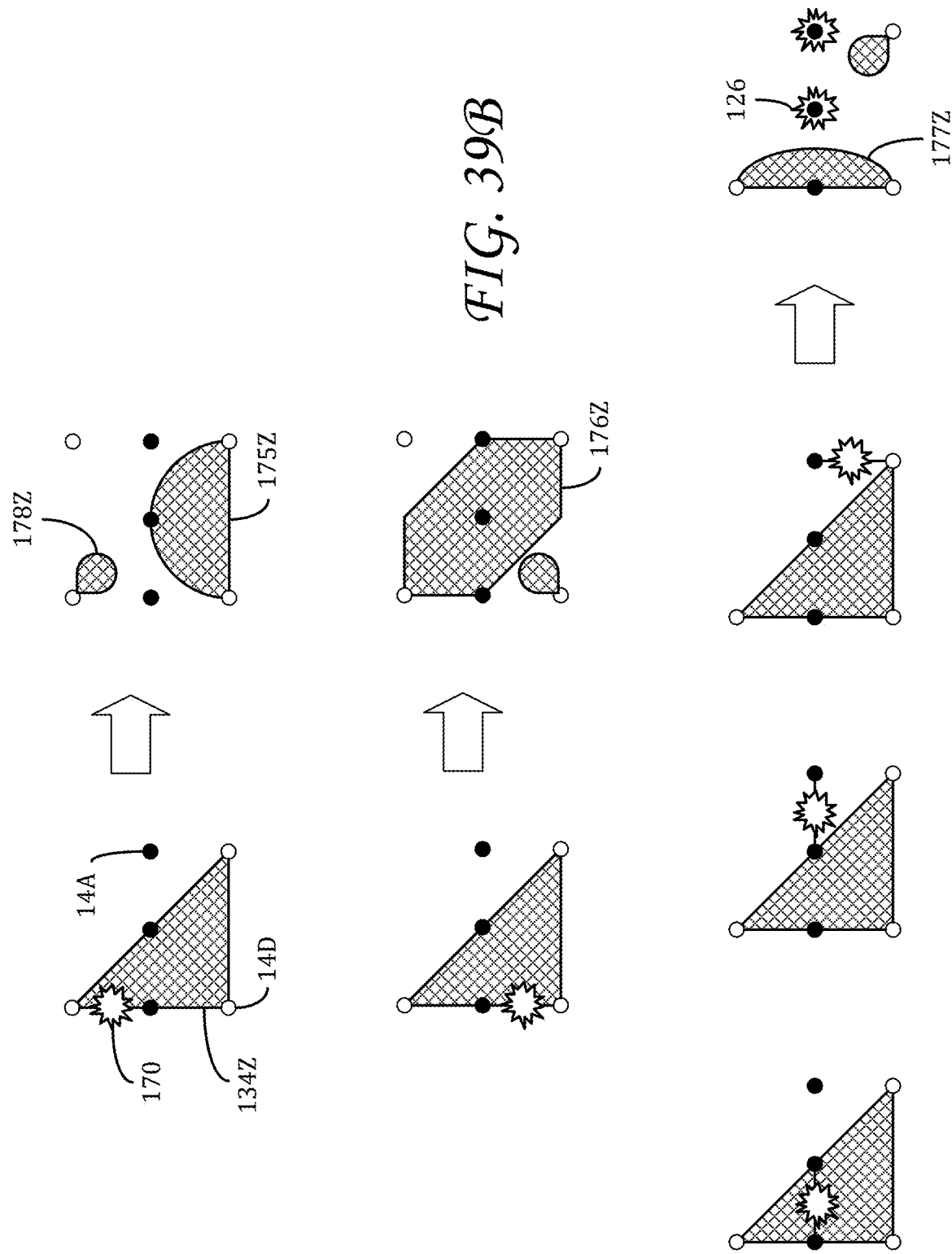

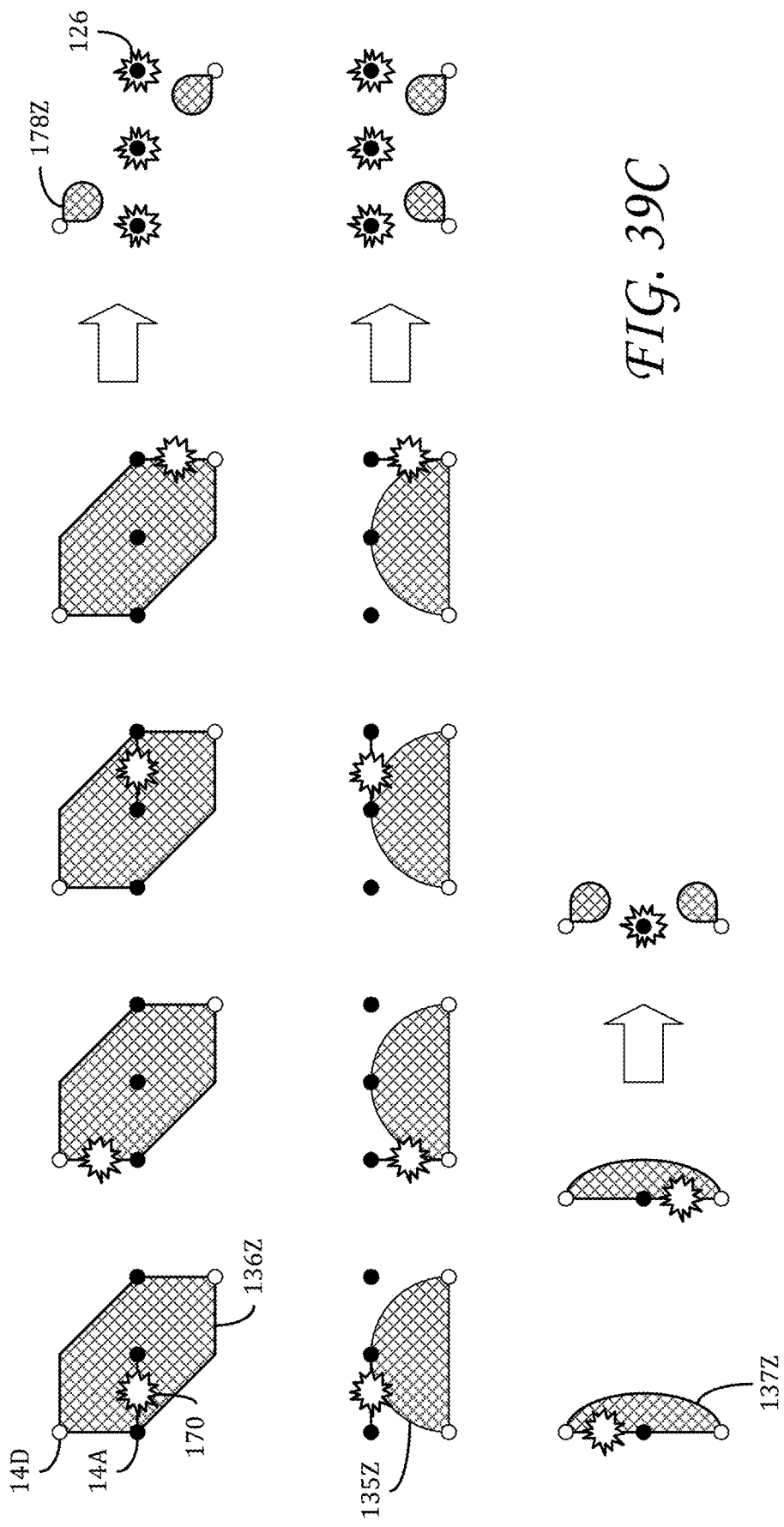

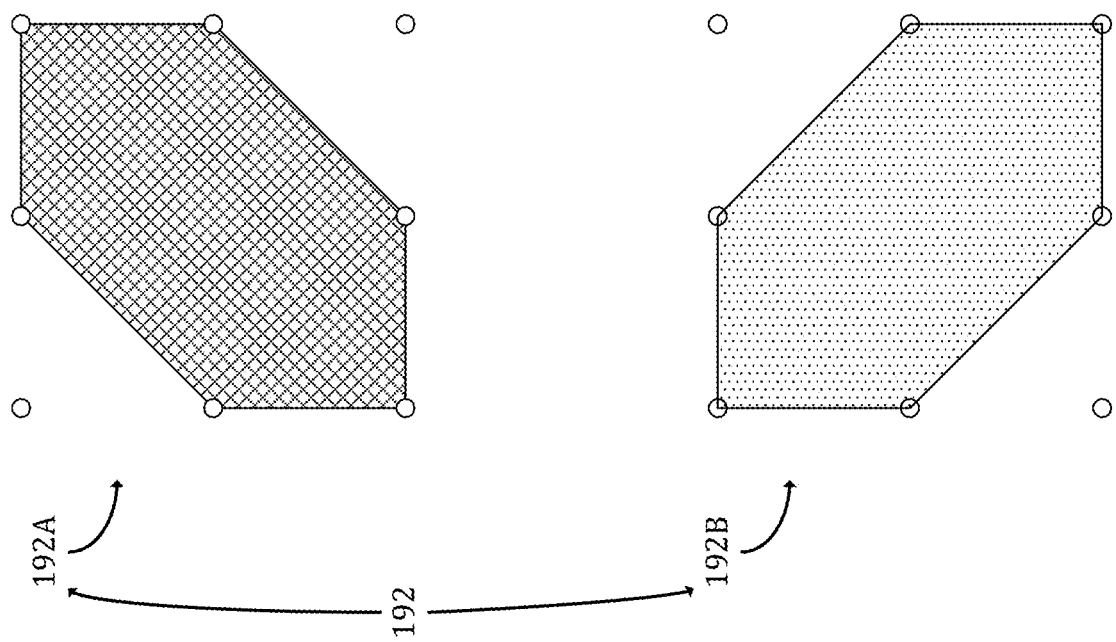
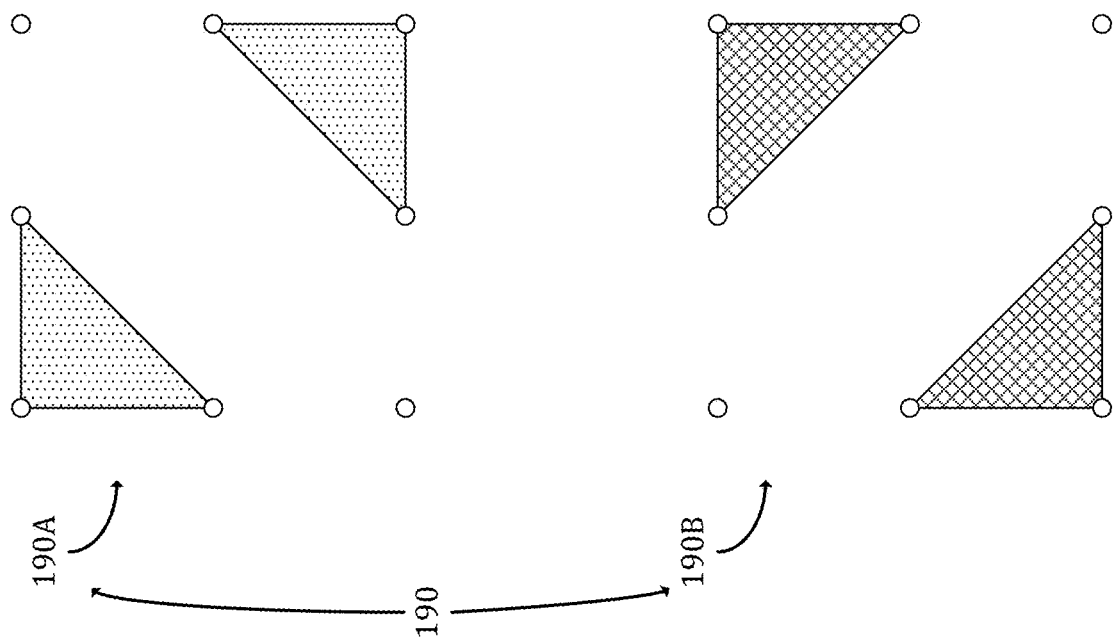
FIG. 40A

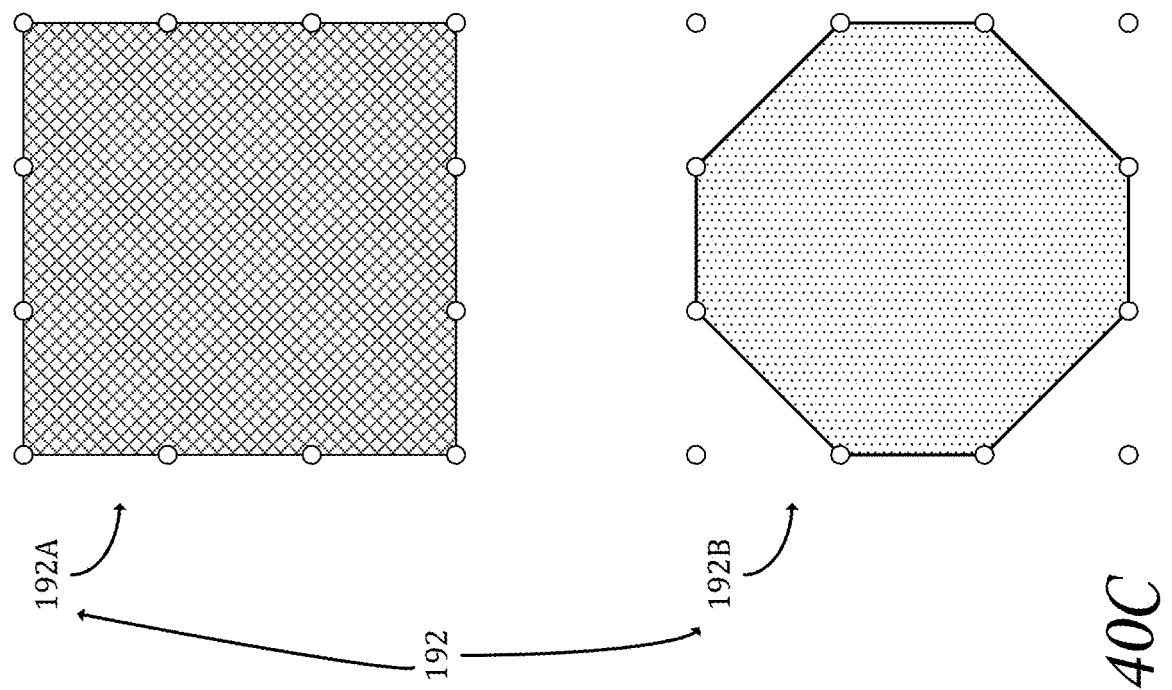
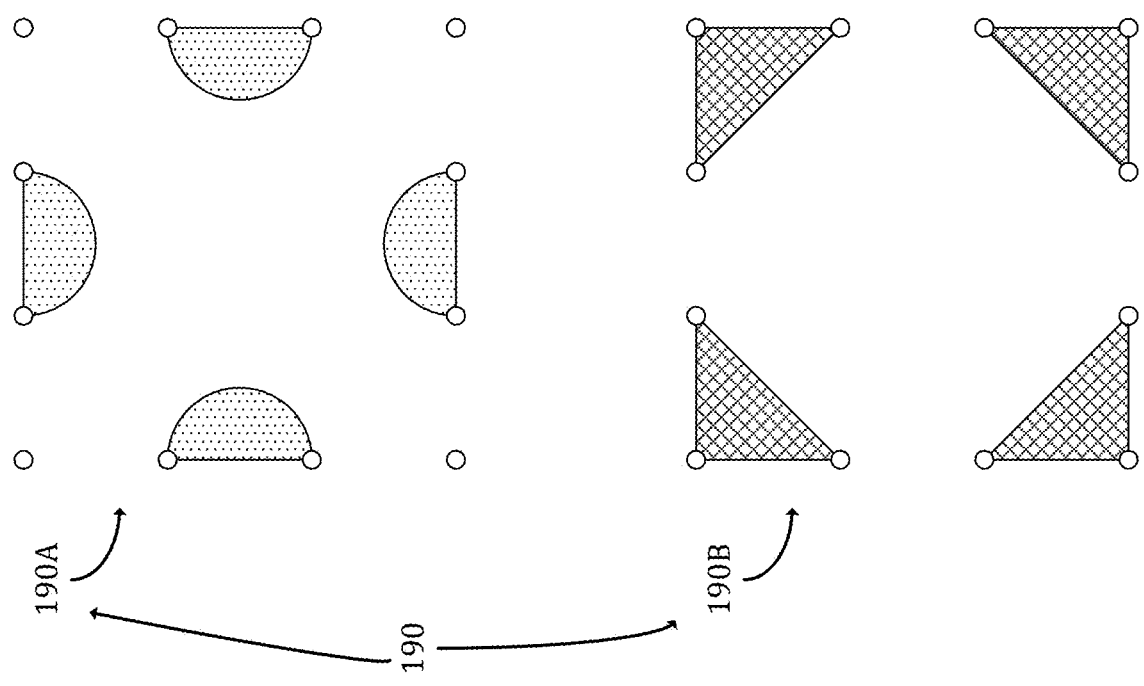
FIG. 40C

IDENTIFYING ONE OR MORE COLLATERAL LOSS AUXILIARY QUBITS FOR INCLUSION AMONG THE DEAD AUXILIARY QUBITS WITH WHICH THE REDUCED LATTICE IS COMPUTED, WHEREIN EACH OF THE ONE OR MORE COLLATERAL LOSS AUXILIARY QUBITS IS AN AUXILIARY QUBIT THAT IS NOT UTILIZED IN THE REDUCED PLAQUETTE STABILIZER MEASUREMENT CIRCUIT AFTER THE ONE OR MORE DEAD DATA QUBITS HAVE BEEN OMITTED FROM THE LATTICE — 212

OMITTING THE AT LEAST ONE RESPECTIVE DEAD AUXILIARY QUBIT FROM A FIRST REDUCED PLAQUETTE OF THE ONE OR MORE FIRST REDUCED PLAQUETTES — 214

FIG. 41B

FOR EACH OF THE PLAQUETTES THAT INCLUDES AT LEAST ONE DEAD CONNECTION OF THE ONE OR MORE DEAD CONNECTIONS, COMPUTING A RESPECTIVE THIRD REDUCED PLAQUETTE THAT OMITS AT LEAST ONE DEAD CONNECTION — 216

OMITTING THE AT LEAST ONE RESPECTIVE DEAD CONNECTION FROM A SECOND REDUCED PLAQUETTE OF THE ONE OR MORE SECOND REDUCED PLAQUETTES — 218

IDENTIFYING ONE OR MORE COLLATERAL LOSS AUXILIARY QUBITS FOR INCLUSION AMONG THE DEAD AUXILIARY QUBITS WITH WHICH THE REDUCED LATTICE IS COMPUTED, WHEREIN EACH OF THE ONE OR MORE COLLATERAL LOSS AUXILIARY QUBITS IS AN AUXILIARY QUBIT THAT IS NOT UTILIZED IN THE REDUCED PLAQUETTE STABILIZER MEASUREMENT CIRCUIT AFTER THE ONE OR MORE DEAD QUBITS AND THE ONE OR MORE DEAD CONNECTIONS HAVE BEEN OMITTED FROM THE LATTICE — 220

FIG. 41C

REDUCTION OF QUBIT LATTICE THAT INCLUDES DEAD DATA QUBITS AND AUXILIARY QUBITS

BACKGROUND

A quantum computer is a physical machine configured to execute logical operations based on quantum-mechanical phenomena. Such logical operations may include, for example, mathematical computation. Current interest in quantum-computer technology is motivated by analysis suggesting that the computational efficiency of an appropriately configured quantum computer may surpass that of any practicable non-quantum computer when applied to certain types of problems. Such problems include computer modeling of natural and synthetic quantum systems, integer factorization, data searching, and function optimization as applied to systems of linear equations and machine learning.

SUMMARY

One aspect of this disclosure relates to a method for enacting a measurement circuit of a surface code on a plaquette of qubits of a qubit lattice. The method comprises: (a) distributing among a sequence of time steps a set of one-qubit projective measurements on each of three auxiliary qubits of the plaquette; (b) distributing among the sequence of time steps a set of two-qubit projective measurements on each of four data qubits of the plaquette together with one of the three auxiliary qubits; (c) distributing among the sequence of time steps a set of two-qubit projective measurements on two or more auxiliary-qubit pairs selected from the three auxiliary qubits of the plaquette; and (d) advancing through each of the time steps of the sequence, executing the one- and two-qubit projective measurements distributed therein. In this method the measurement circuit corresponds to a stabilizer of the surface code, and the measurements generating measurement of a stabilizer operator of the surface code.

Another aspect of this disclosure relates to a quantum computer comprising a plurality of physical qubits arranged on a qubit lattice, and, an interface configured to enact a measurement circuit of a surface code on a plaquette of qubits of the qubit lattice. The measurement circuit is configured to: (a) distribute among a sequence of time steps a set of one-qubit projective measurements on each of three auxiliary qubits of the plaquette, (b) distribute among the sequence of time steps a set of two-qubit projective measurements on each of four data qubit of the plaquette together with one of the three auxiliary qubits, (c) distribute among the sequence of time steps a set of two-qubit projective measurements on two or more auxiliary-qubit pairs selected from the three auxiliary qubits of the plaquette; and (d) advance through each of the time steps of the sequence, executing the one- and two-qubit projective measurements distributed therein. The measurement circuit corresponds to a stabilizer of the surface code, and the measurements generating measurement of a stabilizer operator of the surface code.

One aspect of this disclosure relates to a method for implementing a measurement circuit of a surface code on a plaquette of qubits of a Majorana-tetron lattice. The method comprises: (a) distributing among a sequence of time steps a set of one-qubit projective-measurement loops on each of three auxiliary qubits of the plaquette; (b) distributing among the sequence of time steps a set of two-qubit projective-measurement loops on each of four data qubit of the plaquette together with one of the three auxiliary qubits; (c) distributing among the sequence of time steps a set of two-qubit projective measurement loops on two or more auxiliary-qubit pairs selected from the three auxiliary qubits of the plaquette; and (d) advancing through each of the time steps of the sequence, executing the one- and two-qubit projective measurements distributed therein. In this method the measurement circuit corresponds to a stabilizer of the surface code, and the measurements generate measurement of a stabilizer operator of the surface code.

Another aspect of this disclosure relates to a quantum computer comprising a plurality of physical qubits arranged on a Majorana-tetron lattice supported on a matrix of parallel, elongate segments of a topological superconductor, wherein the segments of each row of the matrix connect at each end to one of a plurality of semiconductor rails aligned perpendicular to the segments, and wherein a bridge of a non-topological superconductor bridges adjacent pairs of segments in every column of the matrix. The computer has an interface configured to enact a measurement circuit of a surface code on a plaquette of qubits of the qubit lattice. The measurement circuit is configured to: (a) distribute among a sequence of time steps a set of one-qubit projective-measurement loops on each of three auxiliary qubits of the plaquette, (b) distribute among the sequence of time steps a set of two-qubit projective-measurement loops on each of four data qubit of the plaquette together with one of the three auxiliary qubits, (c) distribute among the sequence of time steps a set of two-qubit projective measurement loops on two or more auxiliary-qubit pairs selected from the three auxiliary qubits of the plaquette, and (d) advance through each of the time steps of the sequence, executing the one- and two-qubit projective measurements distributed therein. The measurement circuit corresponds to a stabilizer of the surface code, and the measurements generating measurement of a stabilizer operator of the surface code.

According to another aspect of the present disclosure, a computing system is provided, including a processor configured to receive an indication of one or more dead data qubits and one or more dead auxiliary qubits among a plurality of qubits included in a quantum computing device. The plurality of qubits are arranged in a lattice that includes a plurality of plaquettes. Each of the plaquettes includes a plurality of data qubits and a plurality of auxiliary qubits. The processor is further configured to compute a reduced lattice at least in part by, for each of the plaquettes that includes at least one dead data qubit of the one or more dead data qubits, computing a respective first reduced plaquette that omits the dead data qubit. For each of the plaquettes that includes at least one dead auxiliary qubit of the one or more dead auxiliary qubits, the processor is further configured to compute the reduced lattice at least in part by computing a respective second reduced plaquette that omits the dead auxiliary qubit. The processor is further configured to output instructions to implement an error correction code on the reduced lattice by executing a reduced plaquette stabilizer measurement circuit.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

BRIEF DESCRIPTION OF THE DRAWINGS

FIG. 16 shows aspects of four different hook errors corresponding to pairs of data qubits that connect to the same auxiliary qubit.

FIGS. 33A and 33B schematically show first reduced plaquettes produced by omitting dead data qubits from a plaquette, according to the example of FIG. 31.

FIG. 33C schematically shows second reduced plaquettes produced by omitting dead auxiliary qubits from a plaquette, according to the example of FIG. 31.

FIGS. 36A and 36B schematically show the effects of example lattice reductions on code distance, according to the example of FIG. 31.

FIGS. 39A through 39C schematically show computation of third reduced plaquettes from plaquettes, data qubit 3-gons, and data qubit 2-gons that include respective dead connections, according to the example of FIG. 38.

FIGS. 40A-40E schematically show measured stabilizers and induced superplaquette stabilizers for a plurality of example reduced lattice regions, according to the example of FIG. 31.

FIGS. 41B and 41C show additional steps of the method of FIG. 39A that are performed at the computing system in some examples.

DETAILED DESCRIPTION

1. Overview

As described in further detail herein, this disclosure presents a new realization of a surface code on a rectangular lattice of qubits, utilizing only one- and two-qubit Pauli measurements. The disclosed surface-code realization offers a number of advantages over competing architectures, which may be relevant to quantum error-correcting codes. For instance, it is particularly well-suited for use in the measurement-based Majorana qubit platforms.

2. Quantum-Computer Architecture

Figure 1:
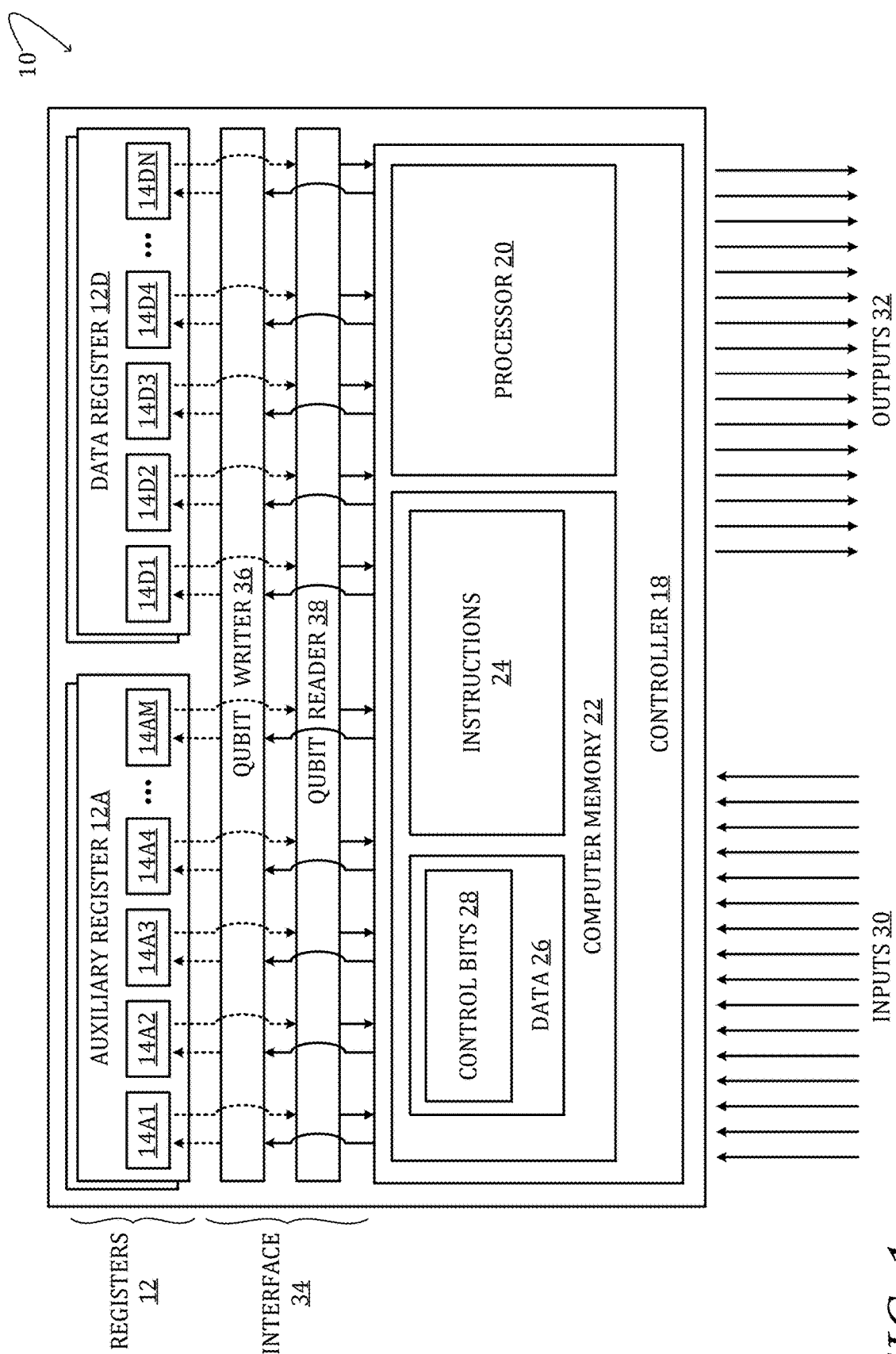
FIG. 1 shows aspects of an example quantum computer.

In order to provide a context for quantum error correction via surface codes, some aspects of an example quantum-computer architecture will first be described. Turning now to the drawings, FIG. 1 shows aspects of an example quantum computer 10 configured to execute quantum-logic operations (vide infra). Whereas conventional computer memory holds digital data in an array of bits and enacts bit-wise logic operations, a quantum computer holds data in an array of qubits and operates quantum-mechanically on the qubits in order to implement the desired logic. Accordingly, quantum computer 10 of FIG. 1 includes a set of qubit registers 12—e.g., data register 12D and auxiliary (or 'ancillary') register 12A. Each qubit register includes a series of qubits 14. The number of qubits in a qubit register is not particularly limited but may be determined based on the complexity of the quantum logic to be enacted by the quantum computer.

Qubits 14 of qubit register 12 may take various forms, depending on the desired architecture of quantum computer 10. Each qubit may comprise: a superconducting Josephson junction, a trapped ion, a trapped atom coupled to a high-finesse cavity, an atom or molecule confined within a fullerene, an ion or neutral dopant atom confined within a host lattice, a quantum dot exhibiting discrete spatial- or spin-electronic states, electron holes in semiconductor junctions entrained via an electrostatic trap, a coupled quantum-wire pair, an atomic nucleus addressable by magnetic resonance, a free electron in helium, a molecular magnet, or a metal-like carbon nanosphere, as non-limiting examples. A qubit may be implemented in the plural processing states corresponding to different modes of light propagation through linear optical elements (e.g., mirrors, beam splitters and phase shifters), as well as in states accumulated within a Bose-Einstein condensate. More generally, each qubit 14 may comprise any particle or system of particles that can exist in two or more discrete quantum states that can be measured and manipulated experimentally.

Figure 2:
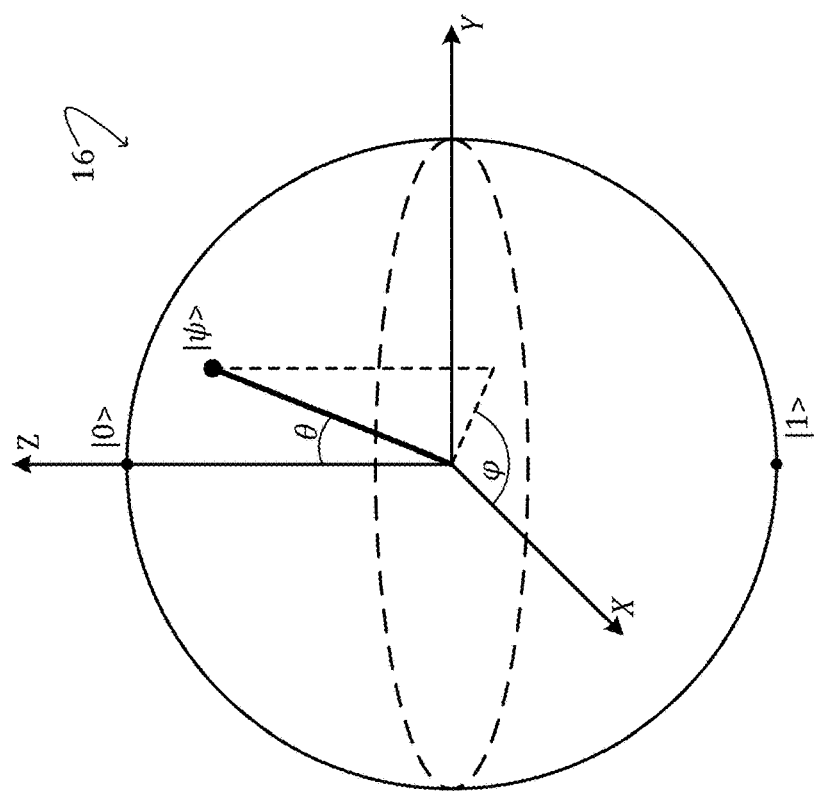
FIG. 2 illustrates a Bloch sphere, which graphically represents the quantum state of one qubit of a quantum computer.

FIG. 2 is an illustration of a Bloch sphere 16, which provides a graphical description of some quantum mechanical aspects of an individual qubit 14. In this description, the north and south poles of the Bloch sphere correspond to the standard basis vectors $|0\rangle$ and $|1\rangle$, respectively—up and down spin states, for example, of an electron or other fermion. The set of points on the surface of the Bloch sphere comprise all possible pure states $|\psi\rangle$ of the qubit, while the interior points correspond to all possible mixed states. A mixed state of a given qubit may result from decoherence, which may occur because of undesirable coupling to external degrees of freedom.

Returning now to FIG. 1, quantum computer 10 includes a controller 18. The controller may include at least one processor 20 and associated computer memory 22. Processor 20 may be coupled operatively to peripheral componentry, such as network componentry, to enable the quantum computer to be operated remotely. Processor 20 may take the form of a central processing unit (CPU), a graphics processing unit (GPU), or the like. As such, controller 18 may comprise classical electronic componentry. The terms 'classical' and 'non-quantum' are applied herein to any component that can be modeled accurately without considering the quantum state of any individual particle therein. Classical electronic components include integrated, microlithographed transistors, resistors, and capacitors, for example. Computer memory 22 may be configured to hold program instructions 24 that cause processor 20 to execute any function or process of controller 18. The computer memory may also be configured to hold additional data 26. In some examples, data 26 may include a register of classical control bits 28 that influence the operation of the quantum computer during run time—e.g., to provide classical control input to one or more quantum-gate operations. In examples in which qubit register 12 is a low-temperature or cryogenic device, controller 18 may include control componentry operable at low or cryogenic temperatures—e.g., a field-programmable gate array (FPGA) operated at 77K. In such examples, the low-temperature control componentry may be coupled operatively to interface componentry operable at normal temperatures.

Controller 18 of quantum computer 10 is configured to receive a plurality of inputs 30 and to provide a plurality of outputs 32. The inputs and outputs may each comprise digital and/or analog lines. At least some of the inputs and outputs may be data lines through which data is provided to and/or extracted from the quantum computer. Other inputs may comprise control lines via which the operation of the quantum computer may be adjusted or otherwise controlled.

Controller 18 is operatively coupled to qubit registers 12 via quantum interface 34. The quantum interface is configured to exchange data (solid lines) bidirectionally with the controller. The quantum interface is further configured to exchange signal associated with the data (dashed lines) bidirectionally with the qubit registers. Depending on the physical implementation of qubits 14, such signal may include electrical, magnetic, and/or optical signal. Via signal conveyed through the quantum interface, the controller may interrogate and otherwise influence the quantum state held in any, some, or all of the qubit registers, as defined by the collective quantum state of the qubits therein. To that end, the quantum interface includes qubit writer 36 and qubit reader 38. The qubit writer is configured to output a signal to one or more qubits of a qubit register based on write-data received from the controller. The qubit reader is configured to sense a signal from one or more qubits of a qubit register and to output read-data to the controller based on the signal. The read-data received from the qubit reader may, in some examples, be an estimate of an observable to the measurement of the quantum state held in a qubit register. Taken together, controller 18 and interface 34 may be referred to as a 'control system'.

In some examples, suitably configured signal from qubit writer 36 may interact physically with one or more qubits 14 of a qubit register 12, to trigger measurement of the quantum state held in the one or more qubits. Qubit reader 38 may then sense a resulting signal released by the one or more qubits pursuant to the measurement, and may furnish read-data corresponding to the resulting signal to controller 18. Stated another way, the qubit reader may be configured to output, based on the signal received, an estimate of one or more observables reflecting the quantum state of one or more qubits of a qubit register, and to furnish the estimate to controller 18. In one non-limiting example, the qubit writer may provide, based on data from the controller, an appropriate voltage pulse or pulse train to an electrode of one or more qubits, to initiate a measurement. In short order, the qubit reader may sense photon emission from the one or more qubits and may assert a corresponding digital voltage level on a quantum-interface line into the controller. Generally speaking, any measurement of a quantum-mechanical state is defined by the operator O corresponding to the observable to be measured; the result R of the measurement is guaranteed to be one of the allowed eigenvalues of O. In quantum computer 10, R is statistically related to the qubit-register state prior to the measurement, but is not uniquely determined by the qubit-register state.

Pursuant to appropriate input from controller 18, quantum interface 34 may be configured to implement one or more quantum-logic gates to operate on the quantum state held in a qubit register 12. The term 'state vector' refers herein to the quantum state held in the series of qubits 14D of data register 12D of quantum computer 10. Whereas the function of each type of logic gate of a classical computer system is described according to a corresponding truth table, the function of each type of quantum gate is described by a corresponding operator matrix. The operator matrix operates on (i.e., multiplies) the complex vector representing a qubit register state and effects a specified rotation of that vector in Hilbert space.

For example, the Hadamard gate H is defined by $$H = \frac{1}{\sqrt{2}}\begin{bmatrix} 1 & 1 \\ 1 & -1 \end{bmatrix}. \quad (1)$$

The H gate acts on a single qubit; it maps the basis state $|0\rangle$ to $(|0\rangle+|1\rangle)/\sqrt{2}$, and maps $|1\rangle$ to $(|0\rangle-|1\rangle)/\sqrt{2}$. Accordingly, the H gate creates a superposition of states that, when measured, have equal probability of revealing $|0\rangle$ or $|1\rangle$.

The phase gate S is defined by $$S = \begin{bmatrix} 1 & 0 \\ 0 & e^{i\pi/2} \end{bmatrix}. \quad (2)$$

The S gate leaves the basis state $|0\rangle$ unchanged but maps $|1\rangle$ to $e^{i\pi/2}|1\rangle$. Accordingly, the probability of measuring either $|0\rangle$ or $|1\rangle$ is unchanged by this gate, but the phase of the quantum state of the qubit is shifted. This is equivalent to rotating $|\psi\rangle$ by 90 degrees along a circle of latitude on the Bloch sphere of FIG. 2.

Some quantum gates operate on two or more qubits. The SWAP gate, for example, acts on two distinct qubits and swaps their values. This gate is defined by $$SWAP = \begin{bmatrix} 1 & 0 & 0 & 0 \\ 0 & 0 & 1 & 0 \\ 0 & 1 & 0 & 0 \\ 0 & 0 & 0 & 1 \end{bmatrix}. \quad (3)$$

A 'Clifford gate' is a quantum gate that belongs to the Clifford group-viz., a set of quantum gates that effect permutations of the Pauli operators. For the n-qubit case the Pauli operators form a group $$P_n = \left\{ e^{\frac{i\theta}{2}}\sigma_{j_1} \otimes \ldots \otimes \sigma_{j_n} \mid \theta = 0, 1, 2, 3, j_k = 0, 1, 2, 3 \right\}, \quad (4)$$

where $\sigma_0, \ldots \sigma_3$ are the one-qubit Pauli matrices. The Clifford group is then defined as the group of unitaries that normalize the Pauli group, $$C_n = \left\{ V \in U_{2^n} \mid V P_n V^\dagger = P_n \right\}. \quad (5)$$

The foregoing list of quantum gates and associated operator matrices is non-exhaustive, but is provided for ease of illustration. Other quantum gates include Pauli–X, –Y, and –Z gates, the $\sqrt{NOT}$ gate, additional phase-shift gates, the $\sqrt{SWAP}$ gate, controlled cX, cY, and cZ gates, and the Toffoli, Fredkin, Ising, and Deutsch gates, as non-limiting examples.

Figure 3:
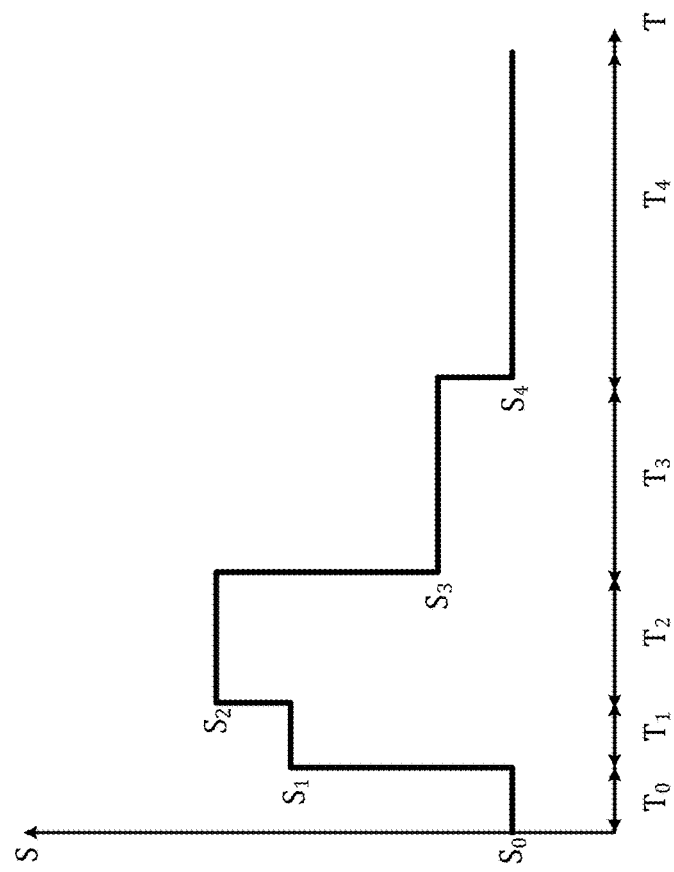
FIG. 3 shows aspects of an example signal waveform for effecting a quantum-gate operation or measurement in a quantum computer.

Continuing in FIG. 1, suitably configured signal from qubit writer 36 of quantum interface 34 may interact physically with one or more qubits 14 of a qubit register 12 so as to assert any desired quantum-gate operation. As noted above, the desired quantum-gate operations include specifically defined rotations of a complex vector representing a qubit register state. In some examples, in order to effect a desired rotation O, the qubit writer may apply a predetermined signal level $S_i$ for a predetermined duration $T_i$. In some examples, plural signal levels may be applied for plural sequenced or otherwise associated durations, as shown in FIG. 3, to assert a quantum-gate operation on one or more qubits of a qubit register. In general, each signal level $S_i$ and each duration $T_i$ is a control parameter adjustable by appropriate programming of controller 18.

The terms 'quantum circuit' and 'quantum algorithm' are used herein to describe a predetermined sequence of elementary quantum-gate and/or measurement operations executable by quantum computer 10. A quantum circuit may be used to transform the quantum state of a qubit register 12 to effect a classical or non-elementary quantum-gate operation or to apply a density operator, for example. In some examples, a quantum circuit may be used to enact a predefined operation f(x), which may be incorporated into a complex sequence of operations. To ensure adjoint operation, a quantum circuit mapping n input qubits $|x\rangle$, to m output or auxiliary qubits $|y=f(x)\rangle$ may be defined as a quantum gate $O(|x\rangle \oplus |y\rangle)$ operating on the (n+m) qubits. In this case, O may be configured to pass the n input qubits unchanged but combine the result of the operation f(x) with the auxiliary qubits via an XOR operation, such that $O(|x\rangle \oplus |y\rangle) = |x\rangle \oplus |y \oplus f(x)\rangle$.

Implicit in the description herein is that each qubit 14 of any qubit register 12 may be interrogated via quantum interface 34 so as to reveal with confidence the standard basis vector $|0\rangle$ or $|1\rangle$ that characterizes the quantum state of that qubit. In some implementations, however, measurement of the quantum state of a physical qubit may be subject to error. Accordingly, any qubit 14 may be implemented as a logical qubit, which includes a grouping of physical qubits measured according to an error-correcting quantum algorithm or circuit that reveals the quantum state of the logical qubit with above-threshold confidence.

3. Topological Stabilizer Codes

Due to the difficulty of isolating qubits from their noisy environment, reliable execution of large-scale quantum algorithms will almost certainly require some form of quantum error correction. A 'stabilizer code' is a quantum error-correction circuit that includes sets of measurements for which the parity of the outcome is predetermined in the absence of errors. The measurements function as checks of the stabilizer code, which can be used to identify errors and to correct errors via classical post processing.

Figure 4:
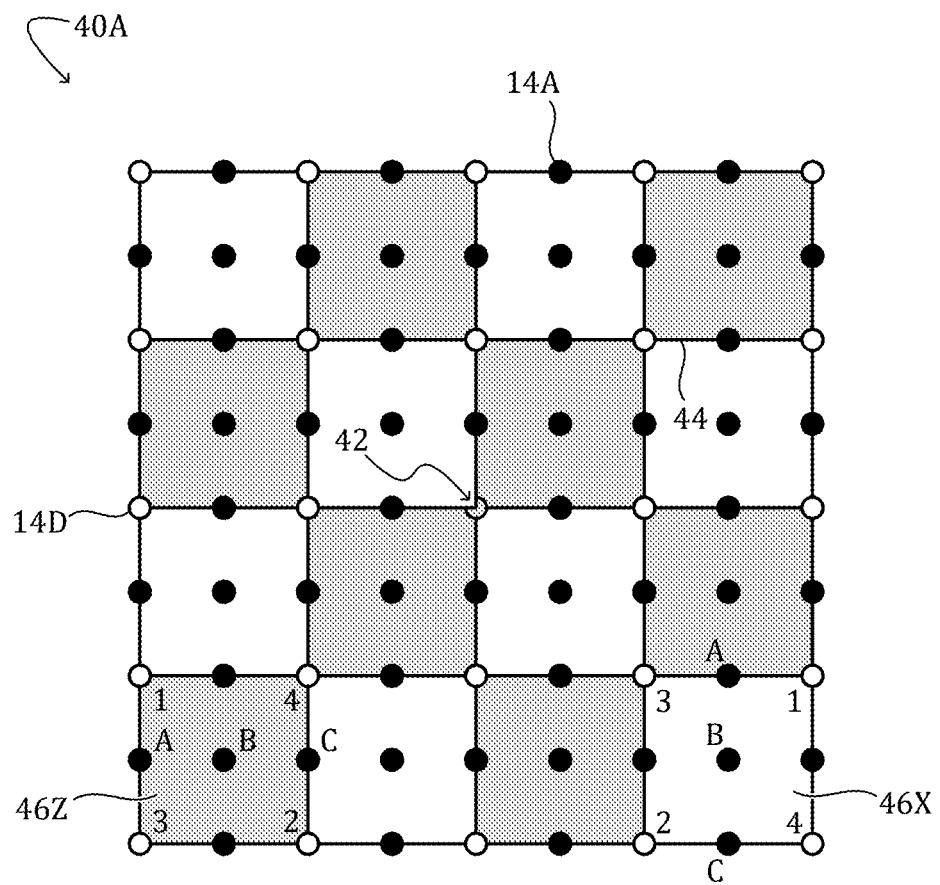
FIG. 4 is a schematic illustration of a lattice of physical qubits in one, non-limiting example.

Some stabilizer codes leverage certain topological features of the qubit architecture of a quantum computer. To illustrate, FIG. 4 shows aspects of a rectangular lattice 40A of physical qubits 14. In the illustrated example, lattice 40A is a square lattice; that feature is not strictly necessary, however, as lattices of non-square and non-rectangular geometries are also envisaged. A qubit may be classified as a data qubit or as an auxiliary qubit depending on how it is used. Data qubits 14D are shown as open circles in the drawings and are used to hold the evolving quantum state in a quantum computation. Auxiliary qubits 14A are shown as filled circles in the drawings and are used internally by the quantum code executing on a quantum computer. In order to support quantum error correction, at least some of the information encoded in the data qubits may be stored redundantly, making use of the additional storage capacity of the auxiliary qubits. In examples consonant with this disclosure, a topological stabilizer code (e.g., a surface code) executes on the qubits of lattice 40A. The topological stabilizer code enacts measurements on the qubits and, in some examples, may also enact one or more quantum-gate operations.

Lattice 40A comprises a matrix of vertices 42, which define a set of edges 44 and a set of plaquettes (or faces) 46. A general topological stabilizer code is defined by a set of commuting operators, referred to as the stabilizers of the code. In a surface code all of the stabilizers operate on the plaquettes. The 'code space' of the surface code is the vector space for which each of the operators reduces to the identity operator. For a surface code wrapped around a torus, the code space is four-dimensional and capable, therefore, of representing two logical qubits of quantum information. More generally, the dimension of the code space, or logical state space, will depend on the topology and boundary conditions. In some examples the code is placed on a finite patch with boundary conditions chosen so that there is one logical qubit encoded in the patch. Generally speaking, each circuit fault will move the quantum state of a lattice out of the stabilizer space, resulting in vertices and plaquettes for which the stabilizer operators differ from the identity operator. The positions of such anomalous operators on the lattice defines the 'syndrome' of the topological error-correcting quantum code, which can be used for error correction.

In quantum error correction, a decoder program executing on a classical computer maps the syndrome to a series of bit flips, which may be applied to the measured output of a quantum algorithm to yield an error-free result. Because the stabilizer code controls how the syndrome relates to the required bit flips, it also controls the configuration of the classical decoder. Currently, decoders based on topological stabilizer codes (e.g., minimum-weight perfect matching and union-find) are the most efficient in terms of runtime and resource consumption. For additional information, the interested reader is referred to the extensive literature on topological stabilizer codes.

With continued reference to FIG. 4, the measurement circuits of a surface code are applied in sequence to one or more plaquettes 46 of qubit lattice 40A as the code executes. Because neighboring plaquettes share qubits, measurements made on a given plaquette are liable to conflict with those made on adjacent plaquettes, unless scheduled to avoid concurrent addressing of the same qubits. Such scheduling may be constrained in scenarios where it is important to interrogate the entire lattice as rapidly as possible, so as to limit the decoherence that may occur between measurements.

In view of the context and constraints noted above, this disclosure provides a new class of measurement circuit for enacting a surface code on suitably configured plaquettes of a qubit lattice. The measurement circuits use only Pauli $M_X$, $M_Z$, $M_{XX}$, and $M_{ZZ}$ measurements for logical memory. Pairwise measurements $M_{XX}$ and $M_{ZZ}$ are between nearest qubit neighbors and are correlated with direction—viz., the $M_{XX}$ measurement is between horizontally neighboring qubits, and the $M_{ZZ}$ measurement is between vertically neighboring qubits. This disclosure provides platform-agnostic methods for enacting the measurement circuits as well as more particular methods for implementing the measurement circuits on Majorana-tetron platforms.

Figure 5:
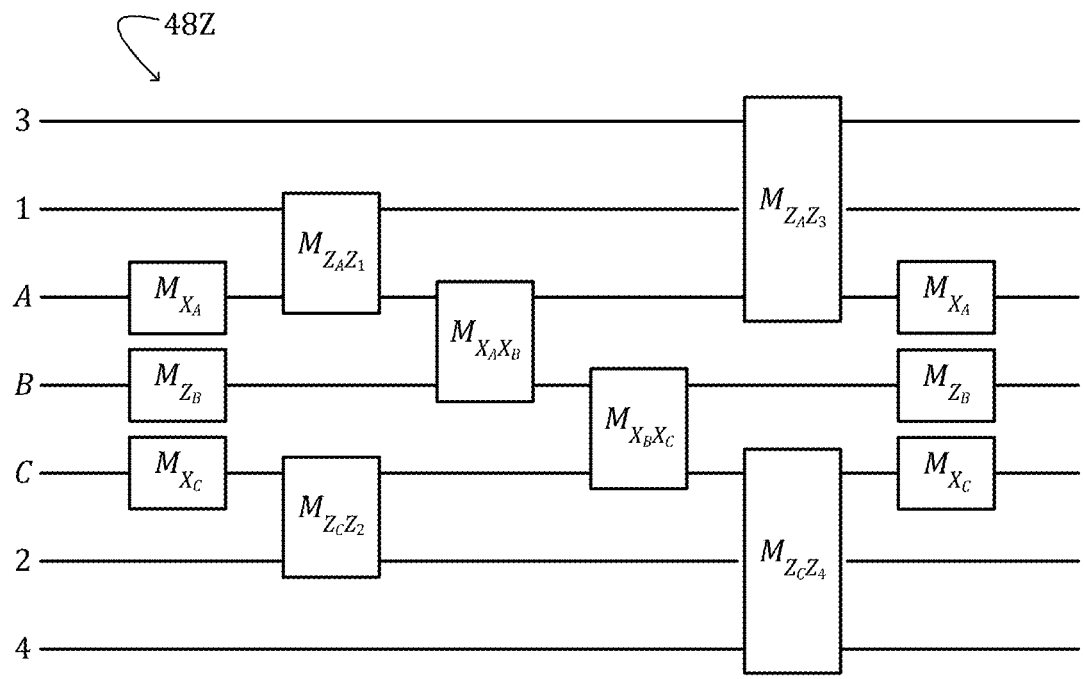
FIG. 5 and FIG. 6 show aspects of example measurement circuits for enacting surface-code measurements on alternating qubit plaquettes.
Figure 6:
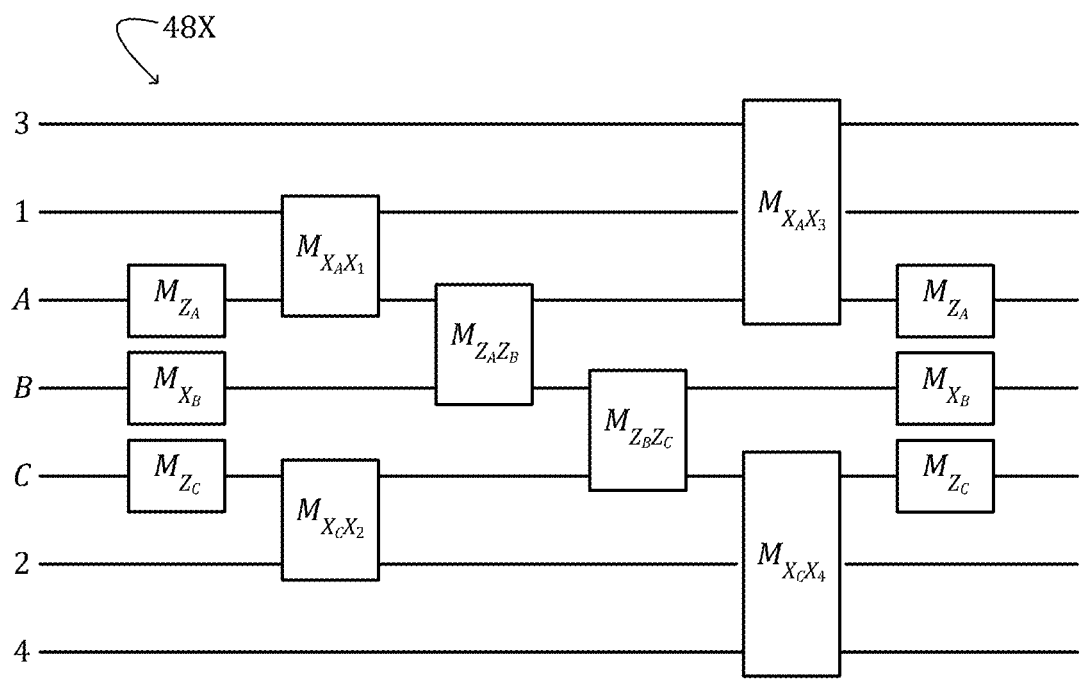

FIG. 5 shows aspects of an example measurement circuit 48Z on four data qubits. The measurement circuit can be used, inter alia, as a stabilizer measurement in a surface-code implementation. The measurement is enacted on a suitably configured plaquette of a qubit lattice, such as plaquette 46Z in FIG. 4, having the four data qubits on the vertices and three auxiliary qubits between vertices. Other numbers of data qubits and auxiliary qubits may be utilized in other embodiments. The reader will note that the qubit labels on plaquette 46Z of FIG. 4 (data qubits 1, 2, 3, 4, auxiliary qubits A, B, C) correspond to the line labels in FIG. 5. Measurement circuit 48Z is a measurement-only circuit, comprising only projective Pauli measurements. Such measurements include $M_X$ measurements, $M_Z$ measurements, and pairwise $M_{XX}$ and $M_{ZZ}$ measurements. In other examples measurement circuits consonant with this disclosure may also include one or more Clifford gates. Measurement circuit 48Z is an $M_{zzzz}$ circuit because it reports on the z component of the quantum state held in the four data qubits of a suitably configured target plaquette. Analogous measurement circuit 48X of FIG. 6 is an $M_{xxxx}$ circuit, which reports on the x component of the quantum state of a suitably configured plaquette, such as plaquette 46X of FIG. 4. In general, the measurement circuit corresponding to each plaquette generates the measurement of one stabilizer operator. The set of stabilizers for all of the plaquettes form a commuting set of operators called the stabilizer group, which defines the error-correcting code. For the surface code disclosed herein, the stabilizers can be partitioned into an XXXX type to be applied to one half of the internal plaquettes of the rectangular lattice, and a ZZZZ type to be applied to the other half. Measurement circuits 48Z and 48X are related by a basis change that exchanges x and z. Such a basis change can be implemented by conjugating all qubits with the Hadamard operator, for instance. Other basis changes and/or qubit permutations yield additional, analogous measurement circuits.

Figure 7:
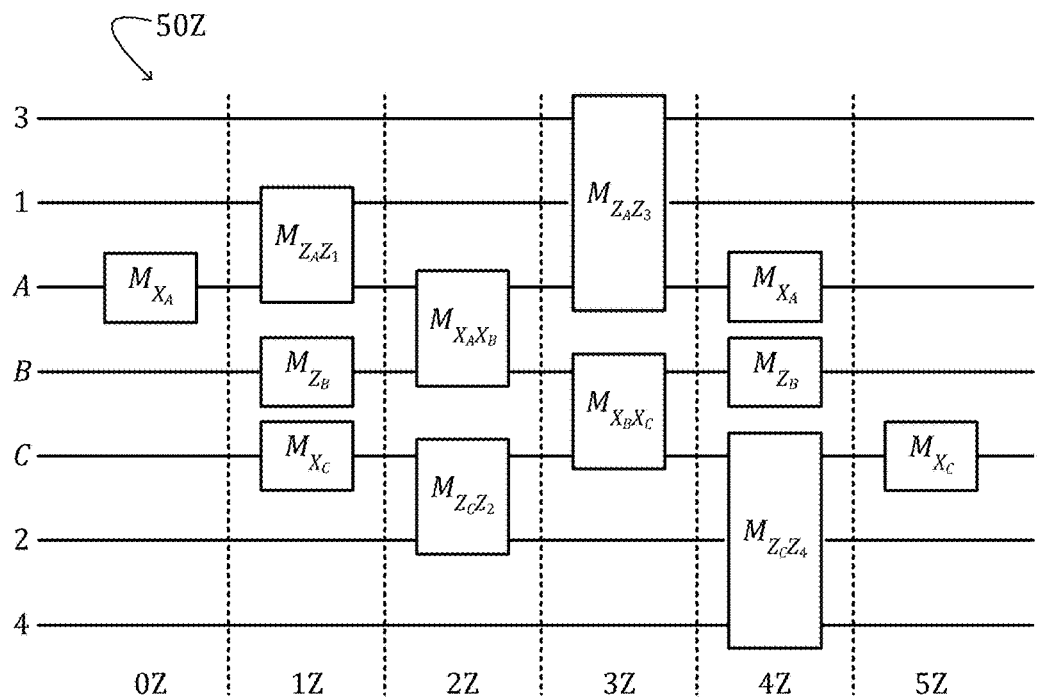
FIG. 7 and FIG. 8 show aspects of example measurement circuits for enacting concurrent surface-code measurements on alternating qubit plaquettes.
Figure 8:
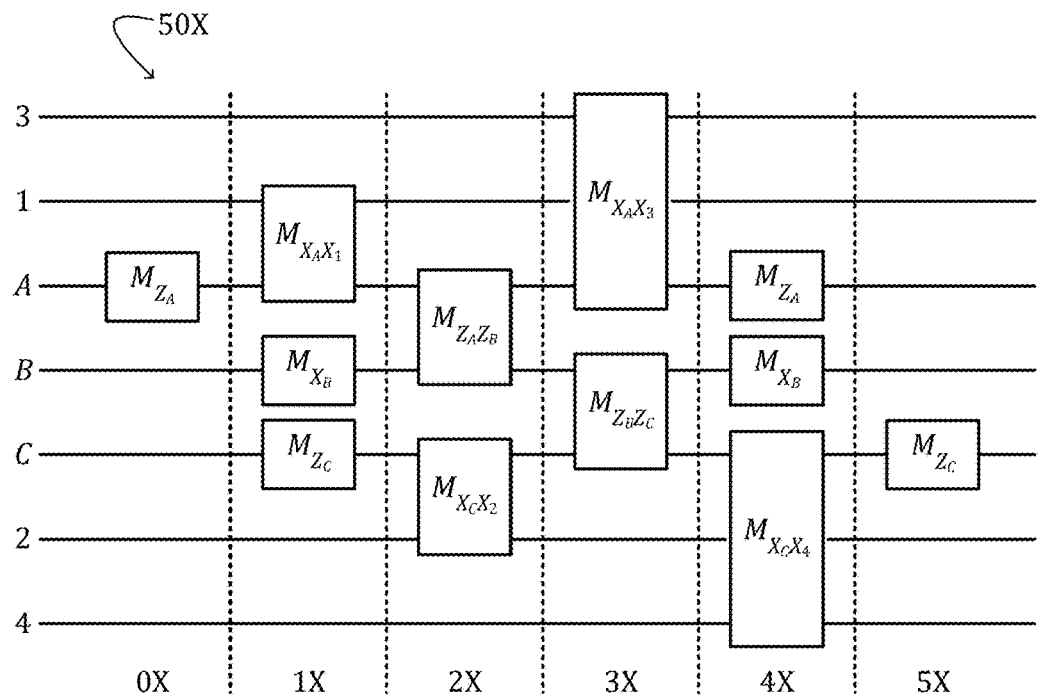

In some examples, surface code consonant with this disclosure measures the quantum state of the qubits of a lattice by repeated application of measurement circuit 48Z or 48X on each plaquette of a lattice. The detailed operation of the code can be represented with continued reference to lattice 40A of FIG. 4. In this drawing, alternating plaquettes 46 are shaded in a checkerboard pattern. To achieve stabilizer operation, measurement circuit 48Z is applied to the shaded plaquettes and measurement circuit 48X is applied to the unshaded plaquettes. In the application of each circuit to the corresponding plaquettes, the detailed sequencing of the component measurement operations ($M_X$, $M_Z$, $M_{XX}$, etc.) is adjusted in order to (a) avoid subjecting any qubit to more than one distinct measurement in the same time step, (b)

coordinate those measurements that can be enacted concurrently, so as to complete the component measurements in the minimum number of time steps, and (c) make sure that the component measurements on adjacent plaquettes are ordered in a compatibly, so as to yield the same measurement result as if the $M_{zzzz}$ and $M_{xxxx}$ circuits were applied sequentially. FIGS. 7 and 8 show more particular aspects of the sequencing, in non-limiting examples.

Measurement circuit 50Z of FIG. 7 is functionally equivalent to measurement circuit 48Z of FIG. 5 but enacts its measurements within prescribed time steps, labeled 0Z through 5Z. The measurements that must be repeated at each iteration of the stabilizer code are shifted into the range 1Z through 4Z, and any that can be enacted concurrently are binned together in the same time step. The remaining measurements are shifted into bins 0Z and 5Z and executed only once, before and after the repeated sequence, respectively. FIG. 8 shows analogous measurement circuit 50X, which is functionally equivalent to measurement circuit 48X of FIG. 6. In other examples the measurement circuits can be further modified by adding one or more additional time steps and/or redistributing the measurements among the available time steps, without sliding past measurements on the same qubit lines.

Figure 9:
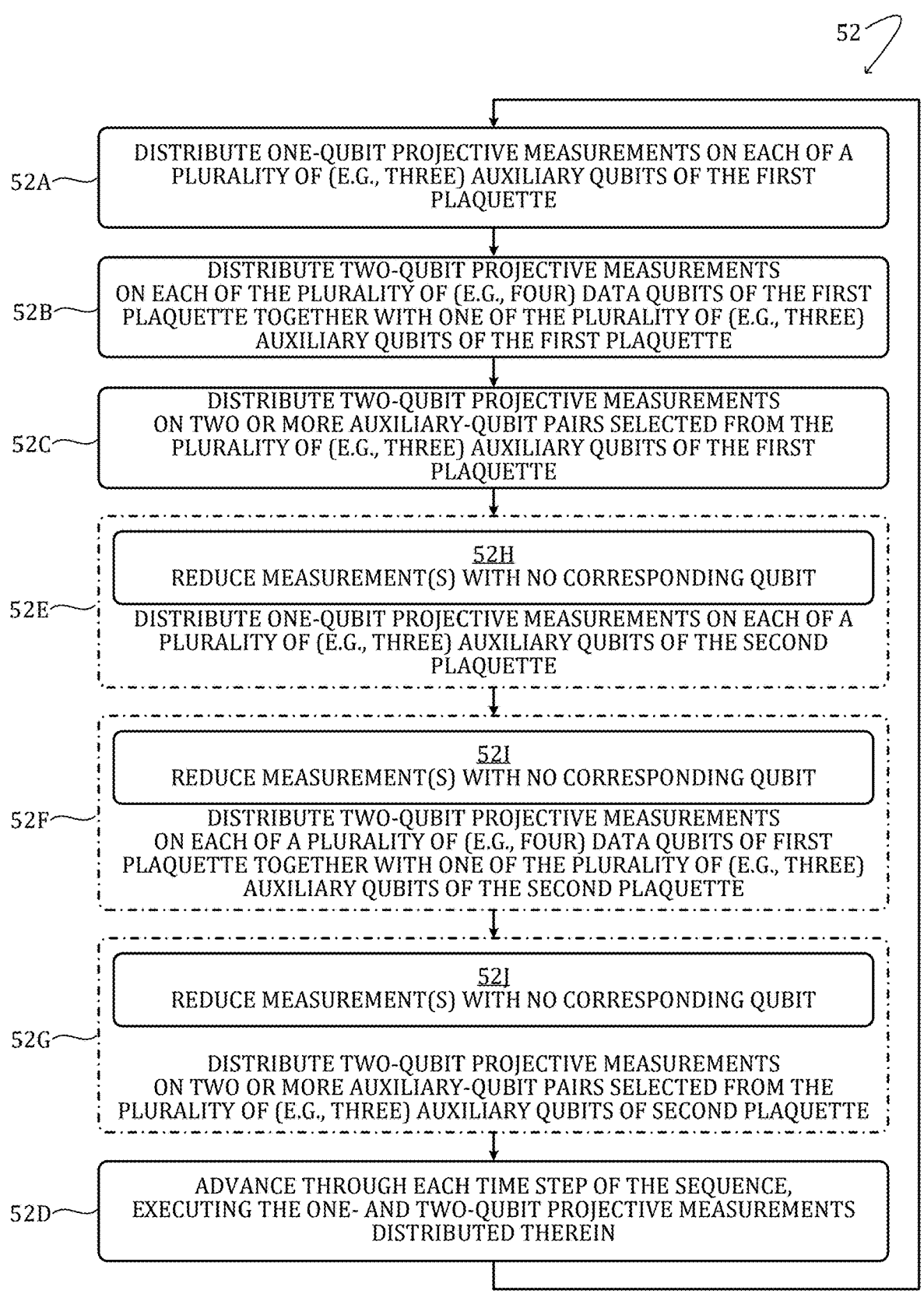
FIG. 9 shows aspects of an example method for enacting measurement circuits of a surface code on plaquettes of qubits of a qubit lattice.

FIG. 9 shows aspects of an example method 52 for enacting a first measurement circuit of a surface code (circuit 50Z, for example) on a first plaquette of qubits of a qubit lattice. The first measurement circuit corresponds to a stabilizer of the surface code (for Z-type plaquettes, for example). The quantum-computer platform on which method 52 is implemented is not particularly limited; it can be implemented on a quantum computer comprising a plurality of physical qubits arranged on a qubit lattice, with an interface suitably configured to enact the measurement circuit.

At 52A of method 52, the stabilizer code distributes among a sequence of time steps a set of one-qubit projective measurements on each of three auxiliary qubits of the first plaquette. Each of the one- and two-qubit projective measurements of method 52 generating measurement of a stabilizer operator of the surface code (for X-type plaquettes, for example). At 52B the stabilizer code distributes among the sequence of time steps a set of two-qubit projective measurements on each of four data qubits, together with one of the three auxiliary qubits, of the first plaquette. At 52C the stabilizer code distributes among the sequence of time steps a set of two-qubit projective measurements on two or more auxiliary-qubit pairs selected from the three auxiliary qubits of the first plaquette. One example result of the distribution is measurement circuit 50Z of FIG. 7, where the sequence of time steps includes one initial time step, four repeating time steps, and one final time step. At 52D the stabilizer code advances through each of the time steps of the sequence, executing the one- and two-qubit projective measurements distributed therein. The foregoing method steps are repeated for any, some, or all of the alternating plaquettes of the lattice, sequentially or in parallel. In some scenarios, an ensemble of $M_{zzzz}$ circuits, such as measurement circuit 50Z, are applied concurrently to all of the Z-type plaquettes of a qubit lattice while a complementary ensemble of $M_{xxxx}$ circuits, such as measurement circuit 50X, are applied to all of the X-type plaquettes of the qubit lattice. Naturally, the term 'concurrently' should not be interpreted in an overly restrictive sense, as measurement concurrency may be subject to the limitations of the measurement hardware of the quantum computer. Although three auxiliary qubits and four data qubits are depicted in this example, a plurality of auxiliary qubits and a plurality of data qubits of other numbers if qubits can be utilized in each plaquette in other embodiments, although typically at least three auxiliary qubits are used and at least four data qubits are used. Further, in some embodiments, not more than ten auxiliary qubits and not more than ten data qubits are used in each plaquette, although larger numbers of data and auxiliary qubits are also contemplated.

Some additional aspects of the foregoing measurement circuits 50Z and 50X can be noted at this point in the description. Readout errors for the one-qubit measurement on the B auxiliary qubit lead to successive, correlated stabilizer-readout errors if the measurement is not repeated. Such errors are avoided by repeating the measurement. Readout errors of the one-qubit measurements on the A and C auxiliary qubits lead to hook errors (vide infra). The hook errors are of the same type and direction as unidirectional hook errors from errors elsewhere in the circuits. These measurements need not be repeated during logical idle, but should be repeated whenever an attempt is made to detect the unidirectional hook errors—e.g., during non-trivial logical operations. Furthermore, the initial and final one-qubit measurements on the auxiliary qubits can be replaced by a different form of auxiliary state preparation or readout, and/or made terminal in the measurement circuits, as desired for any particular implementation.

Figure 10:
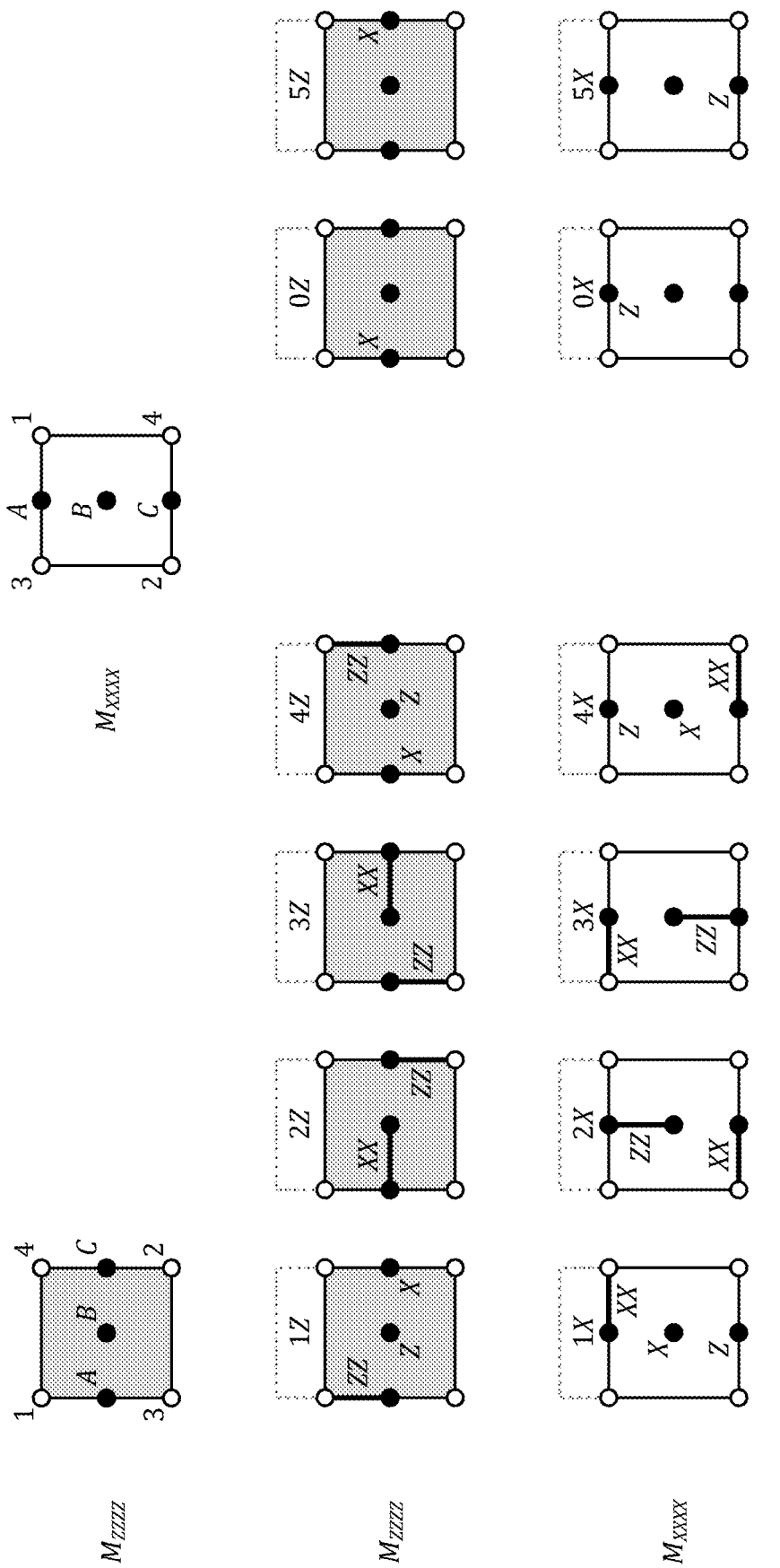
FIG. 10 provides a more detailed illustration of the projective measurements enacted by the measurement circuits of FIG. 7 and FIG. 8.

Returning now to the drawings, an additional benefit of measurement circuits 50Z and 50X is that judicious sequencing of the measurements of each circuit relative to the measurements of the other enables the repeating measurements of both circuits to be enacted on different plaquettes in the same four time steps. FIG. 10 provides a more detailed illustration of the concurrent measurements distributed into each of the six time steps. The particular sequence that optimizes the measurement-circuit execution is (1Z, 3X), (2Z, 4X), (3Z, 1X), (4Z, 2X), where parentheses enclose measurements enacted concurrently. This 'period-four pipelining' is the most time-efficient implementation possible for the surface-code realization, in the sense that none of the bulk qubits are ever idle, except during the ramp-on and two ramp-off time steps 0Z/0X and 5Z/5X. The offset between the plaquettes subjected to concurrent measurement ensures that a given qubit is not multiply addressed (i.e., acted upon by more than one measurement) in a given time step.

Scheduled in the manner shown in FIGS. 7, 8, and 10, an isolated application of measurement circuit 50Z or 50X requires a minimum of six time steps. When applied repeatedly, however, for all stabilizers in a surface-code patch, the entire sequence is completed in 4r+4 time steps, where r is the number of repetitions of all surface-code stabilizer measurements.

In view of this important feature, method 52 of FIG. 9 serves also as a method for enacting complementary first and second measurement circuits of a surface code on alternating first and second plaquettes of qubits of a qubit lattice. In one example the first plaquette is a Z-type plaquette and the first measurement circuit is an $M_{zzzz}$ circuit, such as circuit 50Z; here the second plaquette is an X-type plaquette and the second measurement circuit is an $M_{xxxx}$ circuit, such as circuit 50X. Generally speaking, the second measurement circuit measures the X-type plaquettes. In some examples, the one- and two-qubit projective measurements of the second measurement circuit are obtained from those of the first measurement circuit by a ninety-degree basis rotation. In some examples, each of the one-qubit projective measurements corresponding to stabilizer operators of the given basis projects exactly one qubit onto a $|0\rangle$ or $|1\rangle$ basis state, and each of the one-qubit projective measurements corresponding to stabilizer operators of the basis orthogonal to the given basis projects exactly one qubit onto a $(|0\rangle +1\rangle )/\sqrt{2}$ or $(|0\rangle -|1\rangle )/\sqrt{2}$ state.

At 52E of method 52, the stabilizer code distributes among a sequence of time steps a set of one-qubit projective measurements on each of three auxiliary qubits of the second plaquette. At 52F the stabilizer code distributes among the sequence of time steps a set of two-qubit projective measurements on each of four data qubits, together with one of the three auxiliary qubits, of the second plaquette. At 52G the stabilizer code distributes among the sequence of time steps a set of two-qubit projective measurements on two or more auxiliary-qubit pairs selected from the three auxiliary qubits of the second plaquette. The one- and two-qubit projective measurements of the first and second measurement circuits are distributed so as to minimize a length of the sequence while subjecting no qubit to redundant measurement.

4. Extensions to Finite Boundaries

Figure 11:
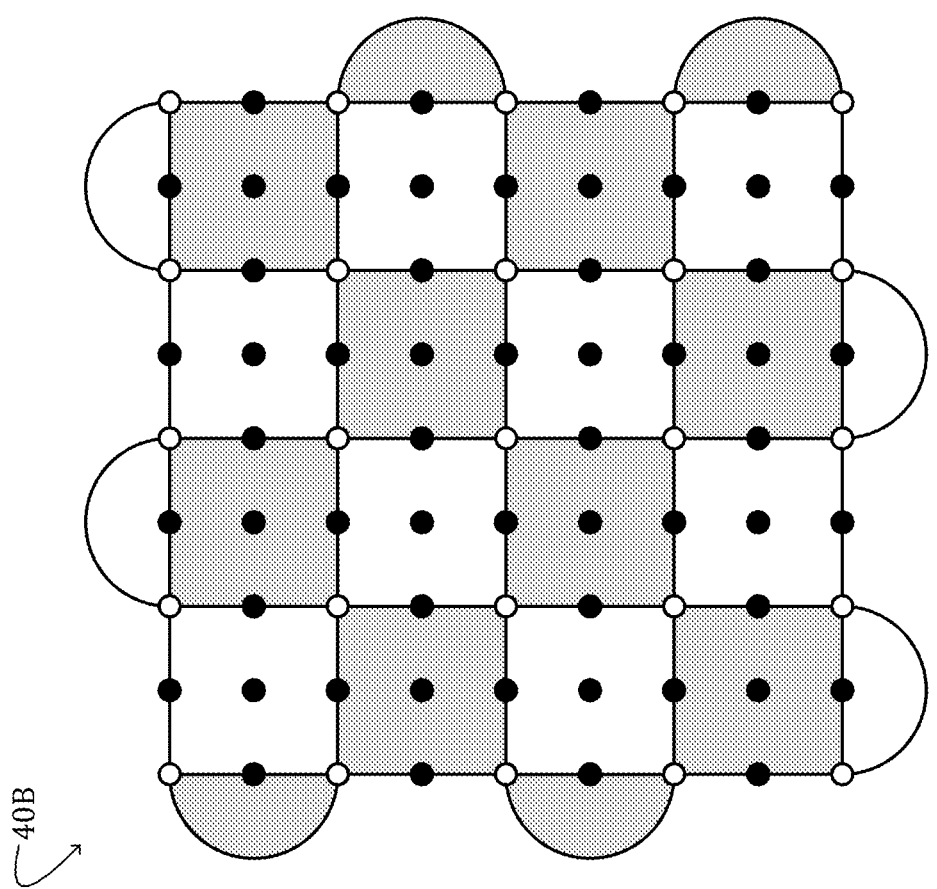
FIG. 11 shows aspects of an example qubit lattice with boundary plaquettes.

In some examples a lattice can be made boundaryless by mapping its vertices, edges, and plaquettes to a closed surface (which has no boundary), such as a torus. In other examples also relevant to quantum computing, any, some, or all of the edges may define a boundary, with no physical qubits residing outside of the boundary. In examples in which a lattice is bounded, each plaquette can be classified as an internal (i.e., bulk) plaquette or as a boundary plaquette. In some examples the internal plaquettes may have four data qubits and three auxiliary qubits each, as noted above, while the boundary plaquettes may have one, two, or three data qubits each, and three or fewer auxiliary qubits. FIG. 11 shows aspects of an example lattice 40B of this kind.

In some examples the boundary plaquettes addressed by a surface code use two-qubit or three-qubit stabilizers, as opposed to the four-qubit stabilizers of the internal plaquettes. In this disclosure various boundary-stabilizer measurement circuits are constructed by systematic modification of internal measurement circuits 50Z and 50X, which are applied in unmodified form to the internal plaquettes. Accordingly, the measurement sequence for the boundary measurement circuits interlocks with that of the unmodified internal measurement circuits, providing a significant advantage in pipelining.

The boundary-stabilizer measurement circuits herein can be used to implement the surface code with different types of boundary conditions—e.g., allowing for non-rotated (Bravyi-Kitaev) or rotated (Bombin) surface code patches, in addition to more complex code patches. For the rotated surface code on a rectangular patch, boundary conditions can be chosen such that the hook errors of the stabilizer measurement circuits (vide infra) are perpendicular to the corresponding logical operators. That feature effectively prevents the hook errors from reducing the code distance of the surface code. Furthermore, the boundary stabilizer circuits herein do not require the various boundaries to be hard-coded. Rather, a boundary stabilizer can be implemented anywhere on a qubit lattice without modifying the hardware, thereby enabling logical operations, lattice surgery, etc.

Returning again to the drawings, boundary plaquettes are stabilized by application of measurement circuits akin to circuits 50Z and 50X, but adapted so that any measurement that would be enacted on a missing qubit is omitted. Returning briefly to FIG. 9, method 52 contemplates scenarios in which the first plaquette of qubits is an internal plaquette and the second plaquette is a boundary plaquette having fewer than four data qubits. In that scenario, each of steps 52E through G includes the act of reducing any one- or two-qubit projective measurement from the second measurement circuit for which there is no corresponding data qubit in the second plaquette. More particularly, a one-qubit projective measurement—e.g., $M_i$—for which there is no data qubit i may be eliminated altogether, while a two-qubit projective measurement—e.g., $M_{ij}$—may be reduced to $M_j$. This act is embodied in steps 52H through 52J of method 52.

Figure 12:
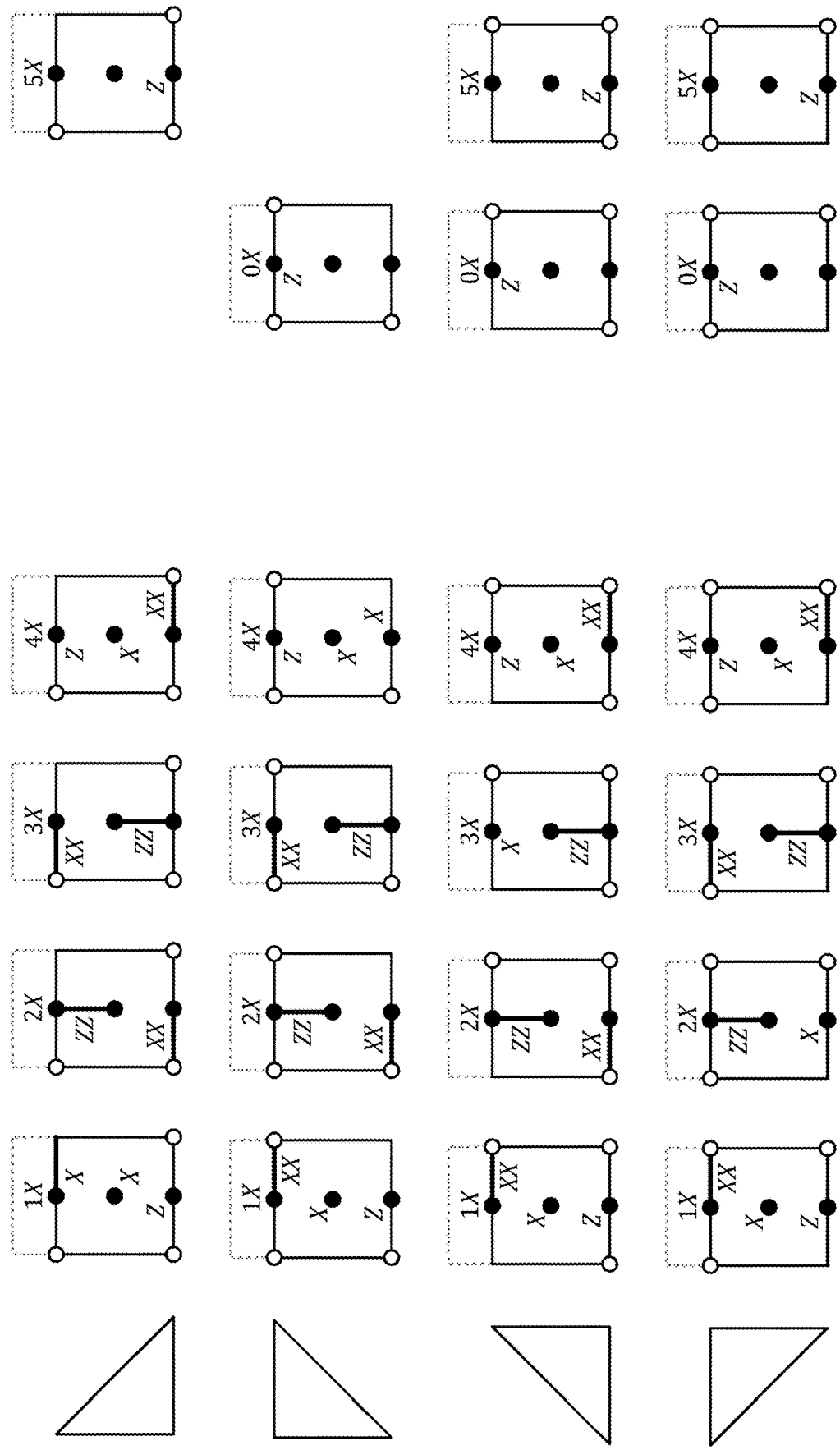
FIG. 12 shows aspects of example sets of projective measurements applied to a 3-gon X-type plaquette.
Figure 13:
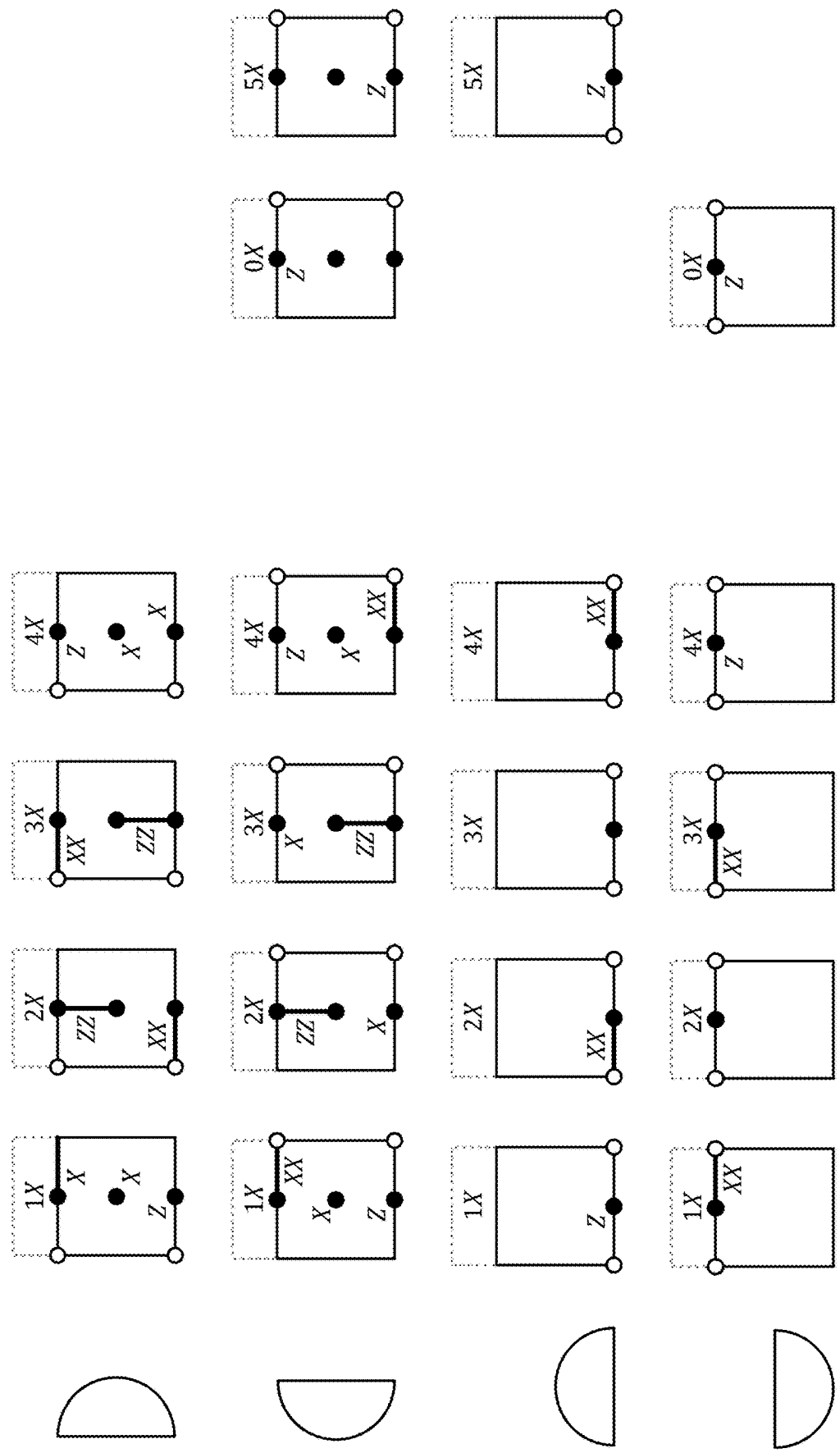
FIG. 13 shows aspects of example sets of projective measurements applied to a 2-gon X-type plaquette.
Figure 14:
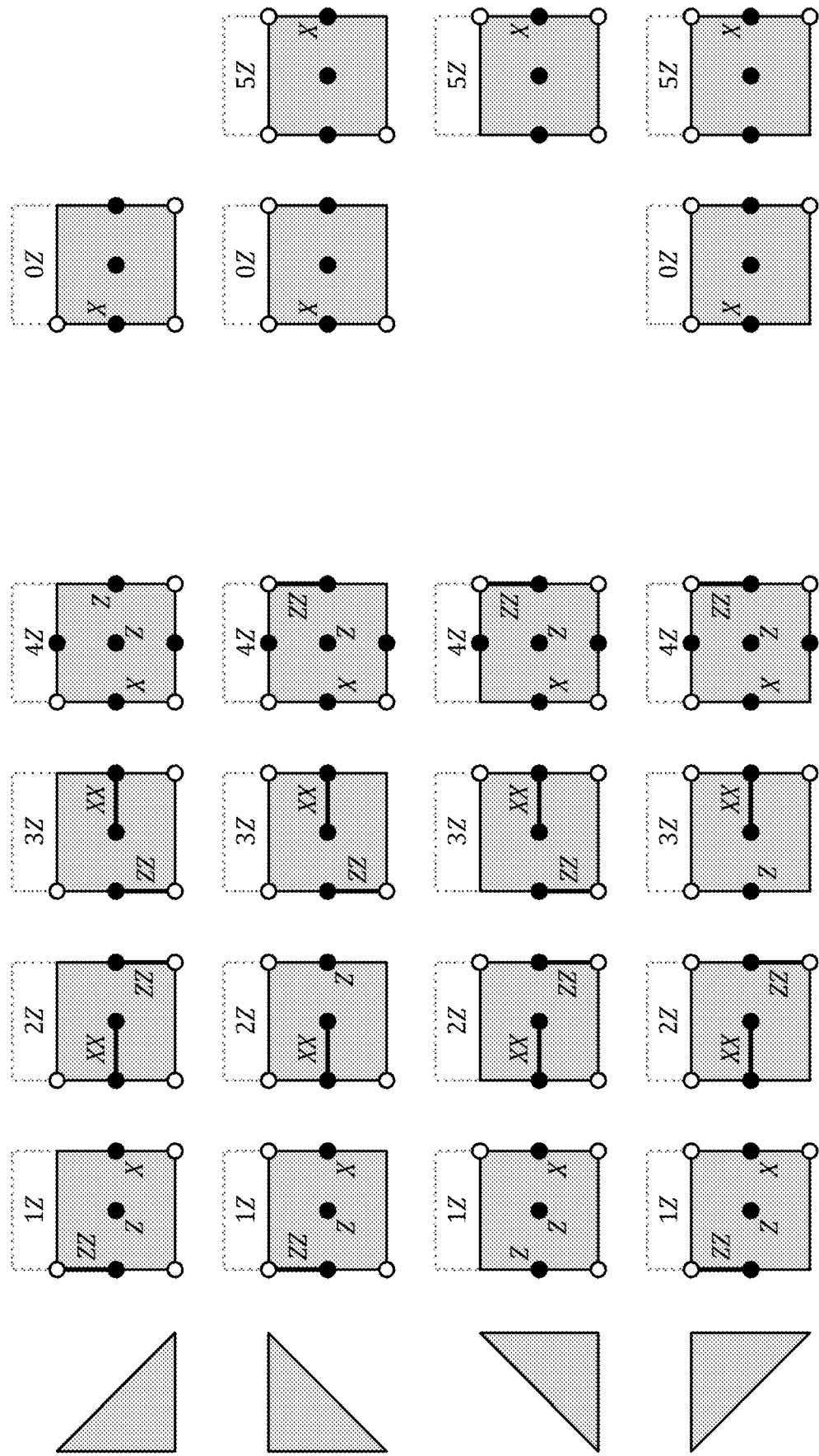
FIG. 14 shows aspects of example sets of projective measurements applied to a 3-gon Z-type plaquette.
Figure 15:
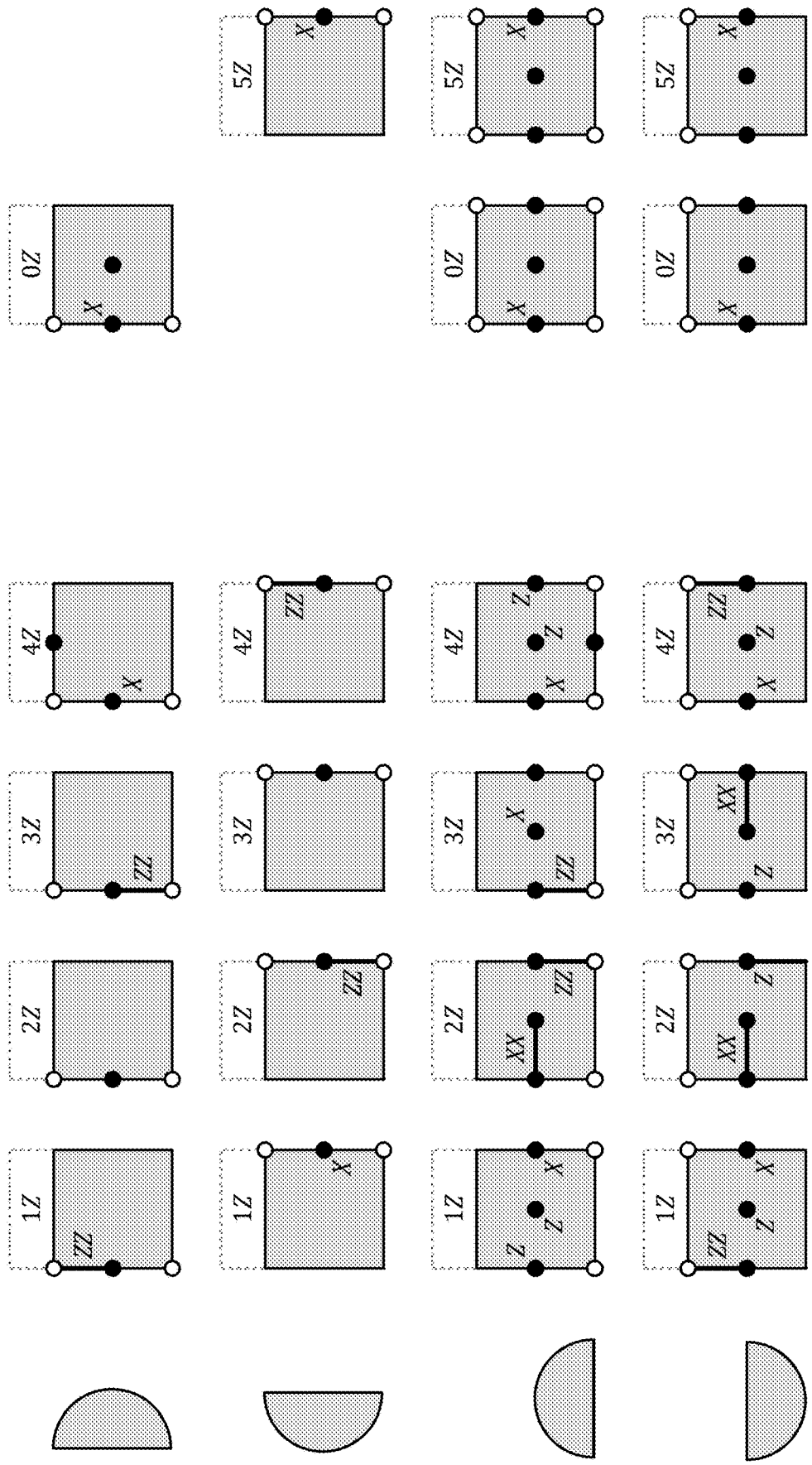
FIG. 15 shows aspects of example sets of projective measurements applied to a 2-gon Z-type plaquette.

The tactic of reducing projective measurements for which no corresponding qubit exists in a boundary plaquette is illustrated by example in FIGS. 12, 13, 14, and 15, which show the resulting sets of measurements for a non-rotated boundary 3-gon X-type plaquette, a rotated boundary 2-gon X-type plaquette, a non-rotated boundary 3-gon Z-type plaquette, and a rotated boundary 2-gon Z-type plaquette, respectively. In FIG. 12, for instance, in the 1X measurement of the top row, measurement of the corresponding internal plaquette would have included an $M_{XX}$ measurement connecting the north auxiliary qubit and the northeast data qubit. However, since there is no northeast data qubit in the boundary plaquette, the north auxiliary qubit is measured alone, via an $M_X$ measurement.

As noted above, various measurement circuits, including circuits 50Z and 50X are susceptible to hook errors. A hook error can be defined as a circuit-noise error equivalent to a two-qubit error on the data qubits. FIG. 16 shows aspects of four different hook errors corresponding to pairs of data qubits that connect to the same auxiliary qubit. The incidence of the various hook errors, and the effect of the hook errors on surface-code performance, relates to the implementation details of the measurement circuit. Hook errors that align to the corresponding logical operators of the encoded logical qubits can erode the efficiency of quantum error correction by reducing the effective code length of the surface code by a factor of two. In measurement circuits 50Z and 50X the hook errors are aligned in one direction only. It is therefore possible to arrange at least the internal plaquettes so that all of the hook errors align perpendicular to the logical-operator directions for the rotated surface code for logical memory (i.e., logical idle). This would not be possible for certain other types of surface code realizations, such as the pentagonal tiling realization of Gidney, which exhibits hook errors in both x and z directions.

Figure 17:
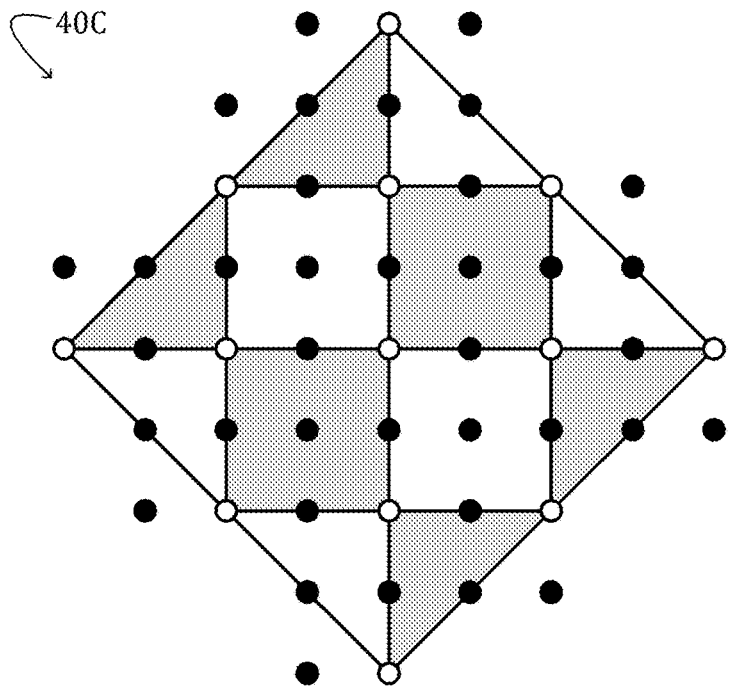
FIG. 17 shows aspects of an example qubit lattice using non-rotated boundaries for surface-code implementations.
Figure 18:
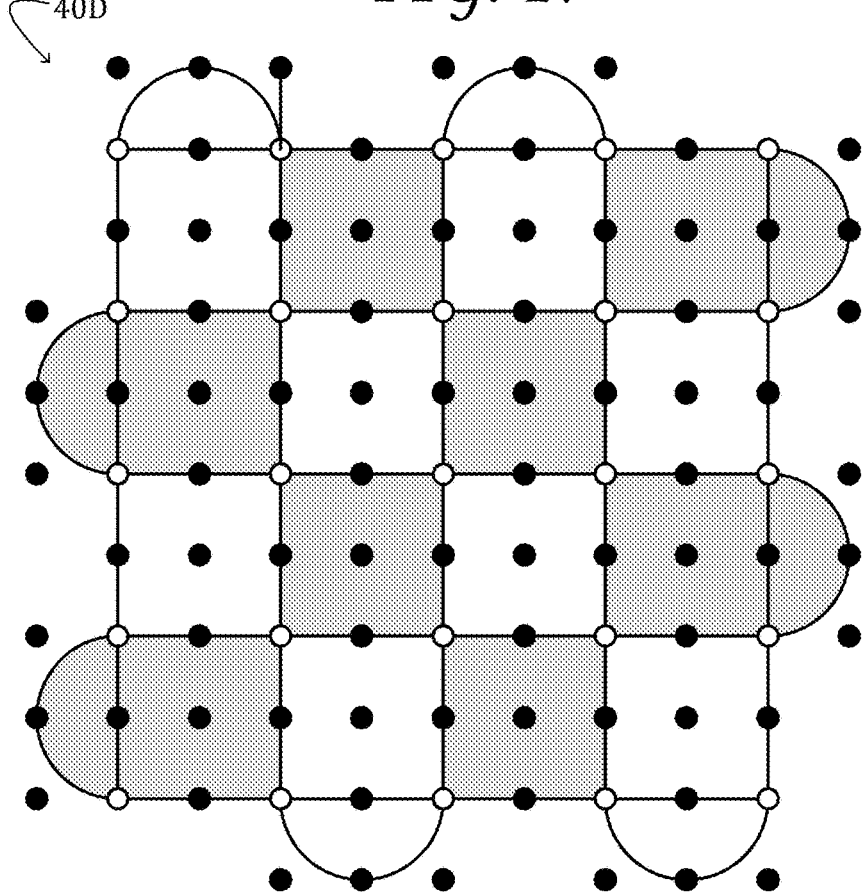
FIG. 18 shows aspects of an example qubit lattice using rotated boundaries for surface-code implementations.

In many examples it is also possible to select boundary conditions such that the hook errors align perpendicular to the logical-operator directions. If those conditions are achieved, then the stabilizer-code distance is preserved. The skilled reader will understand that the number of qubits N needed to realize a given stabilizer code is related directly to the effective code distance d of a code patch. In that spirit, FIGS. 11 and 17 show good boundary choices for preserving the stabilizer-code distance. In FIG. 11, the boundaries are chosen to correspond to the 'rotated' surface code patch, such that $N=4\ d^2-4\ d+1$. Thus, only 25 qubits are needed for d=3. FIG. 17 shows another good boundary choice for lattice 40C, using boundaries corresponding to the Bravyi-Kitaev (non-rotated) surface code patch, where $N=8\ d^2-8\ d+1$. By contrast, FIG. 18 shows a poor boundary choice for lattice 40D, using boundary conditions corresponding to a rotated surface code patch which limits the code distance due to hook errors. Here, $N=16\ d^2+4\ d-5$.

5. Hook-Error Detection

In some scenarios it may not be possible to select boundary conditions that align all of the hook errors perpendicular to the logical operator directions. In other words, some of the logical-gate operations may involve steps during which the logical qubit operators are not unidirectional, and hence the hook errors cannot be aligned to be perpendicular to them. A solution applicable to those scenarios, and potentially useful for other scenarios as well, is to incorporate hook-error detecting modifications in the measurement circuits.

Figure 19:
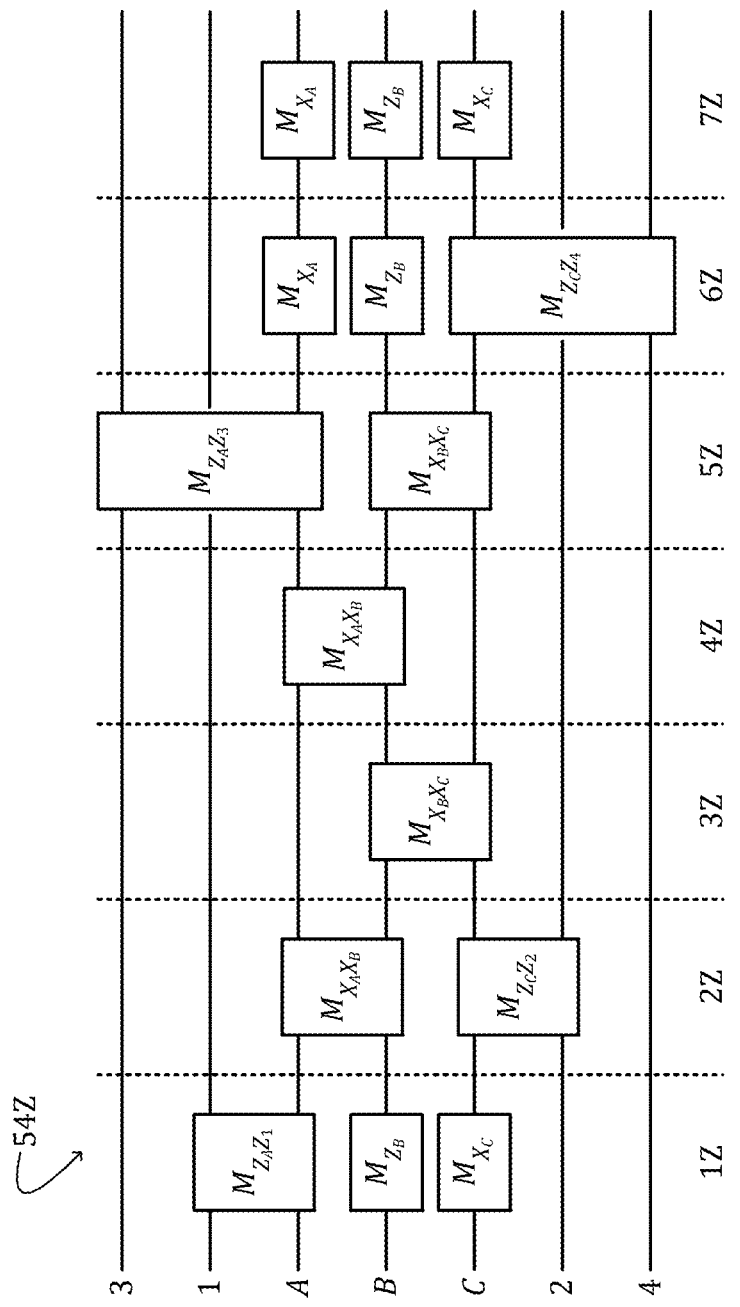
FIG. 19 and FIG. 20 show aspects of example hook-detecting measurement circuits for enacting concurrent surface-code measurements on alternating qubit plaquettes.
Figure 20:
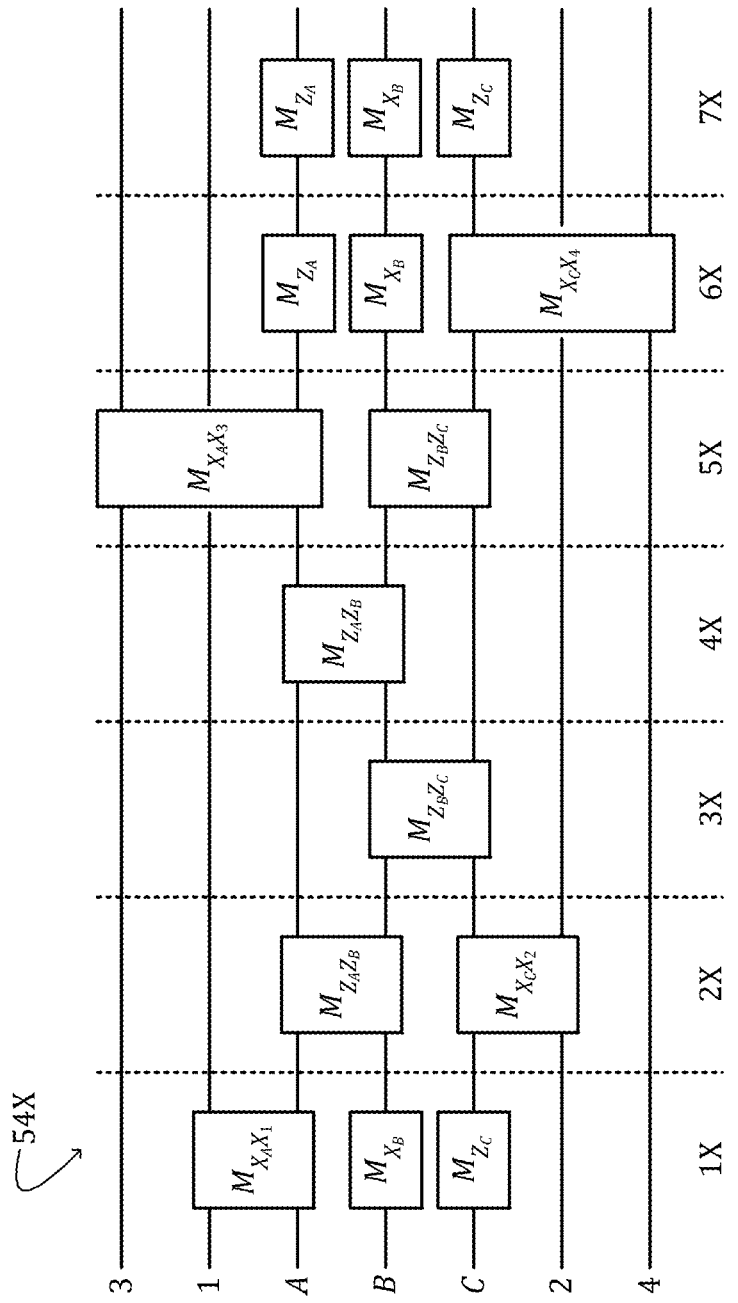
Figure 21:
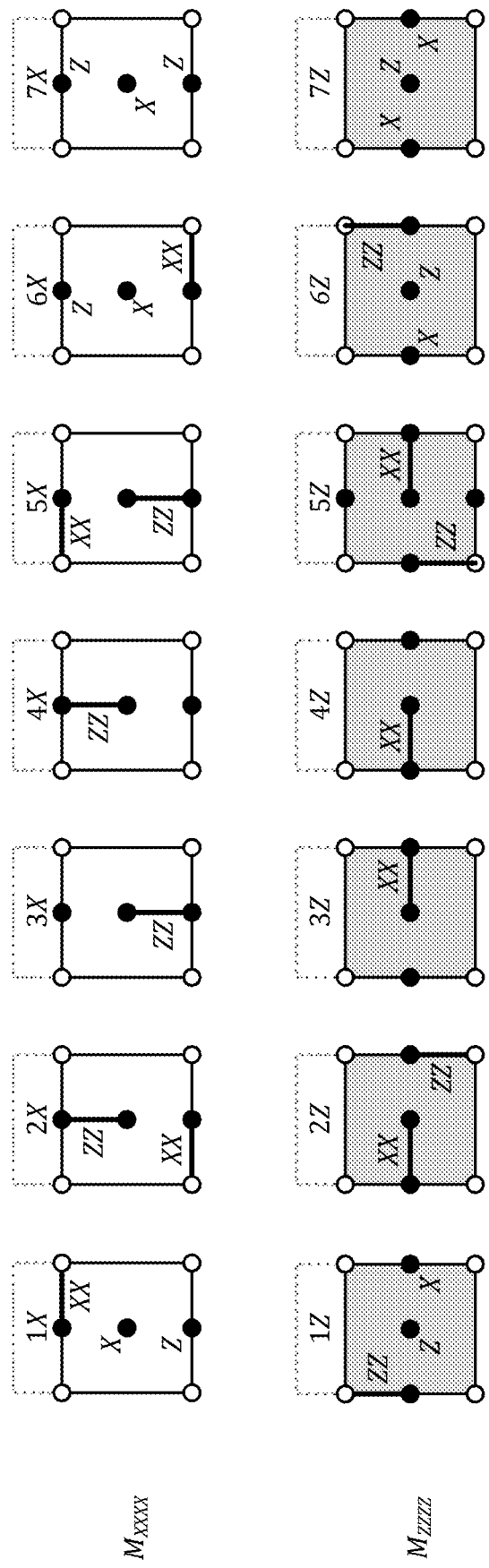
FIG. 21 shows aspects of one- and two-qubit projective measurements for the hook-detecting measurement circuits of FIG. 19 and FIG. 20.

This feature is illustrated in FIG. 19, which shows the repeating portion of a sequenced hook-detecting measurement circuit 54Z, akin to circuit 50Z of FIG. 7. The modifications relative to circuit 50Z, which include additional measurements and sequence modification, prevent the hook errors from occurring, such that no circuit-noise error is equivalent to a two-qubit error on the data qubits. In measurement circuit 54Z two time steps are added to the middle of the sequence, and the one-qubit measurements on auxiliary qubits A and C are repeated. Adding the extra measurements increases the periodicity to seven repeating steps but detects the errors that otherwise would have led to hook errors. FIG. 20 shows analogous hook-error measurement circuit 54X, applicable to X-type plaquettes. Measurement circuit 54X is obtained by exchanging x for z in all measurements of measurement circuit 54Z. FIG. 21 shows the one- and two-qubit projective measurements of measurement circuits 54Z and 54X.

In some examples, complementary hook-detection circuits 54Z and 54X can be enacted concurrently in seven repeating time steps—i.e., period seven. Indeed this disclosure contemplates several ways of pipelining the measurements of modified measurement circuits 54Z and 54X in seven repeating time steps:

1: (1Z, 6X), (2Z, 7X), (3Z, 1X), (4Z, 2X), (5Z, 3X), (6Z, 4X), (7Z, 5X), for r rounds in 7 r+3 steps;
2: (1Z, 5X), (2Z, 6X), (3Z, 7X), (4Z, 1X), (5Z, 2X), (6Z, 3X), (7Z, 4X), for r rounds in 7 r+4 steps;
3: (1Z, 4X), (2Z, 5X), (3Z, 6X), (4Z, 7X), (5Z, 1X), (6Z, 2X), (7Z, 3X), for r rounds in 7 r+4 steps;
4: (1Z, 3X), (2Z, 4X), (3Z, 5X), (4Z, 6X), (5Z, 7X), (6Z, 1X), (7Z, 2X), for r rounds in 7 r+3 steps.

It will be noted that one-qubit measurements on auxiliary qubit B need only be repeated twice, not three times, so that measurement can be removed from one of the steps. Hook-detecting measurement circuits can also be constructed for other tilings, according to the principles herein. Examples include the pentagonal tiling of Gidney. In that case, however, hook detection merely converts all of the bidirectional hooks into unidirectional hooks, which, under suitable conditions, can be aligned perpendicular to the logical-operator direction.

Figure 22:
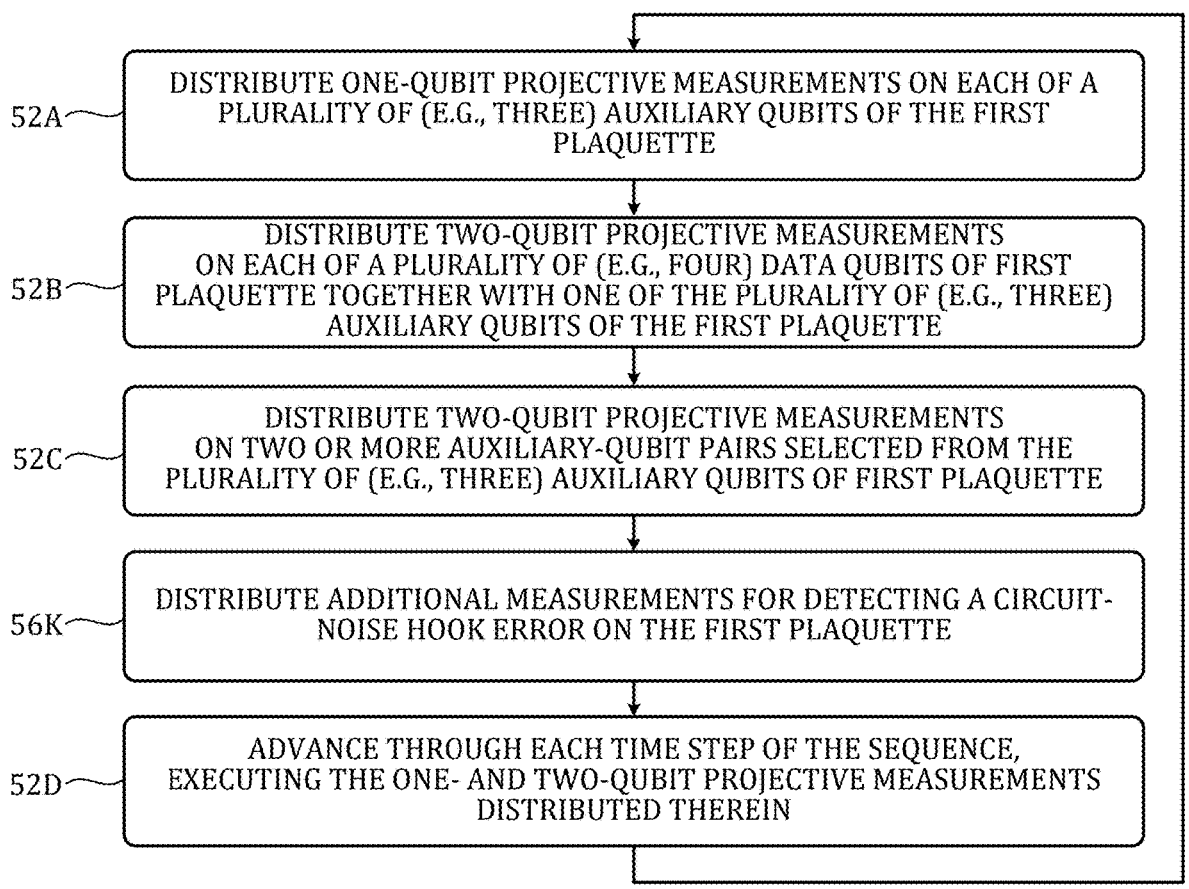
FIG. 22 shows aspects of another example method for enacting a measurement circuit of a surface code on a plaquette of qubits of a qubit lattice.

FIG. 22 shows aspects of an example method 56 for enacting a measurement circuit of a surface code on a plaquette of qubits of a qubit lattice. Method 56 is derived from method 52 of FIG. 9 by including hook detection in the first measurement circuit. As noted previously, hook errors in the measurement circuits herein can often be aligned perpendicular to corresponding logical operators, in order to preserve the stabilizer-code distance. For cases where complete alignment is not possible, however, method 56 includes, at 56K the step of distributing additional measurements for detecting a circuit-noise hook error. In some examples, the measurement circuit of method 56 is enacted in a sequence including seven repeating time steps. Method 56 can readily be extended to enacting a complementary pair of measurement circuits on adjacent plaquettes, by including steps analogous to 52E through 52G of method 52.

6. Majorana-Tetron Implementation

The measurement circuits and associated principles of this disclosure are applicable to measurement-based Majorana-qubit platforms, such as a Majorana-tetron lattice. Relative to other qubit-lattice implementations, a rectangular lattice of Majorana-tetron qubits is relatively straightforward to make. On Majorana-qubit platforms, the required stabilizer measurements are native operations and may be the simplest set of measurements that can generate a quantum error-correcting code. Accordingly, such measurements will likely have the lowest error rates when applied to such platforms. As described hereinafter, implementation of the repeating surface-code measurements in the minimum number of time steps requires a double-rail semiconductor layout. Nevertheless, single-rail implementations also can be realized using only one additional time step in each case. Additional implementations are presented for hook-detecting circuit variants, with seven repeating time steps for double-rail layouts and eight repeating time steps for single-rail layouts.

In any topological quantum computer, the quantum state held in each qubit is a state of two or more braidable quasiparticles, or 'anyons', observed within a non-Abelian topological phase of matter. The world lines of different anyons are quantum mechanically forbidden from intersecting or merging. This feature forces their paths to form stable braids that pass around each other in space-time. Relative to trapped particles used in other types of quantum computers, anyon braids are more resistant to quantum decoherence.

A suitable one-dimensional topological-qubit architecture uses a semiconductor-superconductor heterostructure where superconductivity, strong spin-orbit coupling, and magnetic fields cooperate to form a topological, superconducting state that supports Majorana zero modes (MZMs). This architecture uses a 'measurement-only' method wherein a sequence of measurements has the same effect as the braiding operation noted above. It exploits a distinction between a 'fermion parity-protected topological phase' (the actual genus of the proposed heterostructure) and a true topological phase. Advantageously, topological charge in a fermion parity-protected topological phase can be manipulated by the process of electron tunneling into an MZM. Transport through a pair of MZMs can provide a measurement of their combined topological charge in the presence of a large charging energy. The MZMs are created at the ends of semiconductor-superconductor heterostructures tuned into a topological regime by the appropriate magnetic field and gate voltages. A series of practical implementations are described in Karzig et al., *Scalable Designs for Quasiparticle-Poisoning-Protected Topological Quantum Computation with Majorana Zero Modes*, arXiv:1610.05289v4 [cond-mat.mes-hall]21 Jun. 2017. Suitable heterostructure materials and material properties are described in Lutchyn et al., Majorana *Fermions and a Topological Phase Transition in Semiconductor-Superconductor Heterostructures, arXiv:* 1002.4033v2 [cond-mat.supr-con]13 Aug. 2010. The entirety of both of the above references is hereby incorporated by reference herein, for all purposes.

Example implementations include at least two topological superconducting segments in a qubit, totaling at least four MZMs per qubit. The states used for quantum computation are the degenerate ground states of the qubit, in contrast to non-degenerate quantum-computing architectures where the two states of the qubit have different energies. The degeneracy of the qubit states and the spatial separation of the MZMs contribute, potentially, to long coherence times and enable precise application of Clifford gates.

Figure 23:
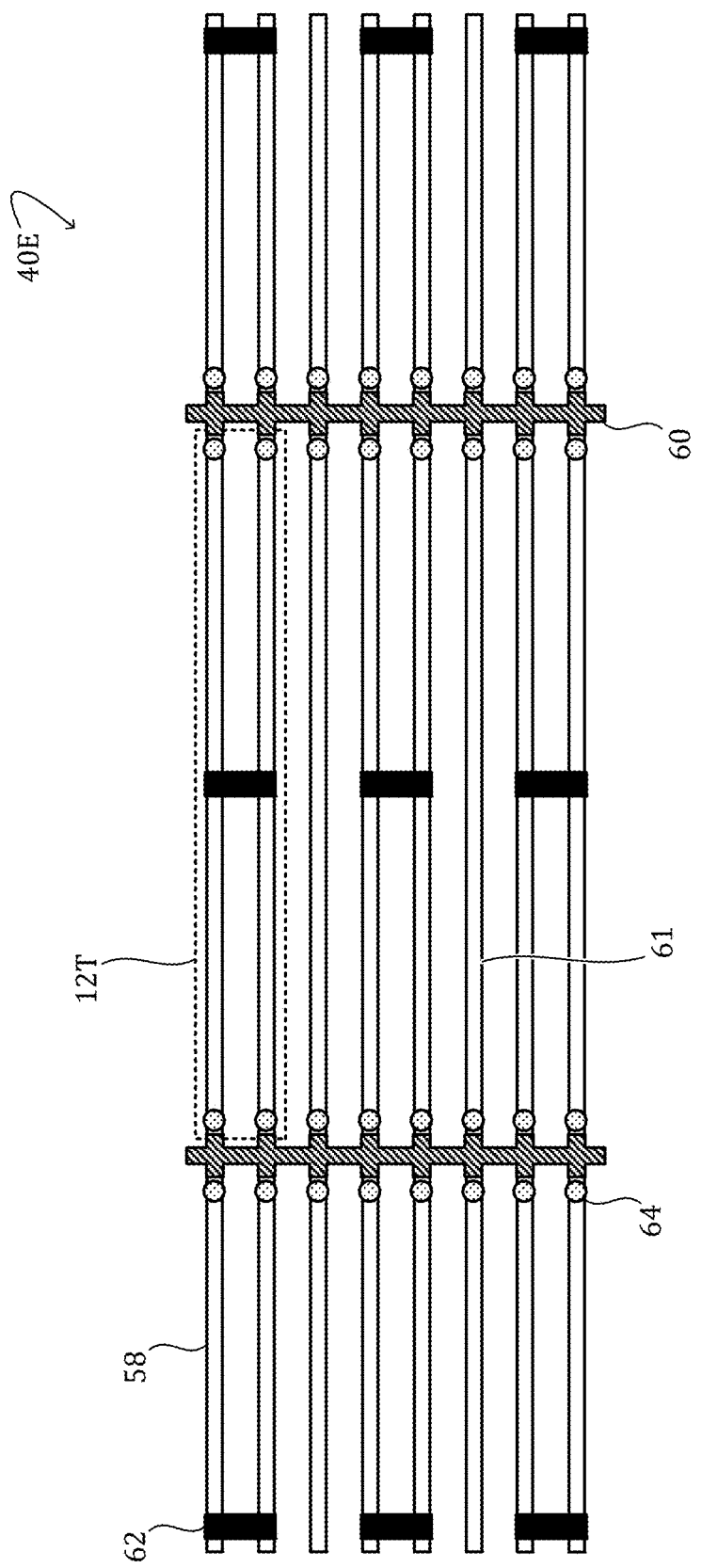
FIG. 23 shows aspects of an example of a topological qubit architecture comprising a Majorana-tetron lattice 40E.

FIG. 23 illustrates an example of a topological qubit architecture comprising a Majorana-tetron lattice 40E. The illustrated lattice includes a matrix of mutually parallel, elongate segments 58 comprising a topological superconductor. The segments of each row of the matrix connect at each end to one of a plurality of semiconductor rails 60 aligned perpendicular to the segments. In some examples the semiconductor comprises indium arsenide or indium antimonide. A bridge 62 of a non-topological semiconductor, such as aluminum, bridges adjacent pairs of segments in every column of the matrix. Adjacent tetrons of each column are separated by a series of coherent links 61, which may take the form of a free-standing, unbridged wire. The lattice is maintained at cryogenic temperatures and arranged between the poles of a magnet (not shown in the drawings). In this configuration, a plurality of MZMs 64 form on the topological-superconductor segments 58, proximate to semiconductor rails 60. The length $\ell_c$ of the non-topological segments is much larger than the corresponding coherence length $\xi_c$ of the non-topological regions, and the length $\ell_t$ of the topological segments is much larger than the coherence length $\xi$ of the topological regions. The dashed box in FIG. 23 represents a single qubit 12T in the form of a tetron of MZMs. Additional topological superconducting links and semiconducting structures allow appropriate measurements to manipulate and entangle the tetrons.

Figure 24:
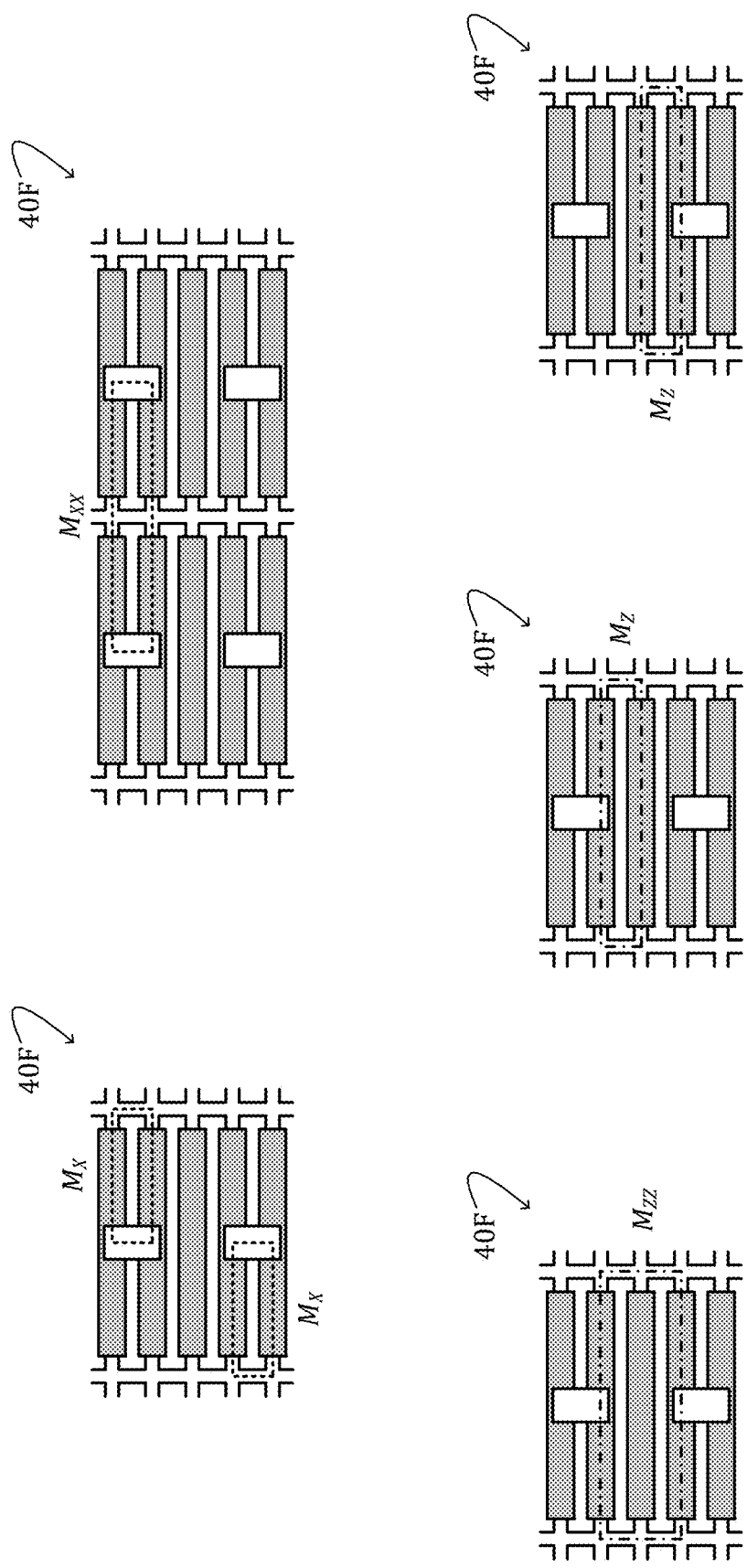
FIG. 24 shows aspects of an example Majorana-tetron lattice with inscribed projective measurement loops.

FIG. 24 shows aspects of another example Majorana-tetron lattice 40F. The simplest measurements for a Majorana-based tetron qubit correspond to the measurement loops inscribed in the five lattice portions of the drawing. These are the same measurements invoked in measurement circuits 50Z and 50X when implemented on lattice 40F. In all of the drawings the measurements corresponding to the X-type plaquettes are shown in dashed lines, while the measurements corresponding to the Z-type plaquettes are shown in dot-dashed lines. Significantly, the two-qubit measurements $M_{XX}$ and $M_{ZZ}$ are achieved using the simplest possible measurement loops through the tetrons and require no coherent links. By contrast, alternative measurement loops such as $M_{YY}$ and $M_{XZ}$ would be longer and may require coherent links. The only coherent link appearing in FIG. 24 is for the $M_Z$ measurement.

Figure 25:
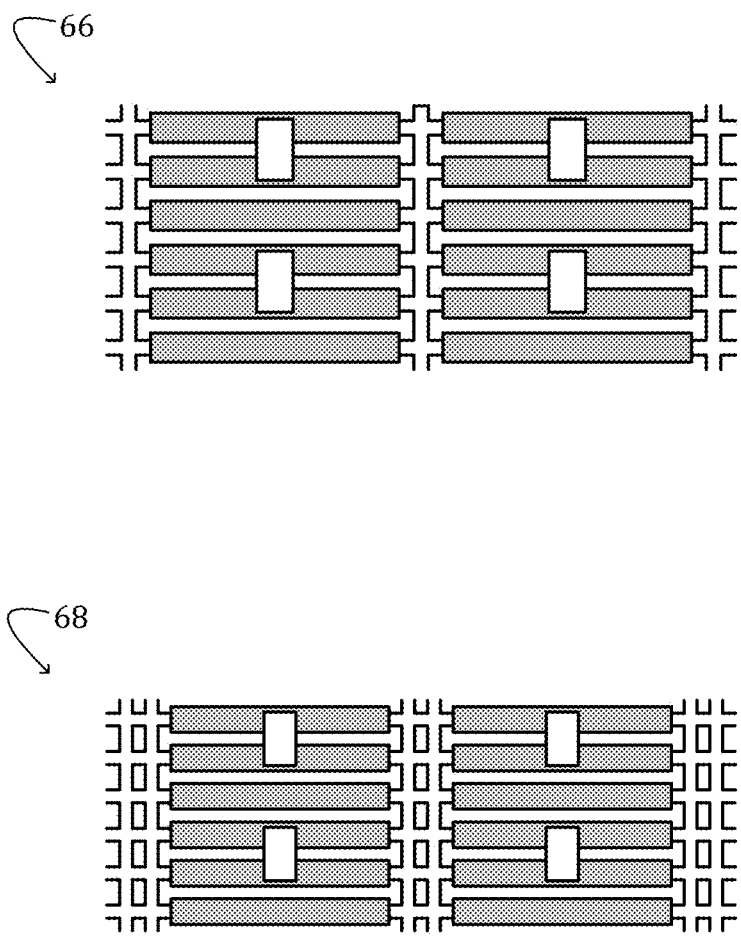
FIG. 25 shows aspects of an example single-rail layout and an example double-rail layout for implementing a Majorana-tetron lattice.

FIG. 25 shows two useful layouts for implementing a Majorana-tetron lattice: single-rail semiconductor layout 66 and double-rail semiconductor layout 68, where each single rail has been replaced by a pair of interconnected rails. Each layout presents certain advantages and disadvantages relative to the other. Single-rail layout 66 requires fewer gates, control lines, and resonators, and may be the easier layout to fabricate. Double-rail layout 68 eliminates conflicting interference loops in the z direction, allowing for more measurements to be performed in parallel. Accordingly, adjacent qubits can be simultaneously measured, which may result in more time-efficient execution of a measurement circuit.

Figure 26:
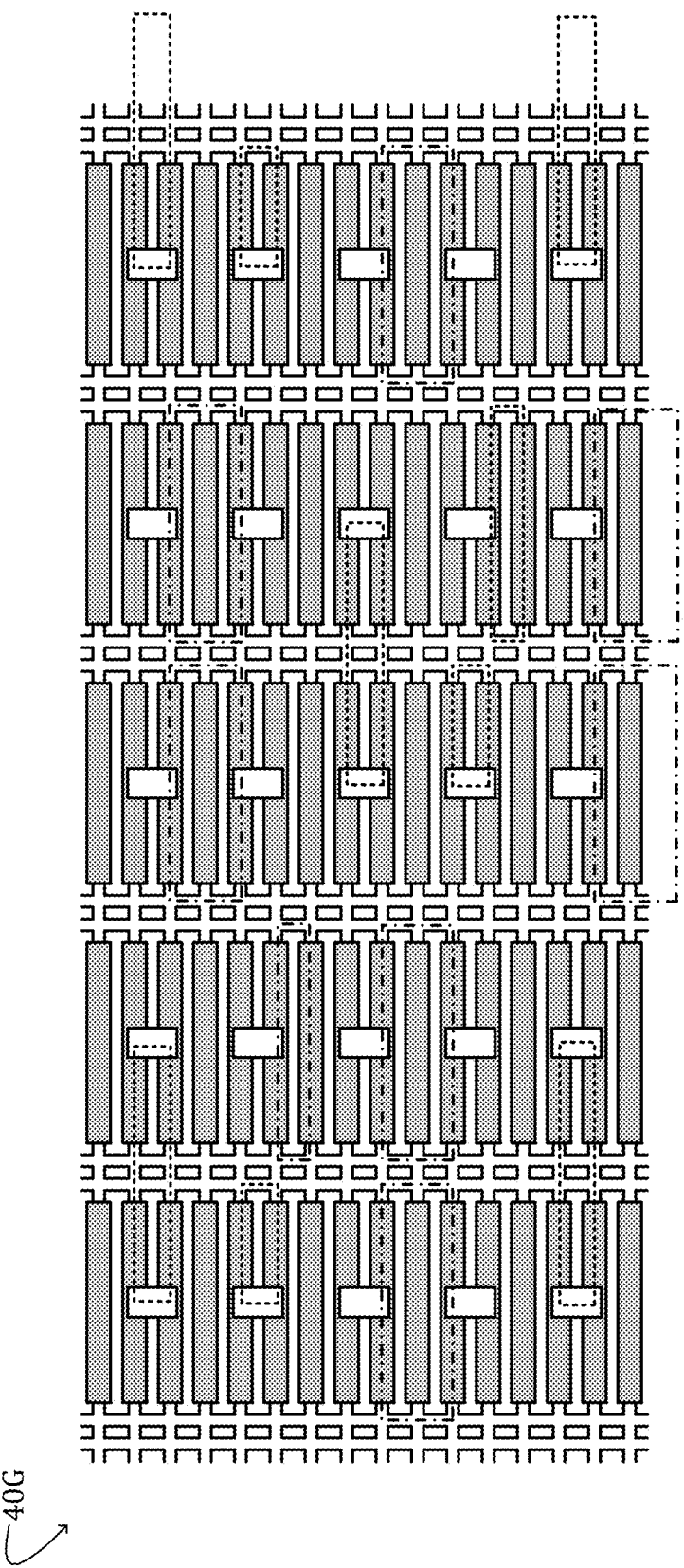
FIG. 26 shows aspects of an example double-rail Majorana-tetron lattice with inscribed projective measurement loops.

FIG. 26 shows aspects of an example double-rail Majorana-tetron lattice 40G. This drawing shows the arrangement of certain measurement loops in the pipelined, Majorana-tetron implementation of measurement circuits 50Z and 50X. More specifically, the outlined measurement loops correspond to the fourth repeating time step of the (1Z, 3X), (2Z, 4X), (3Z, 1X), (4Z, 2X) sequence indicated for measurement circuits 50Z and 50X—viz., the (4Z, 2X) measurement. In FIGS. 26 through 29, the loops that go outside of the tetron lattice are meant to include unshown tetrons in the continuation of the lattice. It is evident from the positions of the measurement loops that there is no opportunity for any loop to interfere with its neighbor, even when neighboring loops address adjacent qubits. By referring to the plaquette measurements in FIG. 10, the reader can readily confirm that there is also no opportunity for loop conflicts in any of the remaining time steps either.

Figure 27:
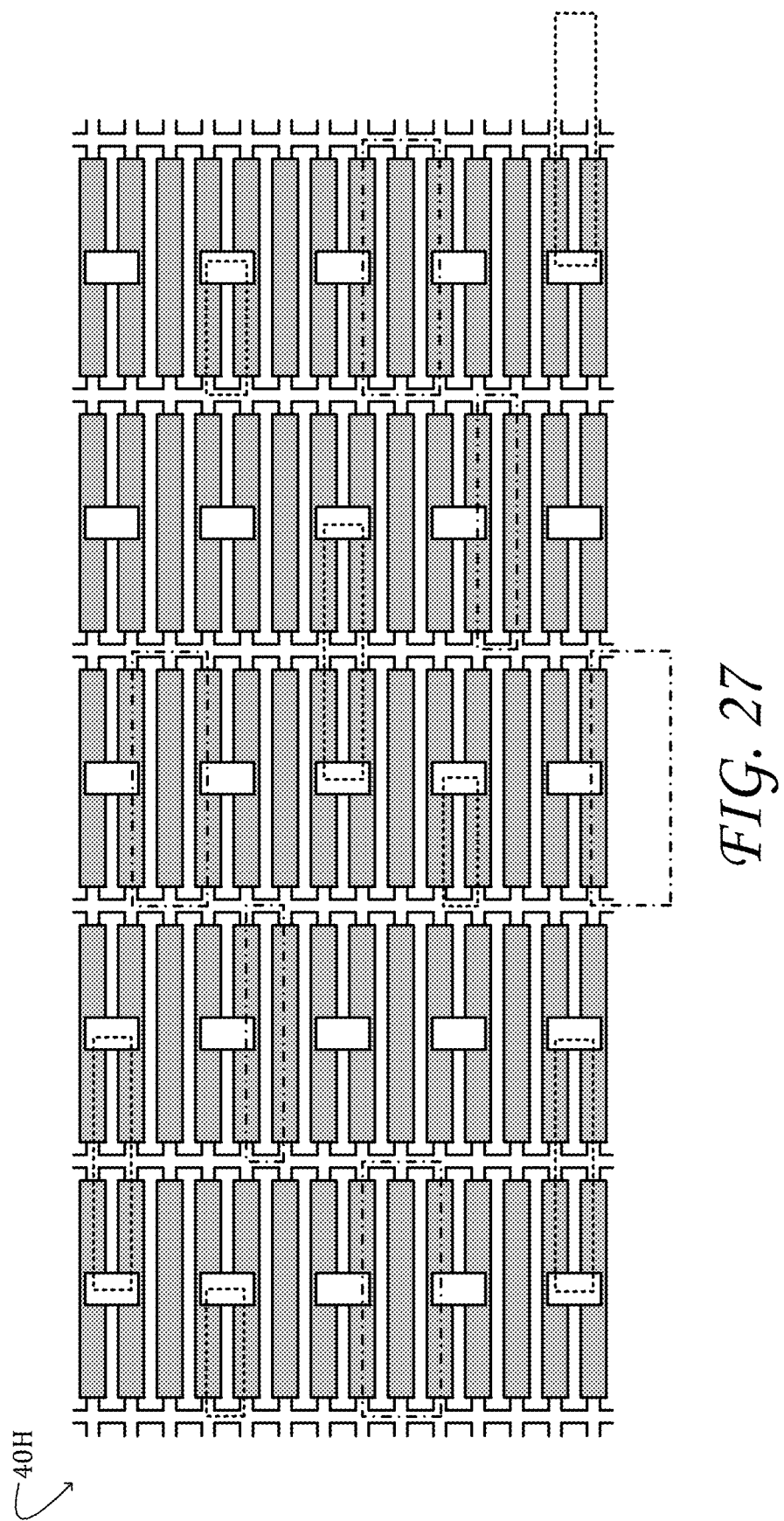
FIG. 27 shows aspects of an example single-rail Majorana-tetron lattice with inscribed projective measurement loops.

It is apparent from FIG. 26, however, that if the double-rail layout of lattice 40G were replaced by a corresponding single-rail layout, then certain pairs of adjacent measurement loops in the third and fourth columns would interfere with each other. Accordingly, in order to extend the functionality of measurement circuits 50Z and 50X to the single-rail layout, a modified sequencing for these circuits is proposed. In particular, the repeating portions of measurement circuits 50Z and 50X can be executed in five time steps instead of four. The modified sequence is (1Z, 3X)', (2Z, 4X), (3Z, 1X), (4Z, 2X)', (4Z, 2X)". In this modified sequence the middle auxiliary $M_Z$ measurement from (1Z, 3X) is moved to (4Z,2X)". The original (4Z, 2X) time step is split into steps comprising (4Z, 2X)', and the one-qubit $M_Z$ measurement from (1Z, 3X) is added into (4Z,2X)". The result of the modification is represented in FIG. 27, which shows the (4Z,2X)" time step on single-rail lattice 40H, free from conflicts.

Figure 28:
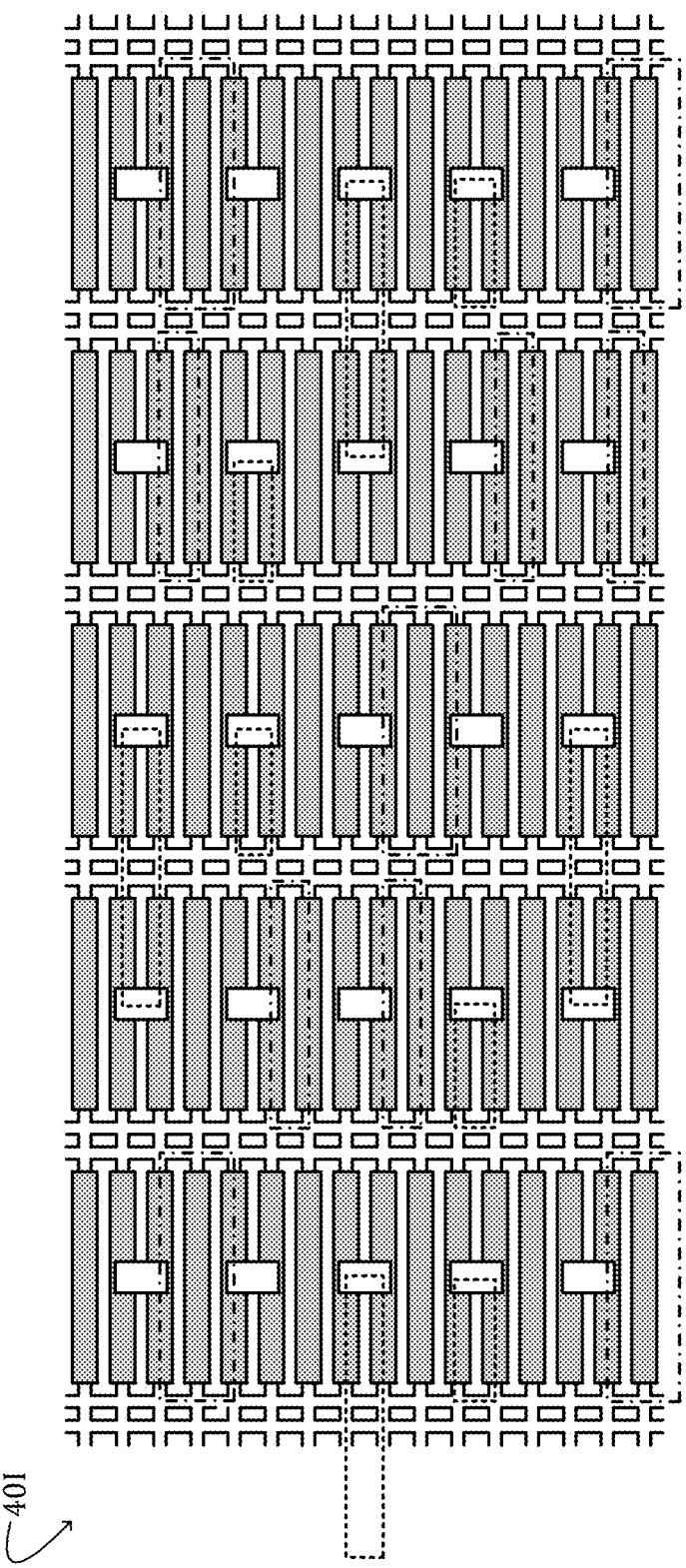
FIG. 28 shows aspects of another example double-rail Majorana-tetron lattice with inscribed projective measurement loops.

Various other measurement circuits can be implemented on Majorana-tetron lattices, in addition to circuits 50Z and 50X. For example, hook-error detecting circuits 54Z and 54X (in FIGS. 19 and 20) can be implemented on a double-rail semiconductor layout using any of the seven-step pipeline options 1, 2, and 3 enumerated hereinabove. The reader will recall that option 1 is (1Z, 6X), (2Z, 7X), (3Z, 1X), (4Z, 2X), (5Z, 3X), (6Z, 4X), (7Z, 5X). FIG. 28 shows only the (1Z, 6X) step on lattice 40I, which has adjacent measurement loops but no conflicts.

Figure 29:
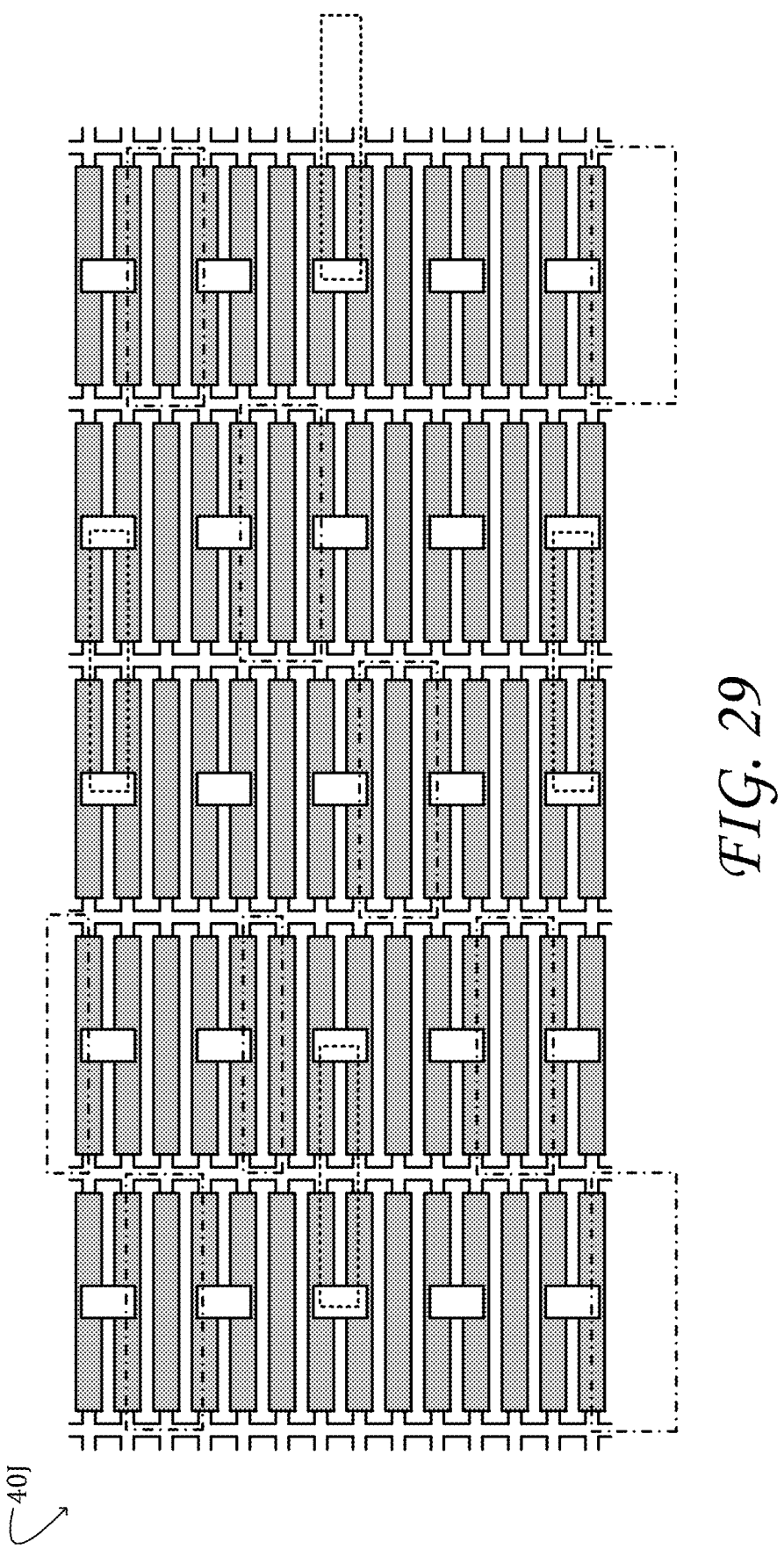
FIG. 29 shows aspects of another example single-rail Majorana-tetron lattice with inscribed projective measurement loops.

Again, as various conflicts would be apparent using a single-rail layout, a modified pipeline schedule is now proposed. The corresponding single-rail implementation is accomplished in eight pipelined time steps modified from option 2 hereinabove: (1Z', 5X), (2Z, 6X), (3Z, 7X), (4Z, 1X), (5Z, 2X), (6Z', 3X), (7Z, --), (7Z', 3X). FIG. 29 shows the conflict-free (1Z',5X) time step implemented on the single-rail layout 40J.

Figure 30:
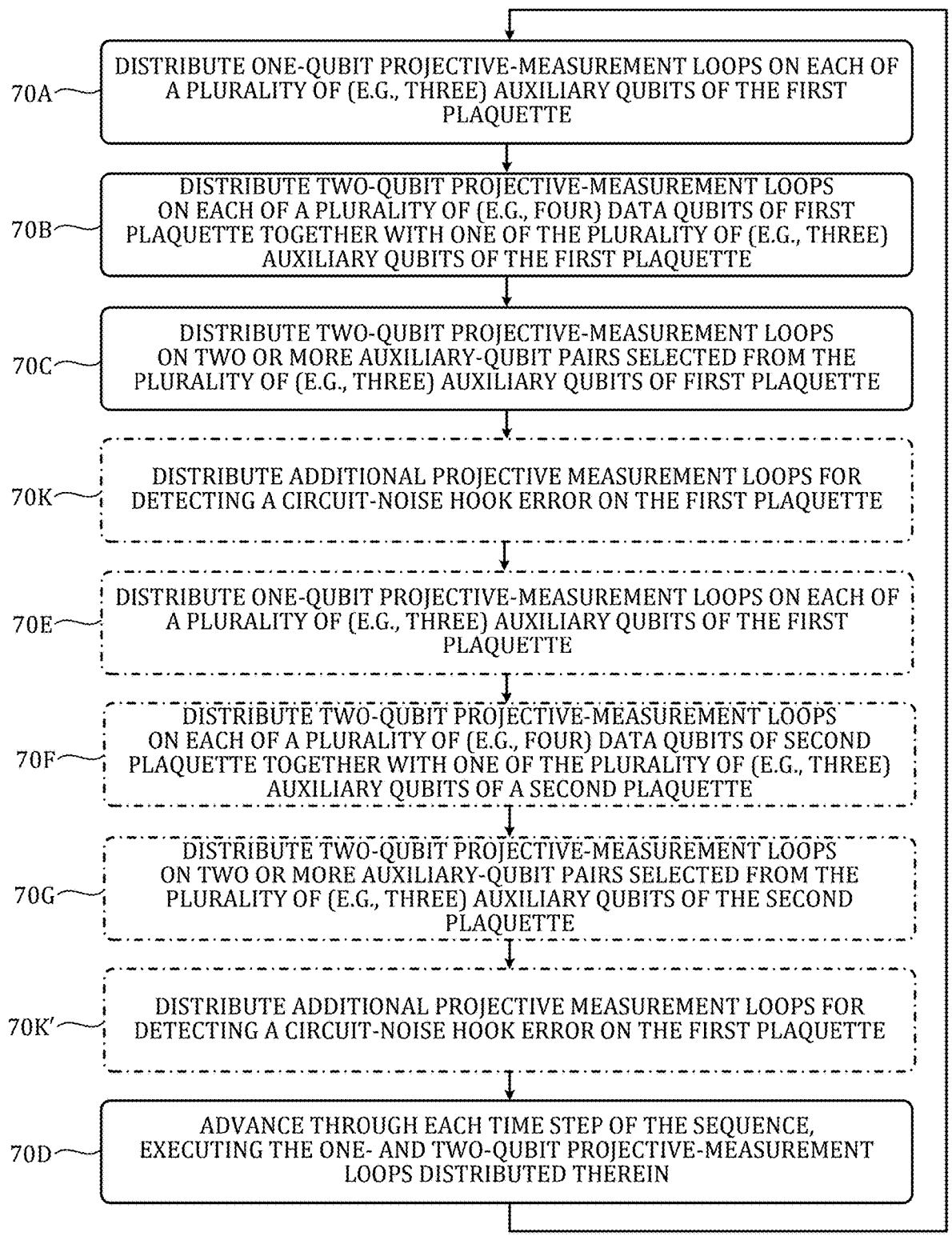
FIG. 30 shows aspects of an example method for implementing a measurement circuit of a surface code on a plaquette of qubits of a Majorana-tetron lattice.

FIG. 30 shows aspects of an example method 70 for implementing a measurement circuit of a surface code on a first plaquette of qubits of a Majorana-tetron lattice. The method can be executed on a quantum computer comprising such a lattice. Generally speaking, the lattice is supported on a matrix of parallel, elongate segments of a topological superconductor, wherein the segments of each row of the matrix connect at each end to one of a plurality of semiconductor rails aligned perpendicular to the segments, and wherein a bridge of a non-topological superconductor bridges adjacent pairs of segments in every column of the matrix. As in the foregoing methods, the quantum computer has an interface configured to enact a measurement circuit of a surface code on a plaquette of qubits of the qubit lattice.

At 70A of method 70, the stabilizer code distributes among a sequence of time steps a set of one-qubit projective-measurement loops on each of three auxiliary qubits of the first plaquette. Each of the one- and two-qubit projective-measurement loops of method 70 generating measurement of a stabilizer operator of the surface code. At 70B the stabilizer code distributes among the sequence of time steps a set of two-qubit projective-measurement loops on each of four data qubits, together with one of the three auxiliary qubits, of the first plaquette. At 70C the stabilizer code distributes among the sequence of time steps a set of two-qubit projective-measurement loops on two or more auxiliary-qubit pairs selected from the three auxiliary qubits of the first plaquette. In some examples every circuit-noise hook error, equivalent to an error on two of the data qubits, can be aligned perpendicular to corresponding logical operators of the measurement circuit. For cases where not all hook errors can be eliminated, method 70 includes optional step 70K where the stabilizer code distributes additional measurement loops for detecting a circuit-noise hook error. At 70D the stabilizer code advances through each of the time steps of the sequence, executing the one- and two-qubit projective-measurement loops distributed therein. In typical stabilizer-code implementations the foregoing method steps are repeated for any, some, or all of the alternating plaquettes of the lattice, sequentially or in parallel.

Steps 70A-C and 70K setup a measurement circuit corresponding to a stabilizer of the surface code, such as Z-type. Complementary steps 70E-G and 70K' set up the complementary measurement circuit corresponding to the stabilizer of the surface code, such as X-type. Accordingly, method 70 is also a method for enacting complementary measurement circuits of a surface code on adjacent first and second plaquettes of qubits of a qubit lattice. The first plaquette may be a Z-type plaquette and the first measurement circuit may be an $M_{zzzz}$ measurement circuit. The second plaquette may be an X-type plaquette adjacent to the first plaquette, and the second measurement circuit may be an $M_{xxxx}$ measurement circuit. The second measurement circuit corresponds to a stabilizer of the surface code. Generally speaking, the one- and two-qubit projective-measurement loops of the second measurement circuit are obtained from those of the first measurement circuit by a ninety-degree basis rotation and interchange of corresponding operators in the one- and two-qubit projective measurement loops.

As in the foregoing methods, the one- and two-qubit projective-measurement loops of the first and second measurement circuits are distributed so as to minimize the length of the sequence while subjecting no qubit to more than one distinct measurement in the same time step. In examples where optional steps 70K and 70K' are omitted and where the lattice is a double-rail lattice (with each rail connecting to one column of segments and adjacent to another rail, which connects to an adjacent column of segments), the sequence includes four repeating time steps. In examples where optional steps 70K and 70K' are omitted and where the lattice is a single-rail lattice (with each rail connecting to segments of adjacent columns of the matrix), the sequence includes five repeating time steps.

In some examples the first plaquette is an internal plaquette and the second plaquette is a boundary plaquette having fewer than four data qubits. In that event, method 70 may include additional acts akin to steps 70E-G in FIG. 22, where at least one measurement for which there is no data qubit in the second plaquette is reduced from the one- and two-qubit projective-measurement loops of the second measurement circuit, which would otherwise be obtained from those of the first measurement circuit only by a ninety-degree basis rotation.

In examples where optional steps 70K and 70K' are included, where the lattice is a double-rail lattice, and where each rail connects to only one column of segments and is adjacent to another rail, which connects to an adjacent column of segments, the sequence includes seven repeating time steps. In examples where optional steps 70K and 70K' are included, where the lattice is a single-rail lattice, and where each rail connects to segments of adjacent columns of the matrix, the sequence includes eight repeating time steps.

7. Dead Qubit and Connection Management

Dead qubits are physical qubits 14 that are unusable for performing computations at a quantum computing device. For example, dead qubits may be faulty qubits that exhibit manufacturing defects or become damaged over the course of device operation. Thus, a dead qubit is treated as a vacancy in the lattice 40 during operation of the quantum computing device. Dead qubits may be data qubits 14D or auxiliary qubits 14A. As discussed in further detail below, the lattice 40 may also include collateral loss qubits that are not used in the stabilizer measurement circuits due to reductions of the lattice performed to remove dead components.

Despite the resulting vacancies in the lattice 40, error correction codes are still usable with lattices 40 that include dead qubits. Techniques have previously been developed by which a lattice 40 of qubits 14, and an error correction code applied to that lattice 40, may be adjusted to account for dead data qubits. However, such techniques substantially reduce the efficiency of the error correction code when applied to dead auxiliary qubits. Applying these prior approaches are applied to dead auxiliary qubits includes mapping the dead auxiliary qubits to a virtual set of dead data qubits and then computing a reduced lattice in which those virtual dead data qubits are removed. However, live data qubits are removed when reducing the lattice according to these prior techniques, thereby resulting a decrease in error correction code efficiency.

In light of this shortcoming of prior approaches, the devices and methods discussed below allow for implementation of an error correction code at a lattice 40 that includes both dead data qubits and dead auxiliary qubits. In addition, the error correction code may be implemented using the following systems and methods in a manner that avoids large reductions in the code distance of the error correction code.

Figure 31:
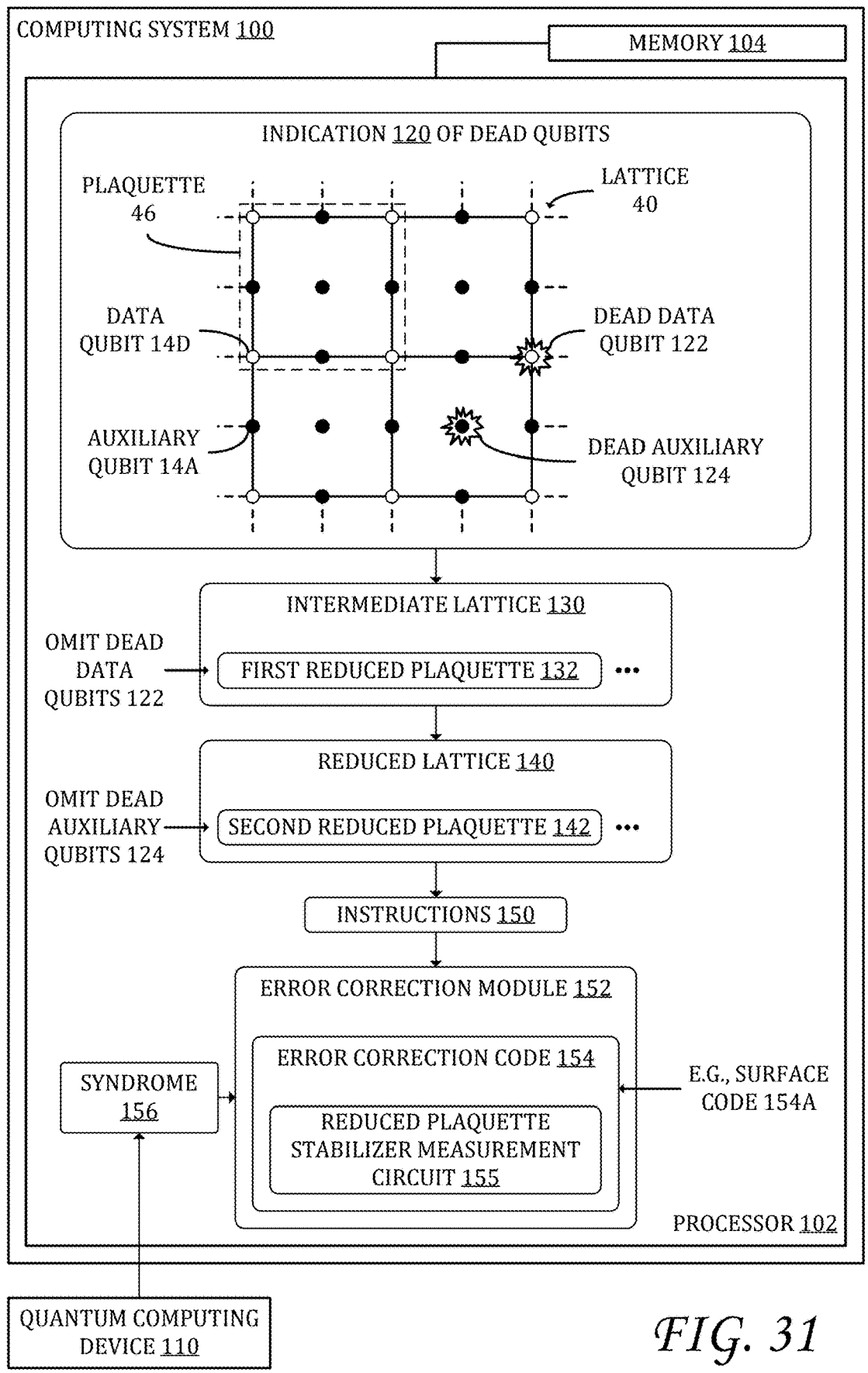
FIG. 31 schematically shows an example computing system that includes a processor and memory and is configured as a controller for a quantum computing device, according to the example of FIG. 1.

FIG. 31 schematically shows an example computing system 100 including a processor 102 and memory 104. This computing system 100 may be used as a controller 18 for a quantum computing device 110 at which the lattice 40 of qubits 14 is located. In some examples, the processor 102 and/or the memory 104 is instantiated in a plurality of physical processing devices and/or memory devices configured to communicate with each other.

The computing system 100 is shown when the processor 102 is configured to compute a reduced lattice 140 based at least in part on the lattice 40. The lattice 40 from which the processor 102 computes the reduced lattice 140 is a rectangular lattice in the example of FIG. 31. In the lattice 40, the qubits 14 are grouped into a plurality of plaquettes 46. Each of the plaquettes 46 includes a plurality of data qubits 14D and a plurality of auxiliary qubits 14A, as discussed above. In the example of FIG. 31, the plaquettes 46 are square plaquettes that each include four data qubits 14D located at the corners. Each plaquette 46 further includes three auxiliary qubits 14A that form either a vertical or horizontal line through the center of the square. Plaquettes 46 have vertical or horizontal lines of auxiliary qubits 14A corresponding to whether those plaquettes are X-type plaquettes or Z-type plaquettes, respectively. The plaquettes 46 are tiled within the lattice 40 such that the data qubits 14D and auxiliary qubits 14A located on the edges of the square are shared with adjacent plaquettes 46.

The processor 102 is configured to receive an indication 120 of a plurality of dead qubits included in the lattice 40. These dead qubits include one or more dead data qubits 122 and one or more dead auxiliary qubits 124. For example, the processor 102 may receive the indication 120 as a set of lattice coordinates of the dead qubits. The dead data qubits 122 and dead auxiliary qubits 124 identified in the indication are faulty qubits at which physical defects or damage have occurred. The identification of collateral loss qubits is performed using the indication 120 of the faulty qubits, as discussed in further detail below. In some examples, the indication 120 of the one or more dead data qubits 122 and the one or more dead auxiliary qubits 124 is generated as an output of a qubit quality assurance test performed subsequently to fabrication of the lattice 40.

Based at least in part on the indication 120 of the lattice coordinates of the dead qubits, the processor 102 is further configured to compute a reduced lattice 140 in which the dead qubits are omitted. As shown in the example of FIG. 31, computing the reduced lattice 140 may include computing an intermediate lattice 130 that includes a plurality of first reduced plaquettes 132. Computing the intermediate lattice 130 includes, for each of the plaquettes 46 that includes at least one dead data qubit 122 of the one or more dead data qubits 122, computing a respective first reduced plaquette 132 that omits the dead data qubit 122. Thus, the intermediate lattice 130 is a qubit lattice in which the dead data qubits 122 are treated as vacancies.

Figure 32A:
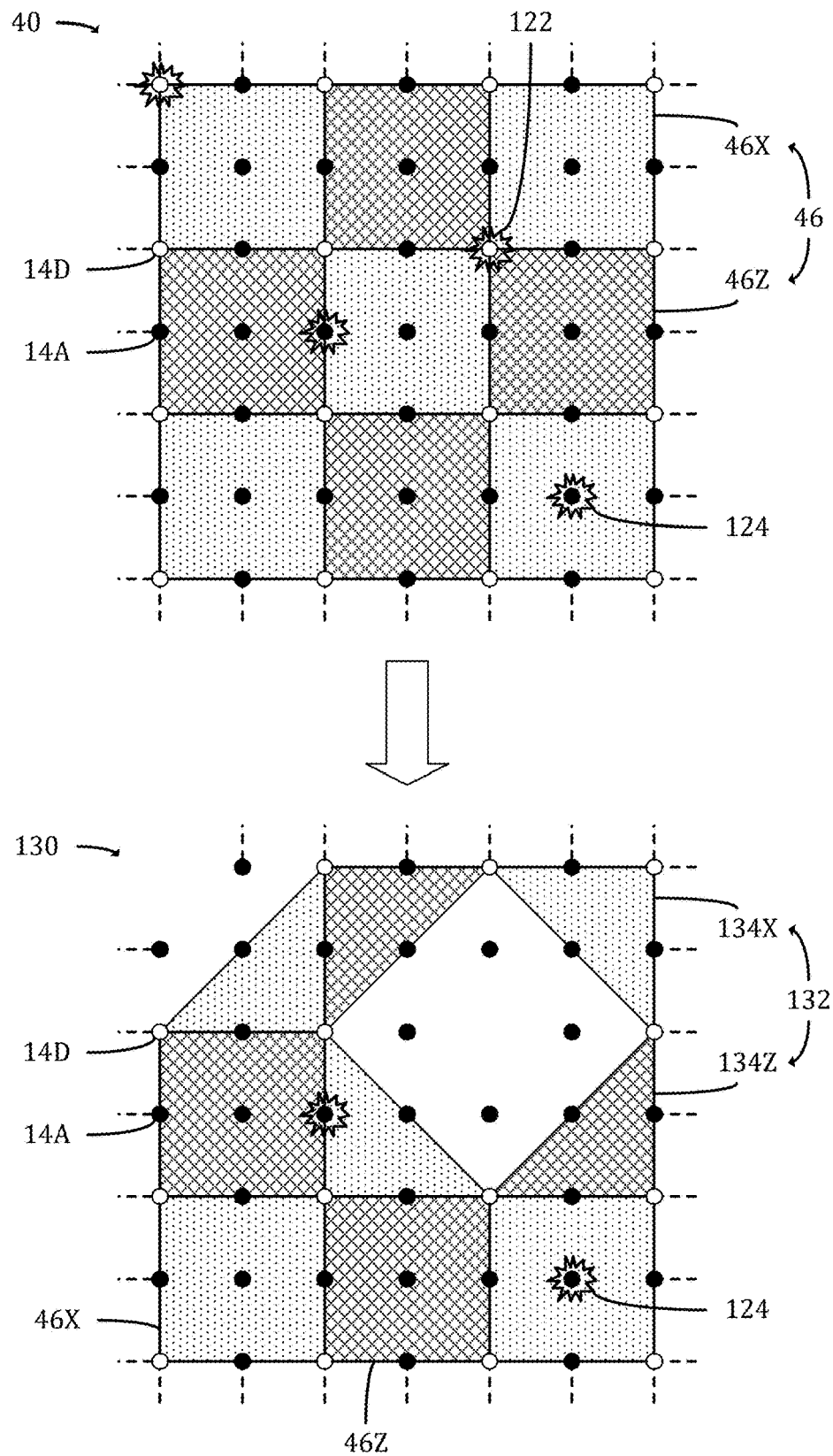
FIG. 32A schematically shows an example computation of an intermediate lattice from a rectangular lattice of qubits, according to the example of FIG. 31.

FIG. 32A schematically shows an example of the computation of an intermediate lattice 130 from a rectangular lattice 40 of qubits 14. In the example of FIG. 32A, the lattice 40 alternates between X-type plaquettes 46X and Z-type plaquettes 46Z. Measurements are performed at the X-type plaquettes 46X and Z-type plaquettes 46Z at successive timesteps, such that the measured operators at each timestep commute with each other. In the example of FIG. 32A, the auxiliary qubits 14A located on the top and bottom sides of the plaquettes 46 are used in the X-type measurements, and the auxiliary qubits 14A located on the lefthand and righthand sides of the plaquettes 46 are used in the Z-type measurements.

As shown in the example of FIG. 32A, the lattice 40 includes a plurality of dead data qubits 122 and a plurality of dead auxiliary qubits 124. When the intermediate lattice 130 is computed, the processor 102 is configured to omit the dead data qubits 122 from the intermediate lattice 130 to thereby form the plurality of first reduced plaquettes 132. The intermediate lattice 130 also includes a plurality of plaquettes 46 that are not labeled as including dead data qubits 122 in the indication, and that are therefore left unchanged in the intermediate lattice 130.

The first reduced plaquettes 132 shown in the example intermediate lattice of FIG. 32A are data qubit 3-gons that each include three data qubits 14D. Each of the data qubit 3-gons 132 is an X-type data qubit 3-gon 134X or a Z-type data qubit 3-gon 134Z. In other examples in which two data qubits 14D are omitted from a plaquette 46, as discussed in further detail below, the resulting first reduced plaquette 132 is a data qubit 2-gon that includes two data qubits 14D. Omitting three of the data qubits 14D from a plaquette 46 results in a data qubit 1-gon that includes one data qubit 14D.

Returning to the example of FIG. 31, the processor 102 is further configured to compute the reduced lattice 140 by excluding the one or more dead auxiliary qubits 124. For each of the plaquettes 46 that includes at least one dead auxiliary qubit 124 of the one or more dead auxiliary qubits 124, computing the reduced lattice includes computing a respective second reduced plaquette 142 that omits the dead auxiliary qubit 124.

The processor 102 is configured to compute the one or more second reduced plaquettes 142 subsequently to the one or more first reduced plaquettes 132 in the example of FIG. 31. In this example, computing the one or more second reduced plaquettes 142 includes omitting the at least one respective dead auxiliary qubit 124 from a first reduced plaquette 132 of the one or more first reduced plaquettes 132. In some examples, respective second reduced plaquettes 142 are also computed from plaquettes 46 that were left unchanged in the computation of the intermediate lattice 130 due to those plaquettes 46 not including any dead data qubits 122.

Figure 32B:
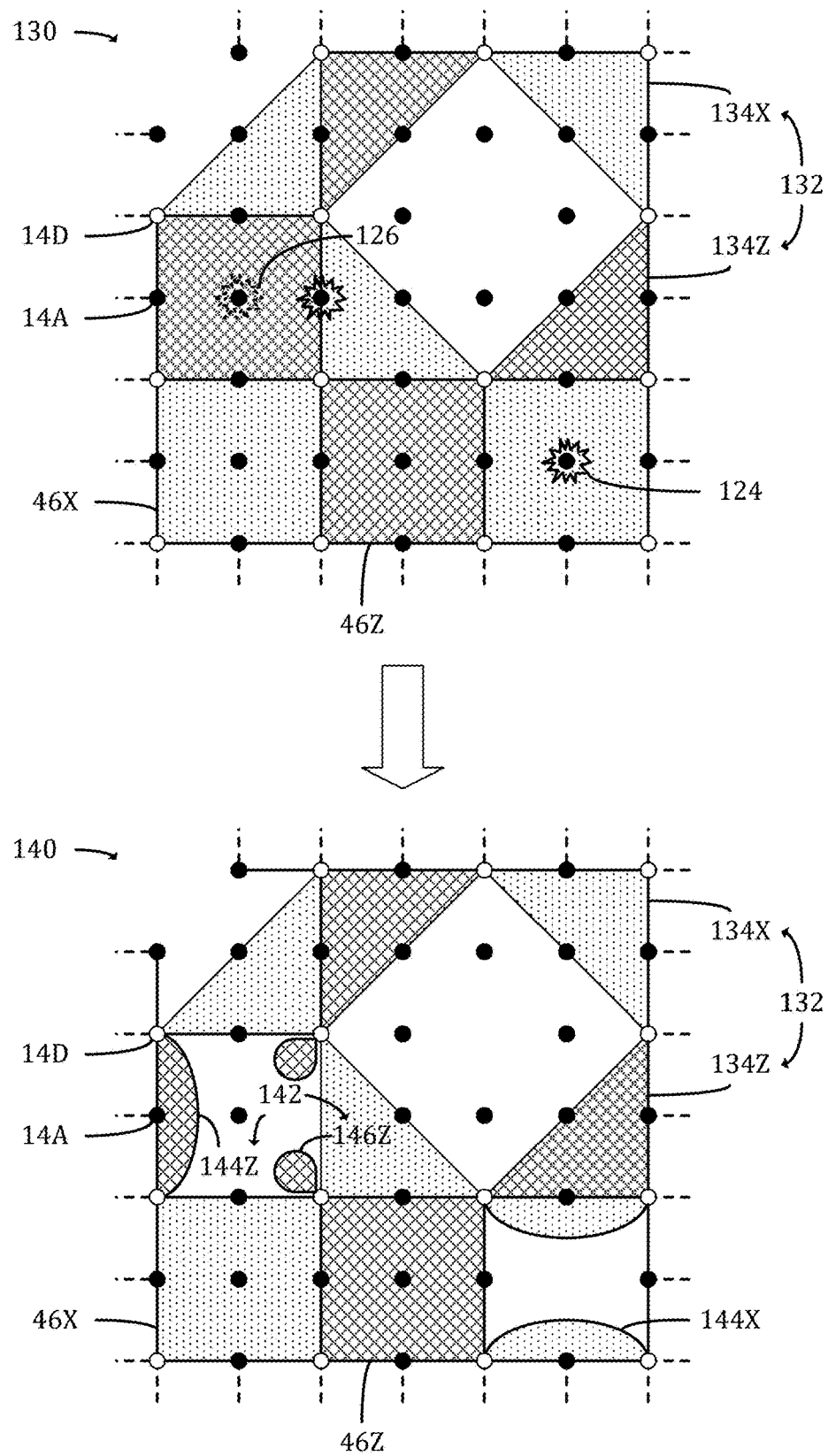
FIG. 32B schematically shows computation of a reduced lattice from the intermediate lattice, according to the example of FIG. 32A.

FIG. 32B schematically shows computation of the reduced lattice 140 from the intermediate lattice 130 of FIG. 32A. In the reduced lattice 140, the dead auxiliary qubits 124 indicated in FIG. 32A have been omitted. Thus, the processor 102 has computed a plurality of second reduced plaquettes 142 included in the reduced lattice 140.

As shown in the reduced lattice of FIG. 32B, computing the one or more second reduced plaquettes 142 may include dividing at least one plaquette 46 into one or more data qubit 2-gons and/or one or more data qubit 1-gons. This division occurs as a result of removal of connections between data qubits 14D when at least one auxiliary qubit 14A is omitted during computation of the reduced lattice 140. A Z-type plaquette 46 is divided into a Z-type data qubit 2-gon 144Z and two Z-type data qubit 1-gons 146Z in the example of FIG. 32B, and another plaquette is divided into two X-type data qubit 2-gons 144X.

As discussed above, the one or more dead data qubits 122 and the one or more dead auxiliary qubits 124 specified by the indication are faulty qubits at which physical malfunctions have occurred. In addition to these faulty qubits, when computing each of the one or more second reduced plaquettes 142, the processor 102 may be further configured to identify one or more auxiliary qubits 14A included in the intermediate lattice 130 as one or more collateral loss auxiliary qubits 126. A collateral loss auxiliary qubit 126 is an auxiliary qubit 14A that is not utilized in a reduced plaquette stabilizer measurement circuit 155 after the dead components have been omitted from the lattice 40. Thus, a collateral loss auxiliary qubit 126 is treated similarly to a dead auxiliary qubit 124 without necessarily being a faulty qubit.

In examples in which at least one collateral loss auxiliary qubit 126 is identified, as shown in FIG. 32B, the processor 102 is further configured to omit each of the one or more collateral loss auxiliary qubits 126 from the second reduced plaquette 142 in which it is located. The one or more collateral loss auxiliary qubits 126 are thereby included among the dead auxiliary qubits 124 with which the processor 102 computes the reduced lattice 140. The example intermediate lattice shown in FIG. 32B includes a collateral loss auxiliary qubit 126 located to the left of a faulty auxiliary qubit 124 and on the edge of a gap in the intermediate lattice 130 left by removal of a dead data qubit 122. This auxiliary qubit 14A is a collateral loss auxiliary qubit 126 due to not being utilized in a Z-type measurement of any of the data qubits 14D included in the first reduced plaquette 132 in which it is located (see the first row of FIG. 15).

FIGS. 33A and 33B schematically show the first reduced plaquettes 132 produced by omitting dead data qubits 122 from a plaquette 46. The plaquette 46 is a Z-type plaquette 46Z in the example of FIGS. 33A and 33B. However, corresponding X-type first reduced plaquettes 132 may be obtained for an X-type plaquette 46X via 90-degree rotation of the plaquettes. FIG. 33A shows a Z-type data qubit 3-gon 134Z, three different Z-type data qubit 2-gons 135Z, 136Z, and 137Z, and a Z-type data qubit 1-gon 138Z that may be formed by removing data qubits 14D from a Z-type plaquette 46Z constructed as a data qubit 4-gon. The Z-type data qubit 2-gons 135Z, 136Z, and 137Z are a vertical data qubit 2-gon, a horizontal data qubit 2-gon, and a diagonal data qubit 2-gon, respectively.

FIG. 33B shows that the three different Z-type data qubit 2-gons 135Z, 136Z, and 137Z and a Z-type data qubit 1-gon 138Z may instead be formed by removing data qubits from a Z-type data qubit 3-gon 134Z. In addition, FIG. 19B shows that the Z-type data qubit 1-gons 138Z may be formed by removing a data qubit 14D from any of the data qubit 2-gons 135Z, 136Z, and 137Z.

FIGS. 33A and 33B further show the formation of collateral loss auxiliary qubits 126 when data qubits 14D are omitted from plaquettes 46. In FIG. 33A, two of the auxiliary qubits 14A become collateral loss auxiliary qubits 126 when the vertical Z-type data qubit 2-gon 137Z is formed, and three of the auxiliary qubits 14A become collateral loss auxiliary qubits 126 when the Z-type data qubit 1-gon 138Z is formed. These collateral losses also occur in the example of FIG. 33B when the same data qubit 2-gon and data qubit 1-gon configurations are formed from the Z-type data qubit 3-gon 134Z instead of a data qubit 4-gon. Removing a data qubit 14D from the vertical Z-type data qubit 2-gon 137Z of FIG. 33B results in the formation of one collateral loss auxiliary qubit 126. In addition, removing a data qubit from the horizontal Z-type data qubit 2-gon 135Z results in the formation of three collateral loss auxiliary qubits 126.

FIG. 33C schematically shows the second reduced plaquettes 142 produced by omitting dead auxiliary qubits 124 from a plaquette 46Z. In the example of FIG. 33C, the plaquette 46Z is Z-type. Corresponding X-type second reduced plaquettes 142 may be obtained via 90-degree rotation of the plaquettes. Omitting the central auxiliary qubit 14A from a Z-type data qubit 4-gon plaquette 46Z forms two Z-type data qubit 2-gons 144Z separated by the omitted dead auxiliary qubit 124. Omitting an edge auxiliary qubit 14D from the Z-type data qubit 4-gon plaquette 46Z produces a Z-type data qubit 2-gon 144Z and two Z-type data qubit 1-gons 146Z, with the central auxiliary qubit 14A becoming a collateral loss auxiliary qubit 126. The Z-type data qubit 2-gons 144Z are vertical data qubit 2-gons in the example of FIG. 33C. Removing both of the edge auxiliary qubits 14A from the Z-type data qubit 4-gon plaquette 46Z results in four Z-type data qubit 1-gons 146Z, with the central auxiliary qubit 14A again becoming a collateral loss auxiliary qubit 126. In the configuration including a Z-type data qubit 2-gon 144Z and two Z-type data qubit 1-gons 146Z, as well as the configuration including four Z-type data qubit 1-gons 146Z, the central auxiliary qubit 14A may alternatively be a faulty auxiliary qubit instead of a collateral loss auxiliary qubit 126.

FIG. 33C further shows the second reduced plaquettes 142 that are produced by omitting auxiliary qubits 14A from first reduced plaquettes 132. In examples in which the central auxiliary qubit 14A and/or the right auxiliary qubit 14A included in the Z-type data qubit 3-gon 134Z shown in FIG. 33C is a dead auxiliary qubit 124, the resulting configuration includes a vertical Z-type data qubit 2-gon 144Z and a Z-type data qubit 1-gon 146Z. In examples in which only one of the central auxiliary qubit 14A and the right auxiliary qubit 14A is a faulty auxiliary qubit, the other is a collateral loss auxiliary qubit 126. FIG. 33C further shows a configuration in which both the left and right auxiliary qubits 14A of the Z-type data qubit 3-gon 134Z are faulty qubits. In such examples, the resulting configuration includes three Z-type data qubit 1-gons 146Z. The central auxiliary qubit 14A in this example may be a faulty auxiliary qubit or a collateral loss auxiliary qubit 126.

FIG. 33C further shows a vertical Z-type data qubit 2-gon 137C that is split into two Z-type data qubit 1-gons 146Z when the central auxiliary qubit 14A is omitted. In addition, FIG. 33C shows a horizontal Z-type data qubit 2-gon 135Z that is split into two Z-type data qubit 1-gons 146Z when any of its auxiliary qubits 14A is a faulty qubit, with all three of the auxiliary qubits 14A becoming dead auxiliary qubits 124. FIG. 33C further shows a diagonal Z-type data qubit 2-gon 136Z that is also converted into two Z-type data qubit 1-gons 146Z when any of its auxiliary qubits 14A is a faulty qubit. All three auxiliary qubits 14A of this diagonal Z-type data qubit 2-gon 136Z also become dead auxiliary qubits 124 in the example of FIG. 33C.

Returning to the example of FIG. 31, subsequently to computing the reduced lattice 140, the processor 102 is further configured to output instructions 150 to implement an error correction code 154 on the reduced lattice. The processor 102 may output these instructions to an error correction module 152 that is also configured to receive a syndrome 156 from the quantum computing device 110. The processor 102 is configured to implement the error correction code 154 by executing a reduced plaquette stabilizer measurement circuit 155. As discussed above, the instructions 150 to implement the error correction code 154 on the reduced lattice 140 may include instructions to implement the measurements of X-type plaquette operators and the Z-type plaquette operators in alternating measurement rounds, as discussed above. The error correction code 154 may be a surface code 154A.

Figure 34A:
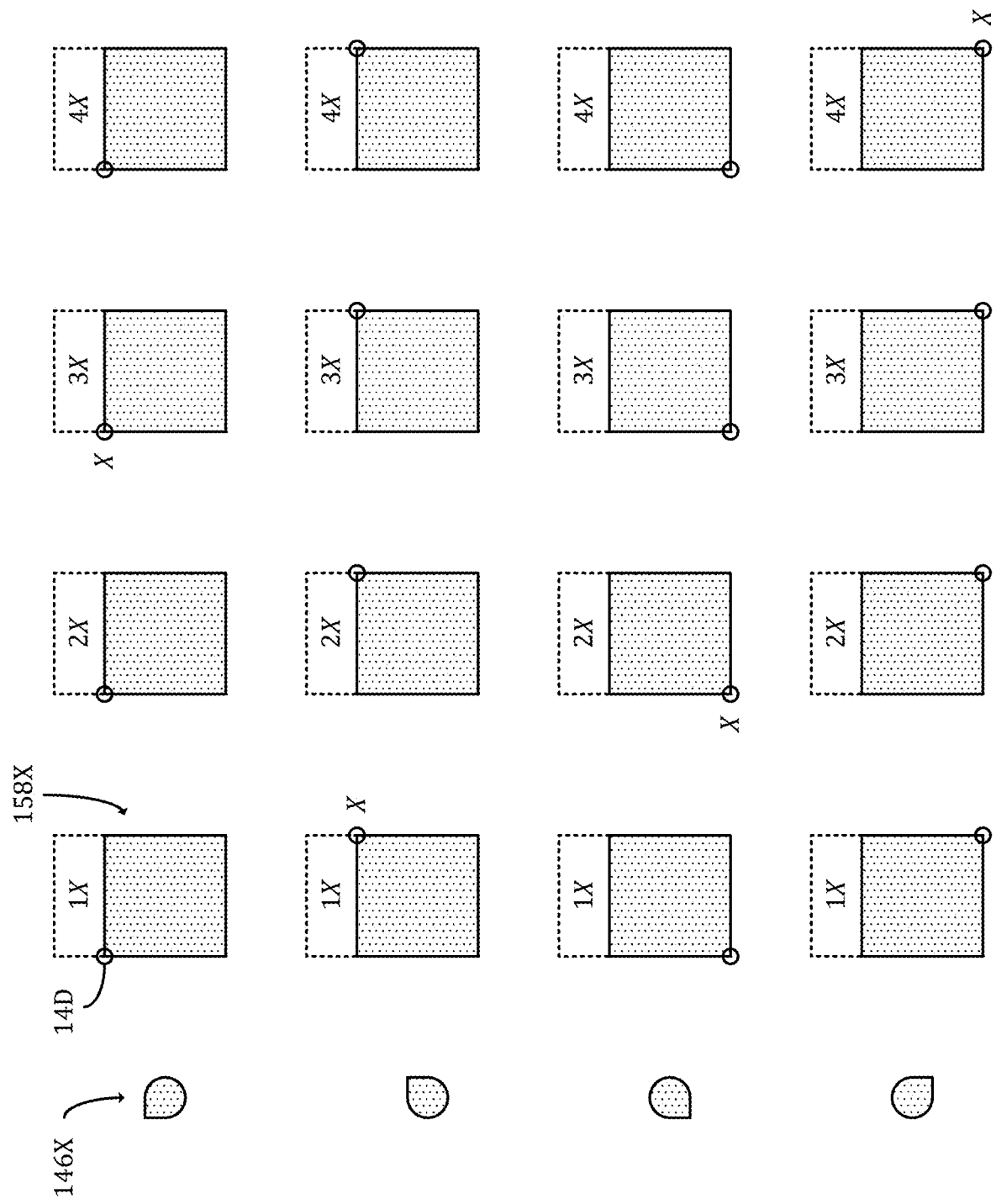
FIGS. 34A and 34B schematically show X-type and Z-type measurement operations performed at X-type data qubit 1-gons and Z-type data qubit 1-gons, respectively, according to the example of FIG. 31.
Figure 34B:
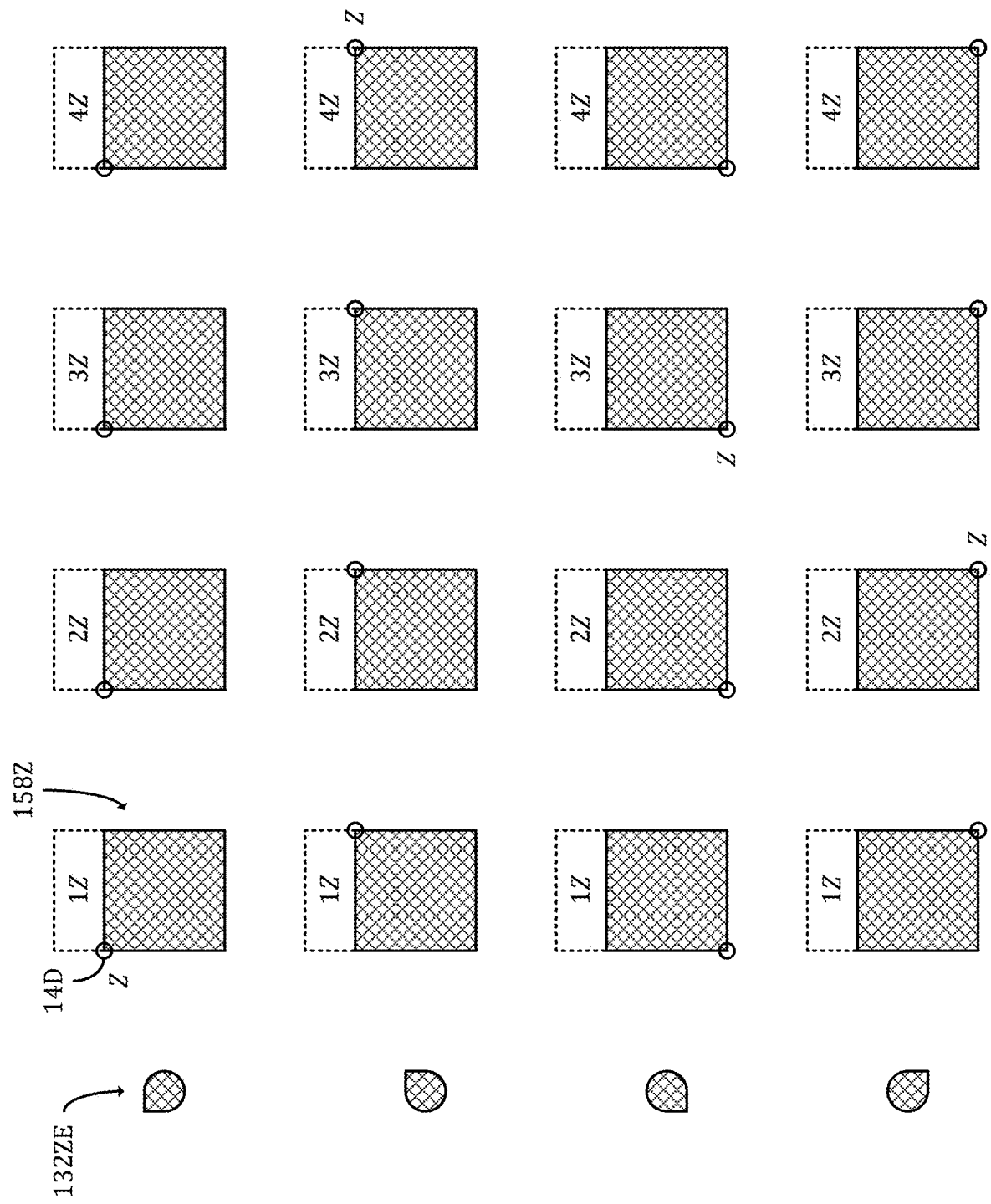

The X-type and Z-type measurement operations performed at data qubit 3-gons and data qubit 2-gons are discussed above with reference to FIGS. 12-15. FIGS. 34A-34B further show the X-type and Z-type measurement operations performed at X-type data qubit 1-gons 146X and Z-type data qubit 1-gons 146Z, respectively. In FIGS. 34A-34B, the X-type measurement operations 158X and the Z-type measurement operations 158Z are shown for each of four different rotations of the corresponding X-type data qubit 1-gons 146X and Z-type data qubit 1-gons 146Z. These rotations correspond to X-type data qubit 1-gons 146X and Z-type data qubit 1-gons 146Z located at the respective corners of a plaquette 46. In addition, for each of the four rotations, four corresponding measurement operations 158X labeled 1X, 2X, 3X, and 4X are shown in FIG. 34A, and four corresponding measurement operations 158Z labeled 1Z, 2Z, 3Z, and 4Z are shown in FIG. 34B. These labels correspond to X-type and Z-type measurement operations performed at steps 1-4 of the surface code 154A when performing an XXXX measurement or a ZZZZ measurement, respectively.

Figure 34C:
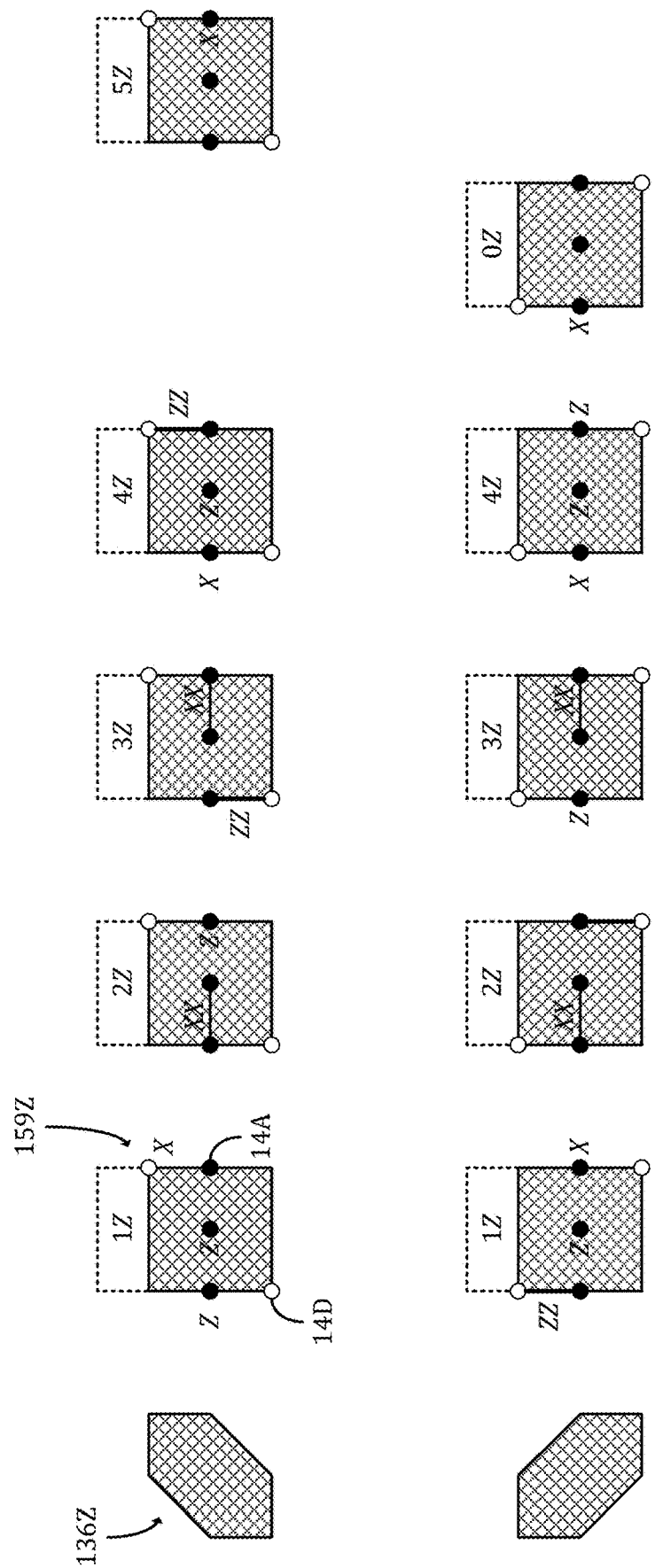
FIG. 34C schematically shows Z-type measurement operations performed at Z-type diagonal data qubit 2-gons, according to the example of FIG. 31.

FIG. 34C schematically shows Z-type measurement operations 159Z performed at Z-type diagonal data qubit 2-gons 136Z. These Z-type measurement operations 159Z are shown for two different rotations of the Z-type diagonal data qubit 2-gons 136Z. For each of these rotations, five corresponding Z-type measurement operations 159Z are shown. The first four of these Z-type measurement operations 159Z correspond to Z-type measurement operations performed at steps 1-4 of the surface code 154A when performing an XXXX measurement or a ZZZZ measurement, respectively. The measurement operations 159Z depicted in FIG. 34C also include a measurement of the first rotation performed at step 5 of the surface code 154A and a measurement of the second rotation performed at step 0 of the surface code 154A. X-type diagonal data qubit 2-gons may be obtained by performing a 90-degree basis rotation of the Z-type diagonal data qubit 2-gons 136Z and an interchange of corresponding operators in the one- and two-qubit projective measurements.

Figure 35A:
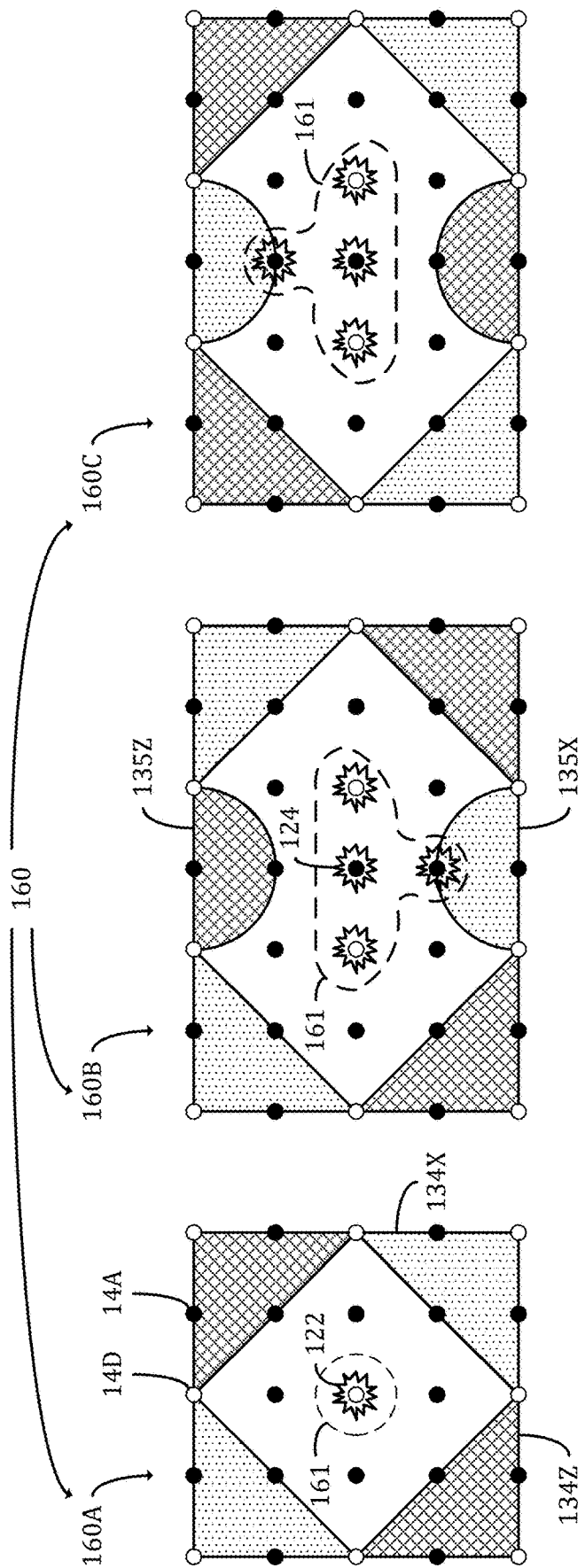
FIGS. 35A through 35C schematically show a plurality of example reduced lattice regions that may be included in the reduced lattice, according to the example of FIG. 31.
Figure 35B:
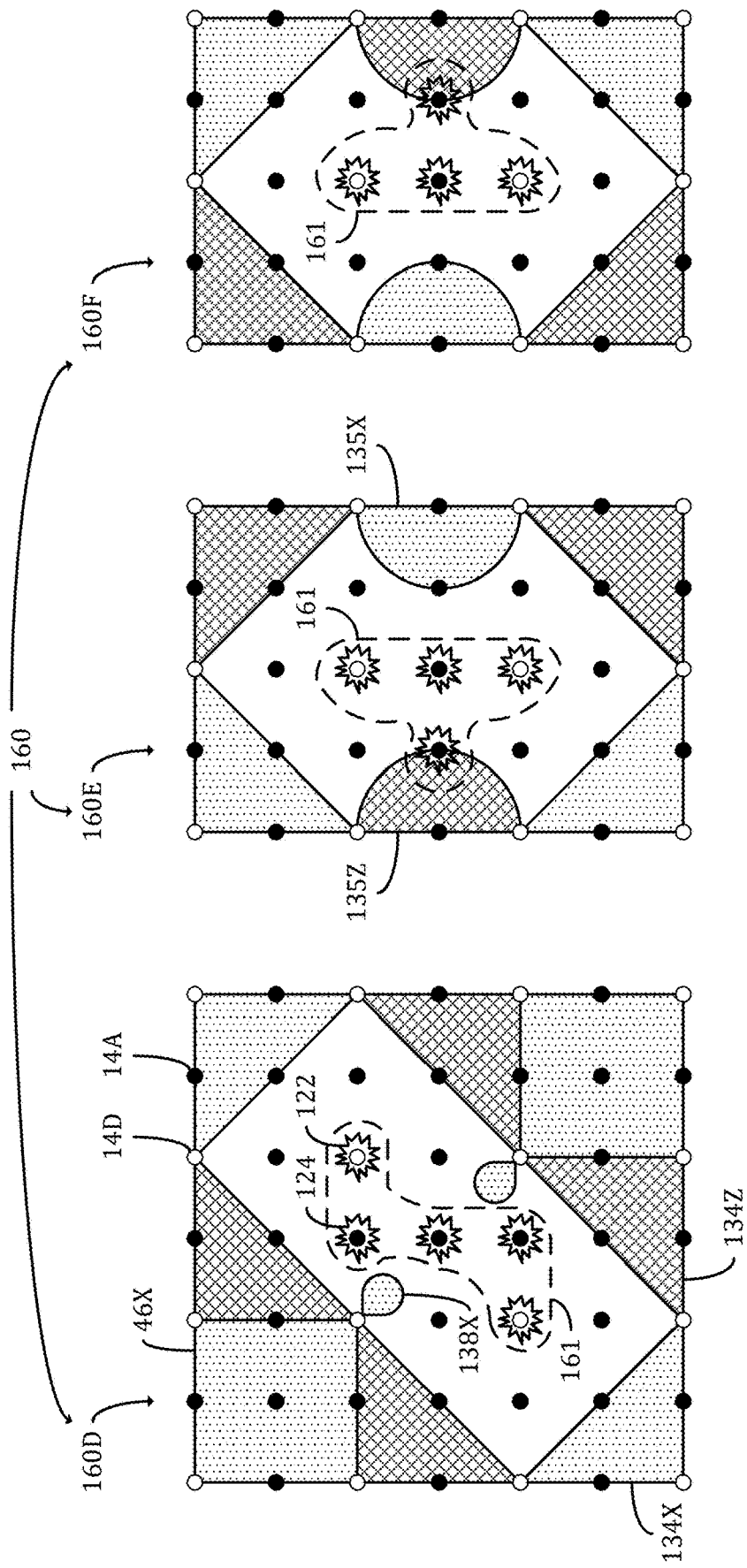
Figure 35C:
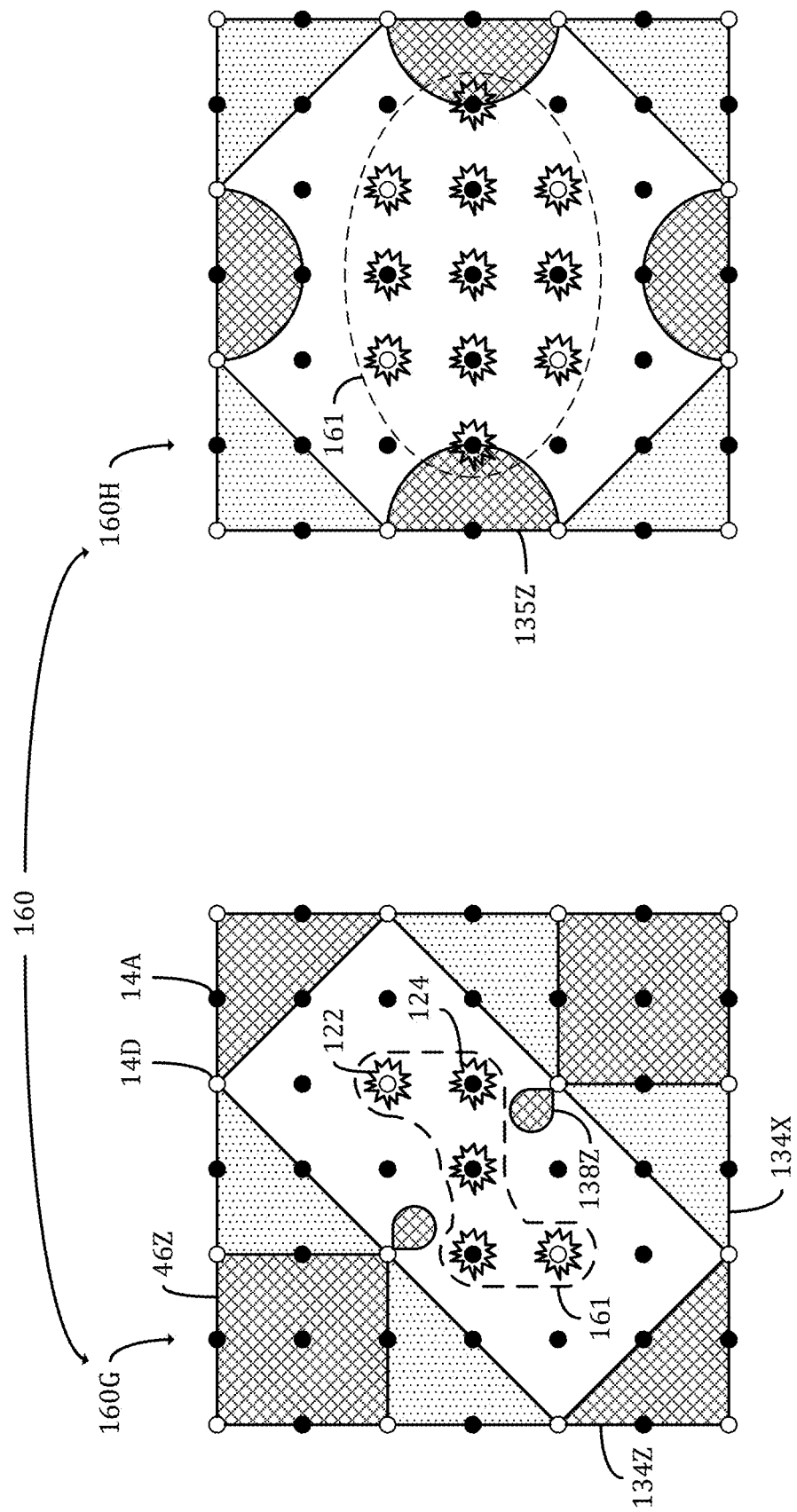

In some examples, when computing the reduced lattice 140, the processor 102 is further configured to compute a plurality of reduced lattice regions 160, as shown in FIGS. 35A-35C. These reduced lattice regions 160 are rectangular portions of the reduced lattice 140 that replace rectangular portions of the lattice 40 that include dead qubits. Implementing the error correction code 154 may include measuring respective superplaquette stabilizers of the reduced lattice regions 160, as discussed in further detail below. FIG. 35A shows three example reduced lattice regions 160A, 160B, and 160C. The example reduced lattice region 160A is formed from two X-type data qubit 3-gons 134X and two Z-type data qubit 3-gons 134Z arranged around a dead qubit region 161 including one dead data qubit 122, such that the data qubit 3-gons form a square. This reduced lattice region 160A is configured to replace a 2×2 square of plaquettes 46 included in the lattice 40.

The example reduced lattice region 160B is formed from two X-type data qubit 3-gons 134X, two Z-type data qubit 3-gons 134Z, an X-type data qubit 2-gon 135X, and a Z-type data qubit 2-gon 135Z. These data qubit 3-gons and 2-gons form a rectangle around a dead qubit region 161 including two dead data qubits 122 and two dead auxiliary qubits 124. The reduced lattice region 160B is configured to replace a 2×3 rectangle of plaquettes 46 in the lattice 40.

The example reduced lattice region 160C is also formed from two X-type data qubit 3-gons 134X, two Z-type data qubit 3-gons 134Z, an X-type data qubit 2-gon 135X, and a Z-type data qubit 2-gon 135Z, but with X-type and Z-type reversed relative to the reduced lattice region 160B. The reduced lattice region 160C is formed around a dead qubit region 161 including two dead data qubits 122 and two dead auxiliary qubits 124. As shown in FIG. 35A, the example reduced lattice region 160C is equivalent to a 180-degree rotation of the reduced lattice region 160B.

FIG. 35B shows example reduced lattice regions 160D, 160E, and 160F. As shown in FIG. 35B, reduced lattice regions 160 may include unmodified plaquettes 46 in some examples. The example reduced lattice region 160D includes two X-type plaquettes 46X, two X-type data qubit 3-gons 134X, four Z-type data qubit 3-gons 134Z, and two X-type data qubit 1-gons 138X. The reduced lattice region 160D is formed around a dead qubit region 161 including two dead data qubits 122 and three dead auxiliary qubits 124 and is configured to replace a 3×3 square of plaquettes 46 in the lattice 40.

The example reduced lattice region 160E shown in FIG. 35B includes two X-type data qubit 3-gons 134X, two Z-type data qubit 3-gons 134Z, an X-type data qubit 2-gon 135X, and a Z-type data qubit 2-gon 135Z. The reduced lattice region 160E is formed around a dead qubit region 161 including two dead data qubits 122 and two dead auxiliary qubits 124 and is configured to replace a 3×2 rectangle of plaquettes 46 in the lattice 40. The reduced lattice region 160E is equivalent to a 90-degree counterclockwise rotation of the reduced lattice region 160B. FIG. 35B further shows an example reduced lattice region 160F that is equivalent to a 90-degree clockwise rotation of the reduced lattice region 160B.

FIG. 35C shows example reduced lattice regions 160G and 160H. The reduced lattice region 160G includes two Z-type plaquettes 46Z, four X-type data qubit 3-gons 134X, two Z-type data qubit 3-gons 134Z, and two Z-type data qubit 1-gons 138Z. These plaquettes, data qubit 3-gons, and data qubit 1-gons surround a dead qubit region 161 including two dead data qubits 122 and three dead auxiliary qubits 124. The reduced lattice region 160G is configured to replace a 3×3 square of plaquettes 46 in the lattice 40.

The reduced lattice region 160H depicted in FIG. 35C includes four X-type data qubit 3-gons 134X and four Z-type data qubit 2-gons 135Z. The reduced lattice region 160H is formed around a dead qubit region 161 including four dead data qubits 122 and seven dead auxiliary qubits 124. The reduced lattice region 160H is configured to replace a 3×3 square of plaquettes 46 in the lattice 40.

As discussed above, the instructions 150 to implement the error correction code 154 may include instructions to implement X-type operators and Z-type operators in alternating measurement rounds. In some examples, the plurality of second reduced plaquettes 142 include two or more non-commuting second reduced plaquettes 142 for which the respective operators configured to be measured at the non-commuting second reduced plaquettes 142 do not commute with each other. In such examples, the reduced plaquette stabilizer measurement circuit 155 includes X-type operators and Z-type operators measured at the non-commuting second reduced plaquettes 142 in alternating measurement rounds. The processor 102 may be configured to group the first reduced plaquettes 132 and the second reduced plaquettes 142 into superplaquettes that are measured in a similar manner to the plaquettes 46 that do not include dead qubits. Each of the superplaquettes is a reduced lattice region 160 over which a corresponding induced superplaquette stabilizer is measured. At each of the measurement rounds, the operators measured at that measurement round are all configured to commute with each other.

When the error correction code 154 is implemented at the reduced lattice 140, the superplaquettes form in the stabilizer group of the error correction code 154. Using the lattice reduction techniques discussed above, the reduction in the code distance of the error correction code 154 due to the presence of dead qubits is minimized relative to the code distance of the error correction code 154 on an all-live-qubit lattice. This reduction in code distance is minimized as a result of avoiding collateral loss of data qubits 14D, thereby making the lattice reduction minimally disruptive to the execution of the error correction code 154.

Figure 36A:
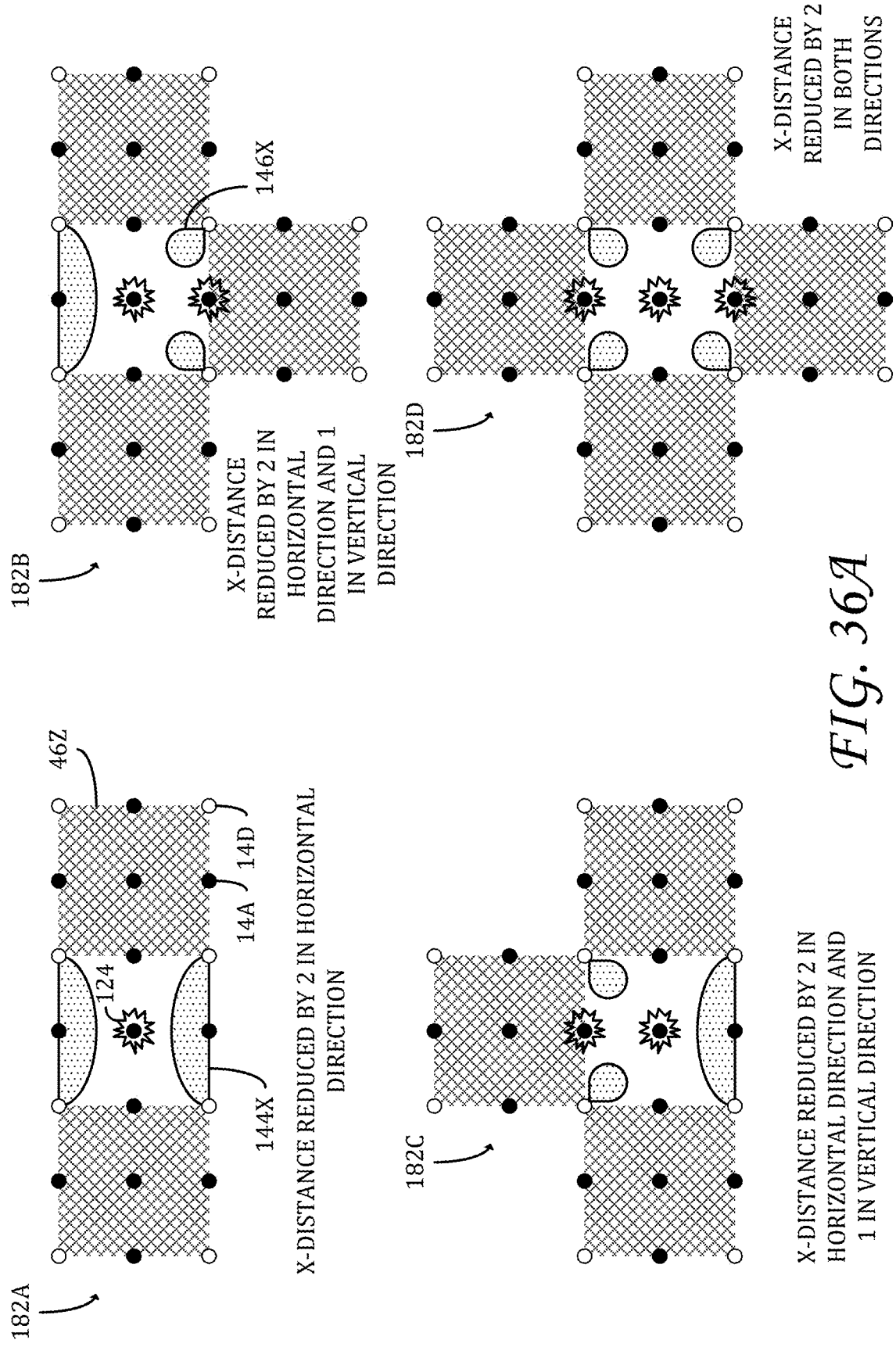
Figure 37A:
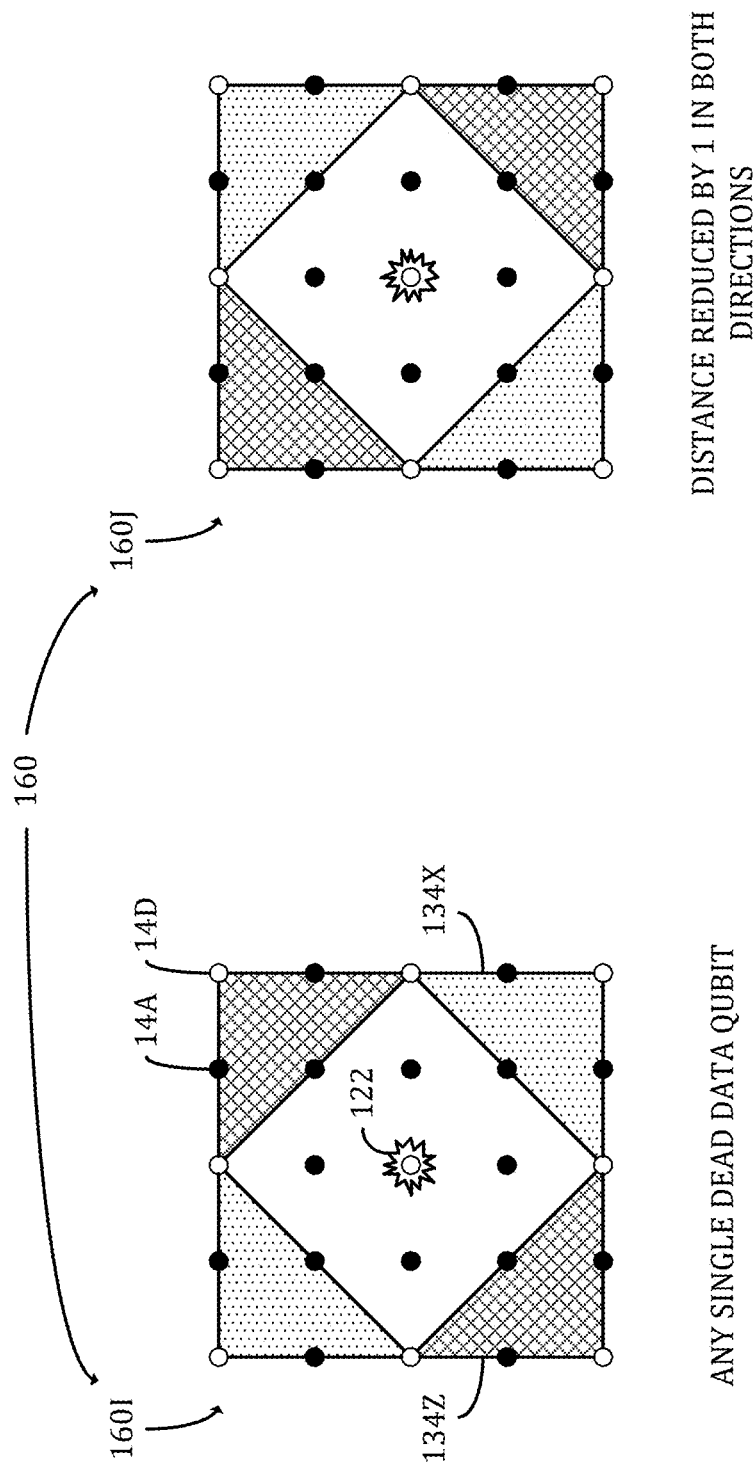
FIGS. 37A through 37C show example reduced lattice regions along with respective code distance reductions associated with those reduced lattice relative to an all-live-qubit lattice, according to the example of FIG. 31.

FIGS. 36A-36B schematically show the effects of example lattice reductions on a code distance of the error correction code 154. FIG. 37A shows an example first portion 182A of a reduced lattice 140. The first portion 182A includes a dead auxiliary qubit 124 located at the center of an X-type plaquette 46X. Thus, the processor 102 is configured to compute two X-type data qubit 2-gons 144X that replace that X-type plaquette 46X in the reduced lattice 140. Such a replacement reduces the code distance by 2 in the horizontal direction relative to an all-live-qubit lattice. In each of the examples shown in FIG. 37A, the code distance is reduced for logical X operators without being reduced for logical Z operators.

FIG. 36A further shows a second portion 182B of the reduced lattice 140 in which an X-type plaquette 46X includes dead auxiliary qubits 124 at its center and along its lower edge. Accordingly, the processor 102 is configured to compute a reduced lattice 140 in which the X-type plaquette 46X is replaced with an X-type data qubit 2-gon 144X and two X-type data qubit 1-gons 146X. In the second reduced lattice portion 182B, the code distance is reduced by 2 in the horizontal direction and by 1 in the vertical direction. FIG. 36A further shows a third portion 182C of the reduced lattice 140 that is equivalent to a 180-degree rotation of the second portion 182B. The third portion 182C also has a code distance that is reduced by 2 in the horizontal direction and by 1 in the vertical direction.

A fourth portion 182D of the reduced lattice 140 shown in FIG. 36A includes dead auxiliary qubits 124 located at the upper edge, center, and lower edge of an X-type plaquette 46X. In the fourth portion 182D, the X-type plaquette 46X has been replaced by four X-type data qubit 1-gons 146X. The code distance is reduced by 2 in both the horizontal direction and the vertical direction in the example of the fourth portion 182D.

FIG. 36B shows additional examples of reduced lattice portions along with their corresponding code distance reductions. In the examples shown in FIG. 36B, the code distances are Z-distances of logical Z operators. In a fifth portion 182E of the reduced lattice 140 shown in FIG. 36B, a dead auxiliary qubit 124 is located at the center of a Z-type plaquette 46Z. The processor 102 is accordingly configured to replace the Z-type plaquette 46Z with two Z-type data qubit 2-gons 144Z, which reduces the code distance by 2 in the vertical direction.

FIG. 36B further shows a sixth portion 182F in which dead auxiliary qubits 124 are located at the center and righthand edge of a Z-type plaquette 46Z. The Z-type plaquette 46Z is accordingly replaced with a Z-type data qubit 2-gon 144Z and two Z-type data qubit 1-gons 146Z. The code distance is reduced by 2 in the vertical direction and 1 in the horizontal direction. FIG. 36B further shows a seventh portion 182G that is equivalent to a 180-degree rotation of the sixth portion 182F. The code distance of the seventh portion 182G is also reduced by 2 in the vertical direction and 1 in the horizontal direction.

FIG. 36B further shows an eighth portion 182H of the reduced lattice 140 in which the Z-type plaquette 46Z has dead auxiliary qubits 124 located in its center and on its lefthand and righthand sides. The processor 102 has replaced the Z-type plaquette 46Z with four Z-type data qubit 1-gons 146Z. In the example of the eighth portion 182H, the code distance is reduced by 2 in both the horizontal direction and the vertical direction.

Figure 37B:
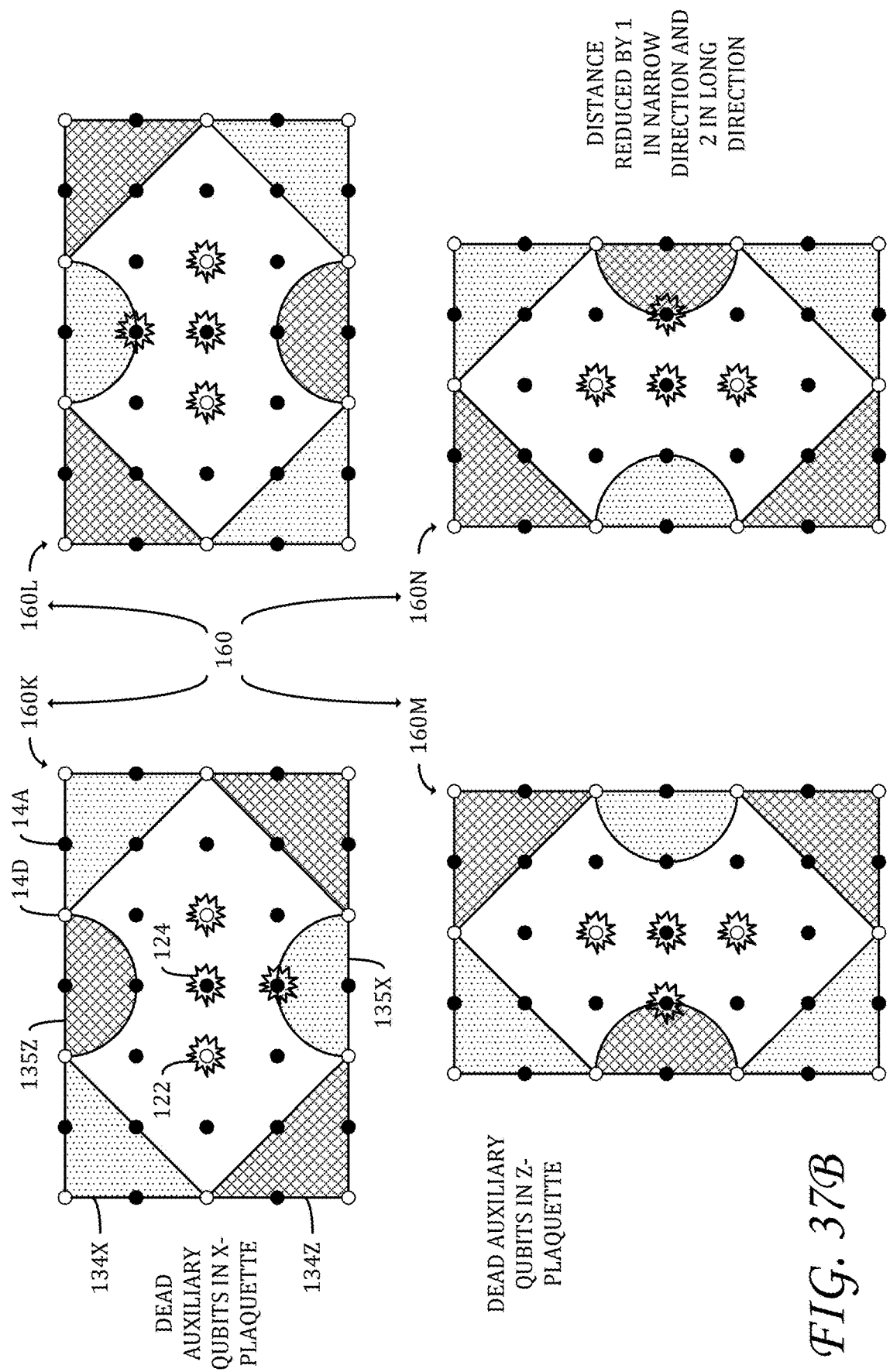
Figure 37C:
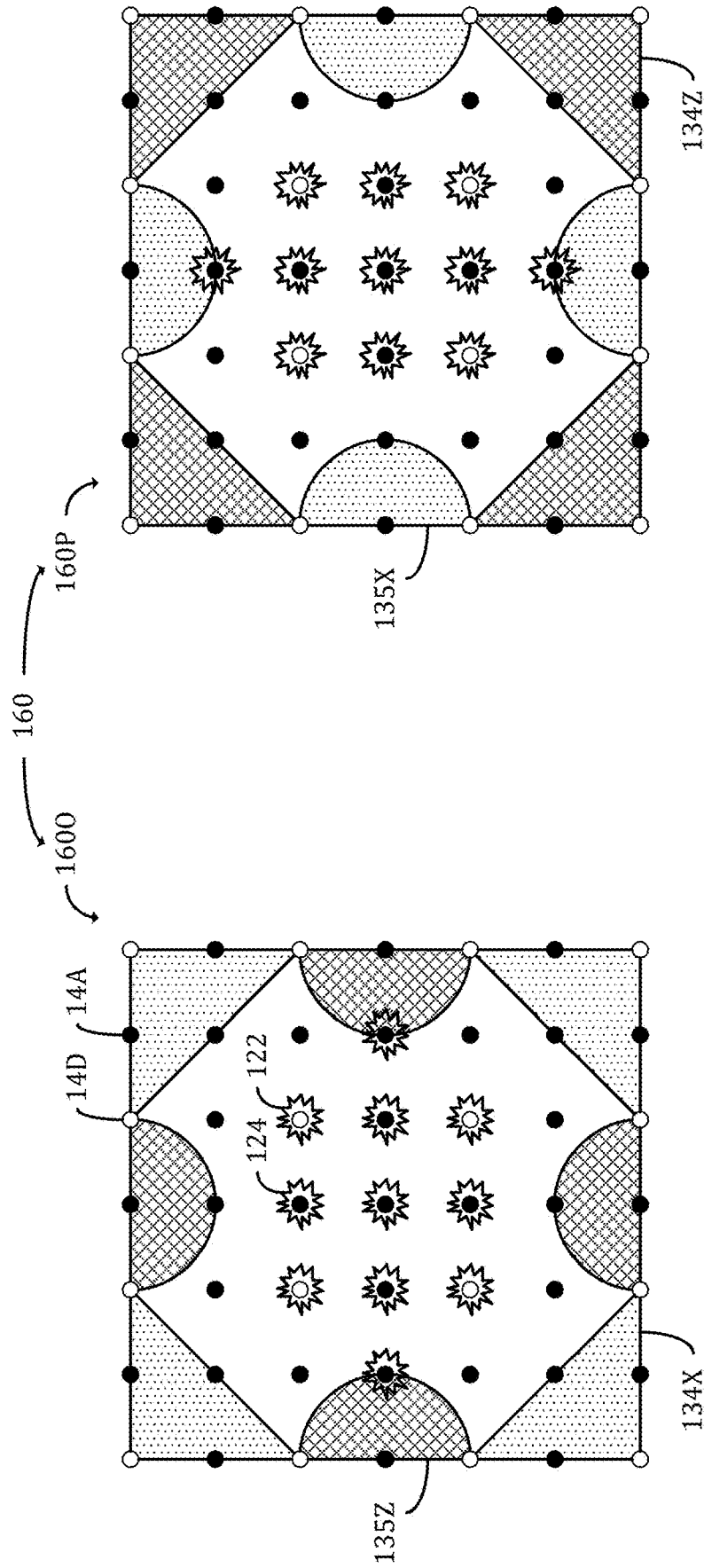

FIGS. 37A-37C show example reduced lattice regions 160, along with the code distance reductions of those reduced lattice regions 160 relative to an all-live-qubit lattice. FIG. 37A shows example reduced lattice regions 160I and 160J that each include one dead data qubit 122 surrounded by two X-type data qubit 3-gons 134X and two Z-type data qubit 3-gons 134Z. The respective code distances of the error correction code 154 for the reduced lattice regions 160I and 160J are both reduced by 1 in the horizontal and vertical directions.

FIG. 37B shows additional example reduced lattice region 160K, 160L, 160M, and 160N. The reduced lattice regions 160K and 160L are both configured to replace 2×3 regions of plaquettes 46 in the lattice 40, and the reduced lattice regions 160M and 160N are configured to replace 3×2 regions. The reduced lattice regions 160K and 160L each include two dead data qubits 122 and two dead auxiliary qubits 124 surrounded by two X-type data qubit 3-gons 134X, two Z-type data qubit 3-gons 134Z, an X-type data qubit 2-gon 135X, and a Z-type data qubit 2-gon 135Z. The code distances associated with the reduced lattice regions 160K and 160L are reduced by 2 in the horizontal direction and 1 in the vertical direction. The reduced lattice regions 160M and 160N also each include two dead data qubits 122 and two dead auxiliary qubits 124 surrounded by two X-type data qubit 3-gons 134X, two Z-type data qubit 3-gons 134Z, an X-type data qubit 2-gon 135X, and a Z-type data qubit 2-gon 135Z. The code distances associated with the reduced lattice regions 160M and 160N are reduced by 1 in the horizontal direction and 2 in the vertical direction. Accordingly, each of the reduced lattice regions 160 shown in FIG. 37B has a code distance reduction of 1 in its narrow direction and 2 in its long direction.

FIG. 37C shows example reduced lattice regions 160O and 160P that are each configured to replace 3×3 regions of plaquettes 46 in the lattice 40. The reduced lattice regions 160O and 160P both include four dead data qubits 122 and seven dead auxiliary qubits 124. The dead qubits in the reduced lattice region 160O are surrounded by four X-type data qubit 3-gons 134X and four Z-type data qubit 2-gons 135Z. The dead qubits in the reduced lattice region 160P are surrounded by four Z-type data qubit 3-gons 134Z and four X-type data qubit 2-gons 135X. The code distances associated with the reduced lattice regions 160O and 160P are both reduced by 2 in the horizontal direction and the vertical direction.

Figure 38:
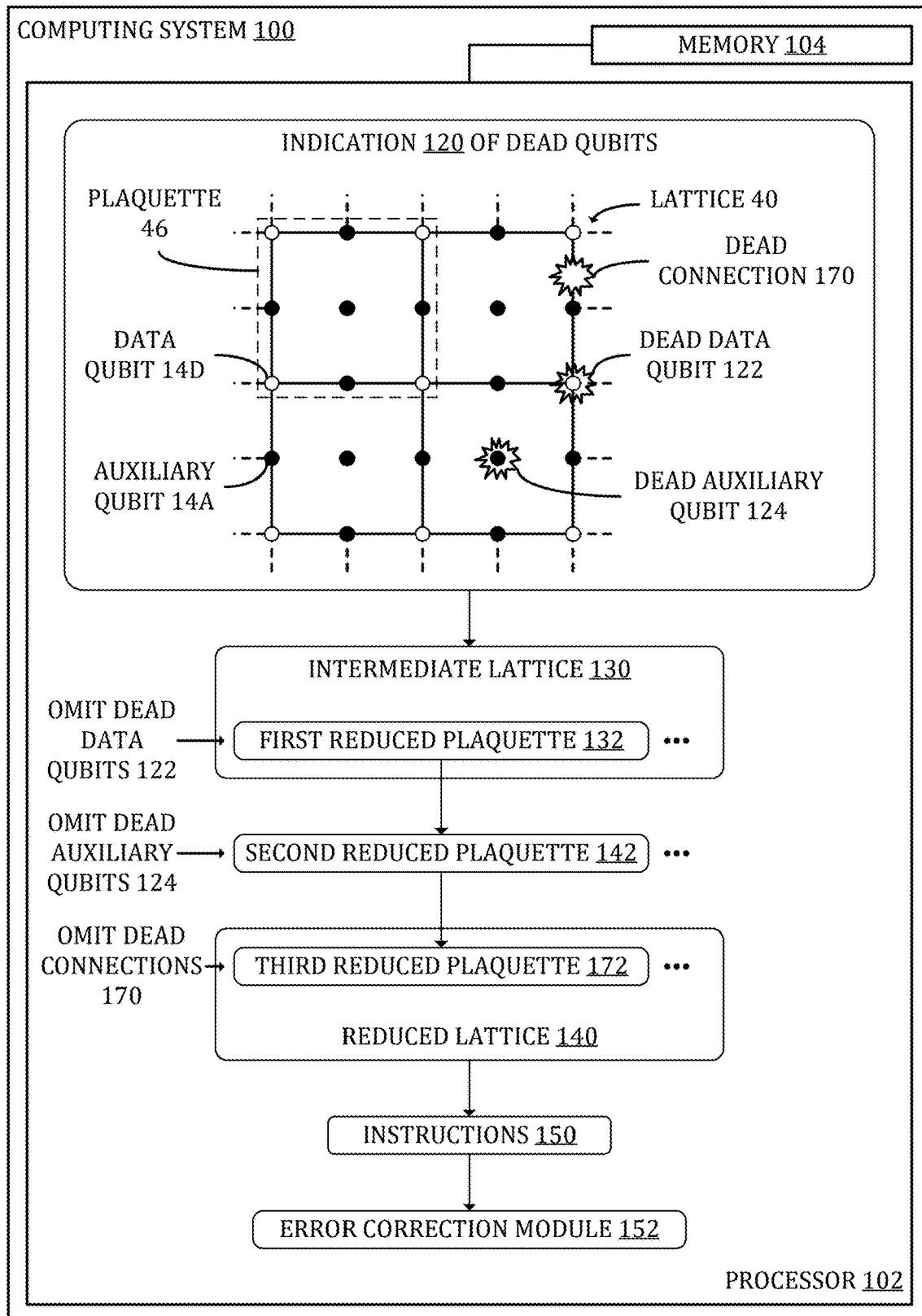
FIG. 38 schematically shows the computing system when the indication of the dead qubits further indicates one or more dead connections between qubits, according to the example of FIG. 31.

FIG. 38 schematically shows the computing system 100 of FIG. 31 in an example in which the lattice 40 includes one or more dead connections 170 between qubits in addition to the one or more dead data qubits 122 and the one or more dead auxiliary qubits 124. In the example of FIG. 38, the indication 120 further specifies the one or more dead connections 170 between one or more respective pairs of qubits. The dead connections 170 are associated with respective pairwise or four-qubit measurements.

As discussed above, the processor 102 is configured to compute the first reduced plaquettes 132 and the second reduced plaquettes 142 based at least in part on the dead data qubits 122 and dead auxiliary qubits 124, respectively, that are specified in the indication 120. During computation of the reduced lattice 140, for each of the plaquettes 46 that includes at least one dead connection 170 of the one or more dead connections 170, the processor 102 is further configured to compute a respective third reduced plaquette 172 that omits the at least one dead connection 170. In some examples, the processor 102 is configured to compute the one or more third reduced plaquettes 172 subsequently to the one or more second reduced plaquettes 142. In such examples, computing the one or more third reduced plaquettes 172 includes omitting the at least one respective dead connection 170 from a second reduced plaquette 142 of the one or more second reduced plaquettes 142. In other examples, the processor 102 may be configured to omit the one or more dead connections 170 from the lattice prior to the one or more dead data qubits 122 or the one or more dead auxiliary qubits 124 when computing the reduced lattice 140.

The indication of the one or more dead connections 170 is also used in some examples when identifying the collateral loss auxiliary qubits 126. In such examples, each of the one or more collateral loss auxiliary qubits 126 is an auxiliary qubit 14A that is not utilized in the reduced plaquette stabilizer measurement circuit 155 after the one or more dead qubits and the one or more dead connections 170 have been omitted from the lattice 140. Thus, in such examples, the processor 102 is configured to account for the one or more dead connections 170 when determining which auxiliary qubits 14A are utilized in the reduced plaquette stabilizer measurement circuit 155.

FIGS. 39A-39C schematically show third reduced plaquettes 172 produced by removing dead connections 170 from plaquettes 46Z, first reduced plaquettes 132, or second reduced plaquettes 134. The third reduced plaquettes 172 shown in FIGS. 39A-39C are Z-type third reduced plaquettes. X-type third reduced plaquettes may be obtained via 90-degree rotation of the Z-type third reduced plaquettes.

FIG. 39A shows two example plaquettes 46Z at which respective dead connections 170 occur along the central row of auxiliary qubits 14A. These dead connections 170 result in the formation of two third reduced plaquettes 172 that are vertical data qubit 2-gons 177Z. In addition, FIG. 39A shows an example plaquette 46Z at which a dead connection 170 is located along an edge. From this plaquette 46Z, the processor 102 is configured to compute two third reduced plaquettes 172 as a data qubit 3-gon 174Z and a data qubit 1-gon 178Z, respectively.

FIG. 39B shows example third reduced plaquettes 172 that are computed when data qubit 3-gons 134Z include dead connections 170. In one of the examples shown in FIG. 39B, the dead connection 170 is located on the vertical edge of the data qubit 3-gon 134Z between the auxiliary qubit 14A and the uppermost data qubit 14D. From this data qubit 3-gon 134Z, the processor 102 is configured to compute two third reduced plaquettes 172 as a horizontal data qubit 2-gon 175Z and a data qubit 1-gon 178Z.

In another example data qubit 3-gon 134Z shown in FIG. 39B, the dead connection 170 is located on the vertical edge of the data qubit 3-gon 134Z between the auxiliary qubit 14A and the lower data qubit 14D. The processor 102 is configured to compute two third reduced plaquettes 172 as a diagonal data qubit 2-gon 176Z and a data qubit 1-gon 178Z.

FIG. 39B also shows three data qubit 3-gons 134Z that the processor 102 is configured to map to a vertical data qubit 2-gon 177Z and a data qubit 1-gon 178Z as the third reduced plaquettes 172. The first of these data qubit 3-gons 134Z has a dead connection 170 between the lefthand and center auxiliary qubits 14A. The second of these data qubit 3-gons 134Z has a dead connection 170 between the righthand and center auxiliary qubits 14A. The third of these data qubit 3-gons 134Z has a dead connection 170 between the righthand auxiliary qubit 14A and the lower righthand data qubit 14D. When the processor 102 computes the third reduced plaquettes 172 for these example data qubit 3-gons 134Z, the processor 102 is further configured to identify the center auxiliary qubit 14A as a collateral loss auxiliary qubit 126.

FIG. 39C shows example third reduced plaquettes 172 that are computed when data qubit 2-gons include dead connections 170. FIG. 39C shows four example diagonal data qubit 2-gons 136Z in which respective dead connections 170 are located between the lefthand auxiliary qubit 14A and the center auxiliary qubit 14A; between an upper data qubit 14D and the lefthand auxiliary qubit 14A; between the righthand auxiliary qubit 14A and the center auxiliary qubit 14A; and between the righthand auxiliary qubit 14A and the lower data qubit 14D. In each of these examples, the processor 102 is configured to compute the third reduced plaquettes 172 as two data qubit 1-gons 178Z. The processor 102 is further configured to identify all three auxiliary qubits 14A in the central row as collateral loss auxiliary qubits 126.

FIG. 39C further shows four example horizontal data qubit 2-gons 135Z in which dead connections 170 are respectively located between the lefthand auxiliary qubit 14A and the center auxiliary qubit 14A; between the lefthand auxiliary qubit 14A and the lefthand data qubit 14D; between the righthand auxiliary qubit 14A and the center auxiliary qubit 14A; and between the righthand auxiliary qubit 14A and the righthand data qubit 14D. These horizontal data qubit 2-gons 135Z are each mapped to two data qubit 1-gons 178Z, and the auxiliary qubits 14A in the central row are identified as collateral loss auxiliary qubits 126.

FIG. 39C further shows two vertical data qubit 2-gons 137Z in which respective dead connections 170 are located between the upper data qubit 14D and the auxiliary qubit 14A and between the lower data qubit 14D and the auxiliary qubit 14A. Both of these vertical data qubit 2-gons 137Z are mapped to a pair of data qubit 1-gons 178Z. In addition, the processor 102 is further configured to identify the auxiliary qubit 14A between the data qubit 1-gons 178Z as a collateral loss auxiliary qubit 126.

Figure 40B:
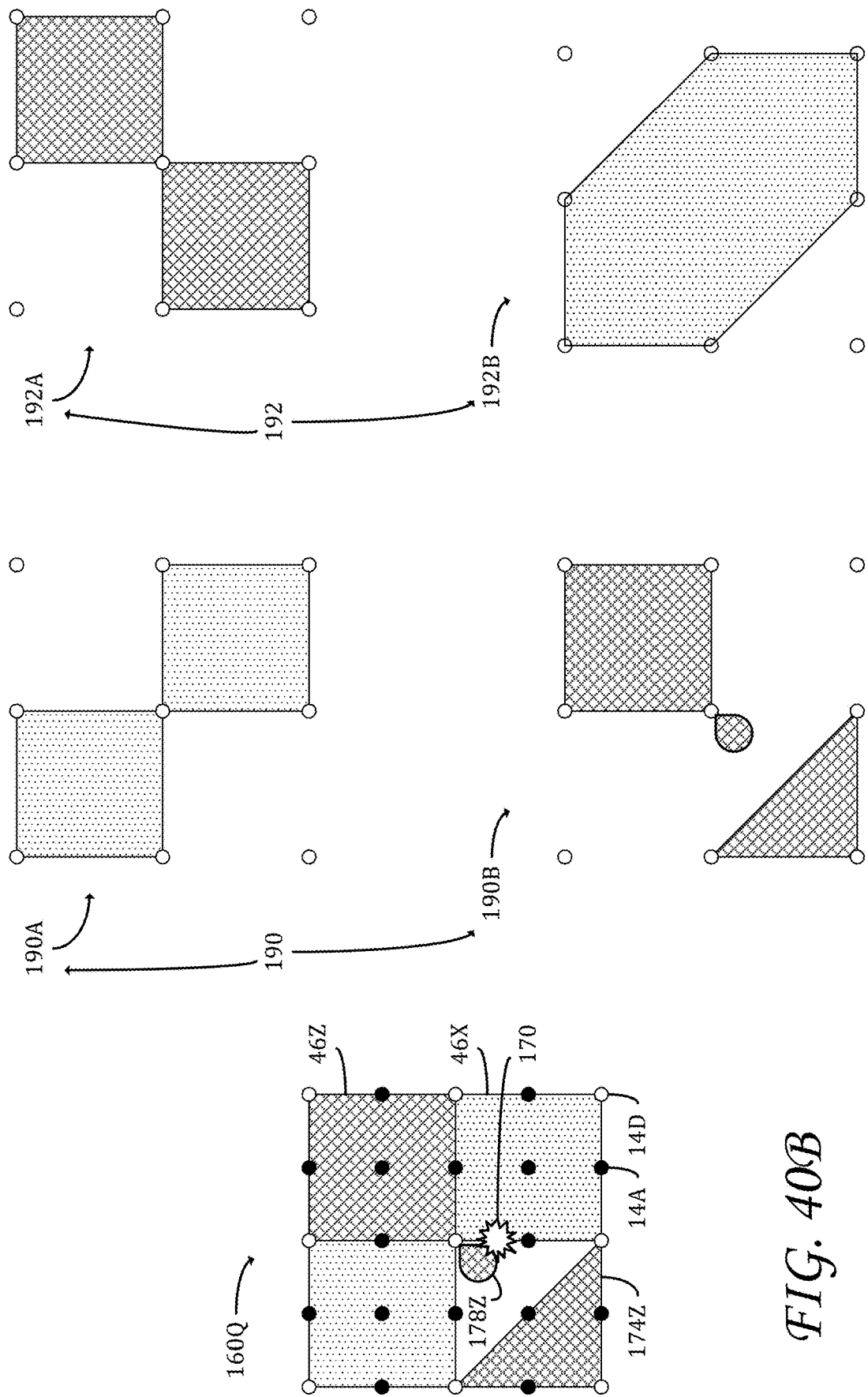

FIGS. 40A-40E schematically show measured stabilizers 190 and induced superplaquette stabilizers 192 for a plurality of example superplaquettes that form at respective reduced lattice regions 160. In FIG. 40A, a measured stabilizer 190A after an X measurement round and a measured stabilizer 190B after a Z measurement round are depicted for the reduced lattice region 160I of FIG. 37A. In addition, FIG. 40A shows an induced superplaquette stabilizer 192A after the X measurement round and an induced superplaquette stabilizer 192B after the Z measurement round.

FIG. 40B shows another example reduced lattice region 160Q and the measured and induced stabilizers associated with that reduced lattice region 160Q. The reduced lattice region 160Q includes a dead connection 170, and accordingly includes two third reduced plaquettes 172 formed as a data qubit 3-gon 174Z and a data qubit 1-gon 178Z. A measured stabilizer 190A after an X measurement round, a measured stabilizer 190B after a Z measurement round, an induced superplaquette stabilizer 192A after the X measurement round, and an induced superplaquette stabilizer 192B after the Z measurement round are shown for the reduced lattice region 160Q.

FIG. 40C schematically shows a measured stabilizer 190A after an X measurement round, a measured stabilizer 190B after a Z measurement round, an induced superplaquette stabilizer 192A after the X measurement round, and an induced superplaquette stabilizer 192B after the Z measurement round for the example reduced lattice region 160A of FIG. 35A.

Figure 40D:
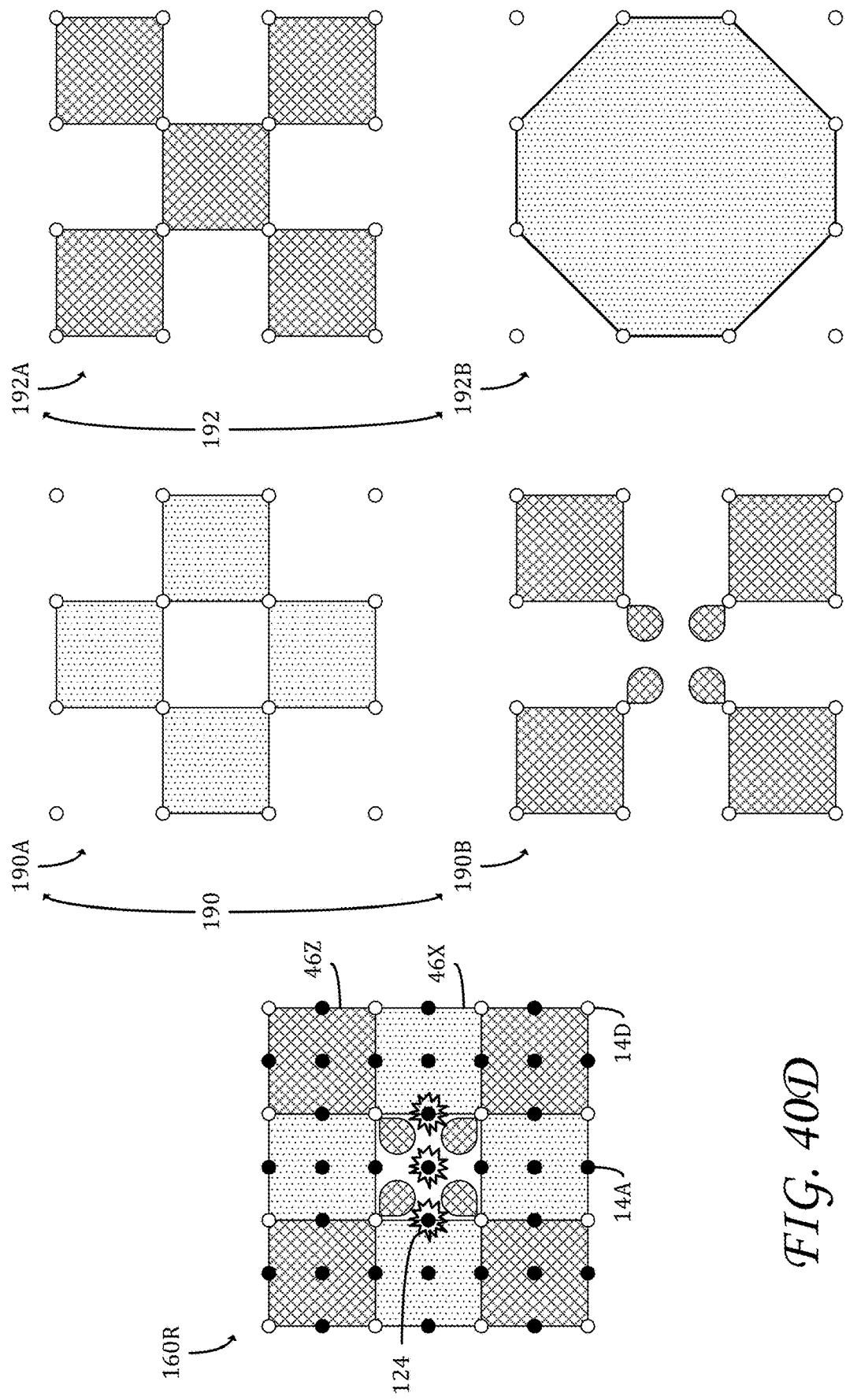

FIG. 40D schematically shows another example reduced lattice region 160R. The reduced lattice region 160R is a 3×3 region in which the auxiliary qubits 14A in the central row of the central plaquette are dead auxiliary qubits 124. FIG. 40D further shows a measured stabilizer 190A after an X measurement round, a measured stabilizer 190B after a Z measurement round, an induced superplaquette stabilizer 192A after the X measurement round, and an induced superplaquette stabilizer 192B after the Z measurement round for the example reduced lattice region 160R.

Figure 40E:
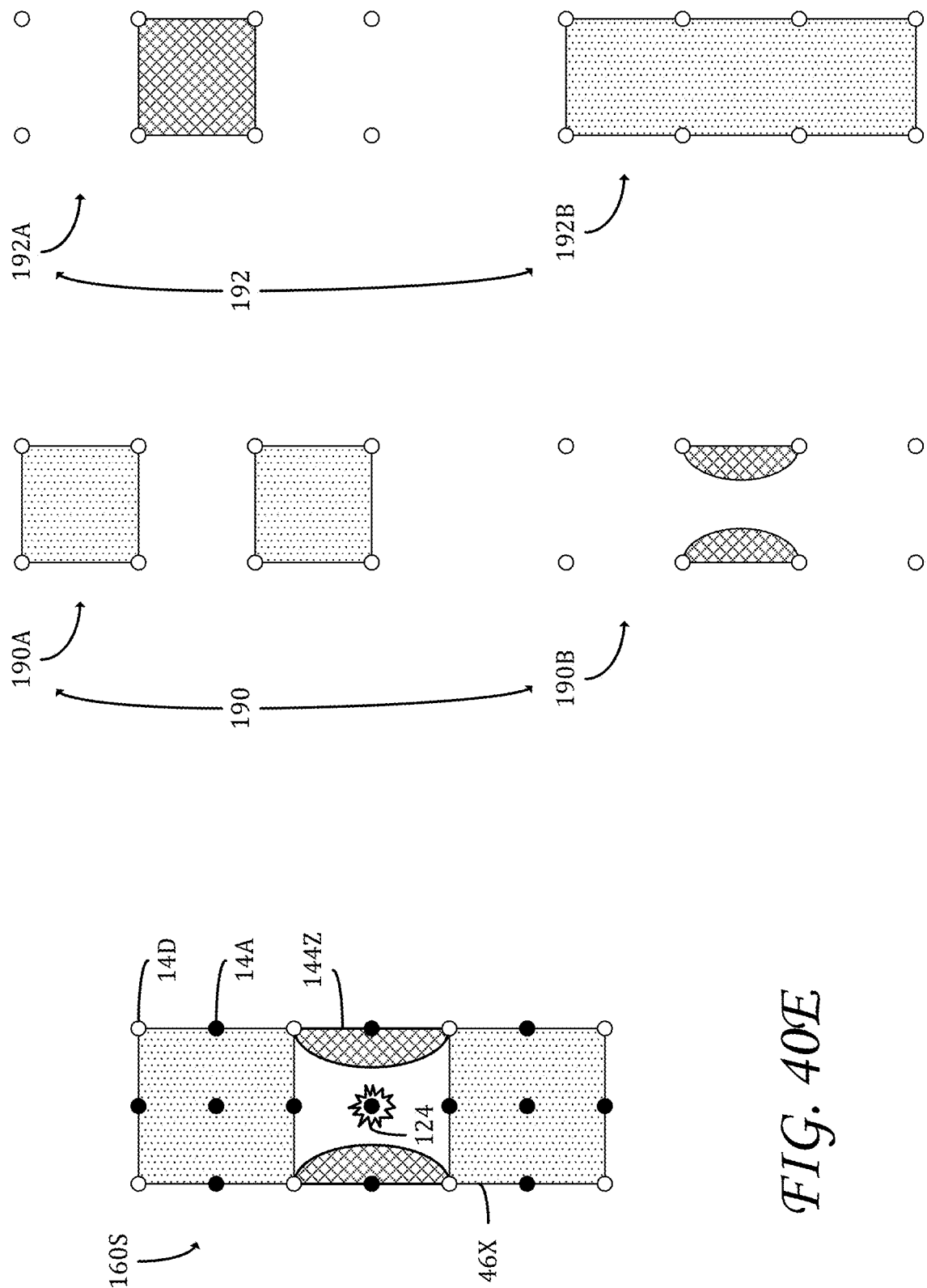

FIG. 40E schematically shows an example 3×1 reduced lattice region 160S in which the central auxiliary qubit 14A of the central plaquette is a dead auxiliary qubit 124. Accordingly, the processor 102 has replaced the central plaquette with two vertical data qubit 2-gons 144Z. FIG. 40E further shows a measured stabilizer 190A after an X measurement round, a measured stabilizer 190B after a Z measurement round, an induced superplaquette stabilizer 192A after the X measurement round, and an induced superplaquette stabilizer 192B after the Z measurement round for the example reduced lattice region 160S.

Figure 41A:
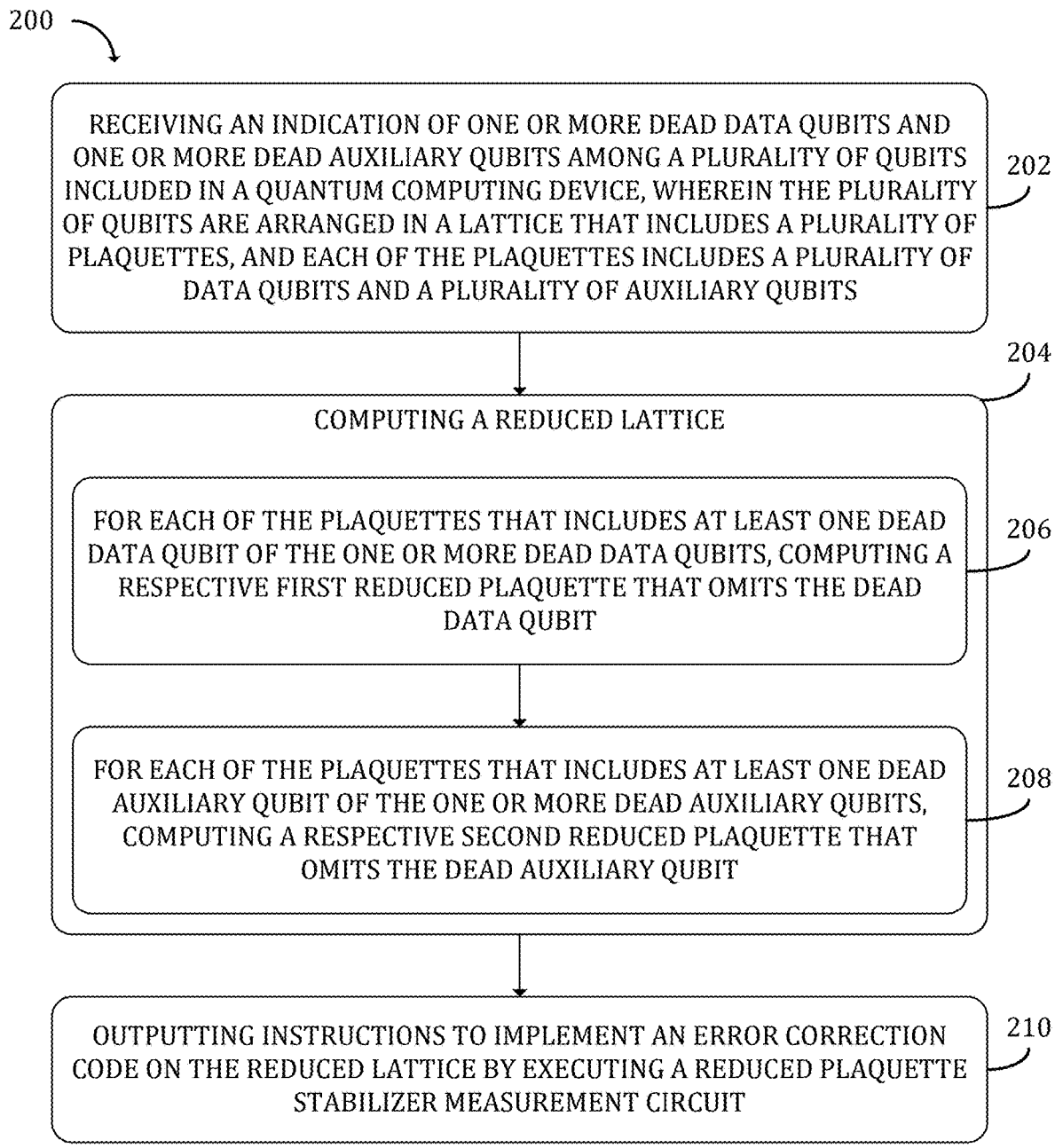
FIG. 41A schematically shows a method for use with a computing system configured to perform quantum error correction, according to the example of FIG. 31.

FIG. 41A schematically shows a method 200 for use with a computing system configured to perform quantum error correction. The computing system includes a classical computing device and may be configured to function as a controller for a quantum computing device. The quantum computing device includes a plurality of qubits that are arranged in a lattice that includes a plurality of plaquettes. Each of the plaquettes includes a plurality of data qubits and a plurality of auxiliary qubits. For example, the plaquettes may be square plaquettes arranged in a rectangular lattice.

At step 202, the method 200 includes receiving an indication of one or more dead data qubits and one or more dead auxiliary qubits among the plurality of qubits included in the quantum computing device. The one or more dead data qubits include one or more faulty data qubits that exhibit physical defects. For example, such dead data qubits may have manufacturing defects or may have become damaged over the course of using the quantum computing device. The one or more auxiliary qubits may also include one or more faulty auxiliary qubits.

At step 204, the method 200 further includes computing a reduced lattice based at least in part on the indication. Computing the reduced lattice at step 204 includes, at step 206, computing a respective first reduced plaquette for each of the plaquettes that includes at least one dead data qubit of the one or more dead data qubits. Each first reduced plaquette omits the corresponding dead data qubit. In addition, at step 208, step 204 further includes computing a respective second reduced plaquette for each of the plaquettes that includes at least one dead auxiliary qubit of the one or more dead auxiliary qubits. Each second reduced plaquette omits the corresponding dead auxiliary qubit.

At step 210, the method 200 further includes outputting instructions to implement an error correction code on the reduced lattice. For example, the error correction code may be a surface code. The instructions may be output to an error correction module that is also configured to receive a syndrome from a quantum computing device. By executing the error correction code with the syndrome as an input, the error correction module is configured to correct errors in a quantum computation performed at the lattice. The error correction code is executed on the reduced lattice by executing a reduced plaquette stabilizer measurement circuit.

In some examples, the plurality of second reduced plaquettes included in the reduced lattice may include two or more non-commuting second reduced plaquettes (e.g., the reduced lattice may include both X-type and Z-type second reduced plaquettes). In such examples, the reduced plaquette stabilizer measurement circuit executed at step 210 includes X-type operators and Z-type operators measured at the non-commuting second reduced plaquettes in alternating measurement rounds. Thus, the reduced plaquette stabilizer measurement circuit is constructed such that the measurements at each measurement round commute with each other.

FIG. 41B shows additional steps that are performed at the computing system in some examples when the method 200 is performed. Step 212 may be performed in examples in which the one or more dead data qubits and the one or more dead auxiliary qubits specified by the indication are faulty qubits at which physical malfunctions have occurred. At step 212, the method 200 further includes identifying one or more collateral loss auxiliary qubits for inclusion among the dead auxiliary qubits with which the reduced lattice is computed. Each of the one or more collateral loss auxiliary qubits is an auxiliary qubit that is not utilized in the reduced plaquette stabilizer measurement circuit after the one or more dead data qubits have been omitted from the lattice. Thus, the one or more collateral loss auxiliary qubits are one or more auxiliary qubits that are geometrically excluded from the lattice.

Step 214 may be performed when computing the one or more second reduced plaquettes at step 208 in examples in which the one or more second reduced plaquettes are computed subsequently to the one or more first reduced plaquettes, as shown in FIG. 41A. At step 214, the step 208 may further include omitting the at least one respective dead auxiliary qubit from a first reduced plaquette of the one or more first reduced plaquettes.

FIG. 41C shows additional steps that may be performed in examples in which the indication further specifies one or more dead connections between one or more respective pairs of qubits included in the lattice. Step 216 is performed when computing the reduced lattice at step 204. At step 216, computing the reduced lattice further includes, for each of the plaquettes that includes at least one dead connection of the one or more dead connections, computing a respective third reduced plaquette that omits the at least one dead connection. In some examples, the third reduced plaquettes are computed subsequently to the second reduced plaquettes. In such examples, step 216 may include, at step 218, omitting the at least one respective dead connection from a second reduced plaquette of the one or more second reduced plaquettes.

At step 220, the method 200 may further include identifying one or more collateral loss auxiliary qubits for inclusion among the dead auxiliary qubits with which the reduced lattice is computed. Each of the one or more collateral loss auxiliary qubits is an auxiliary qubit that is not utilized in the reduced plaquette stabilizer measurement circuit after the one or more dead qubits and the one or more dead connections have been omitted from the lattice. Accordingly, as at step 212, the collateral loss auxiliary qubits are selected, but after accounting for dead connections in the example of FIG. 41C.

Using the devices and methods discussed above, a computing system is configured to modify a quantum error correction procedure to account for dead data qubits and auxiliary qubits. The above approaches allow quantum error correction to be performed for a lattice of qubits included in a quantum computing device even when some of the data qubits and auxiliary qubits are unusable. The lattice may also be adjusted to account for dead connections between qubits. In addition, the above techniques allow such adjustments to be performed in a manner that minimizes the code distance reduction that occurs due to some of the qubits included in the lattice being dead qubits.

8. Classical-Computer Description and Conclusion

Figure 42:
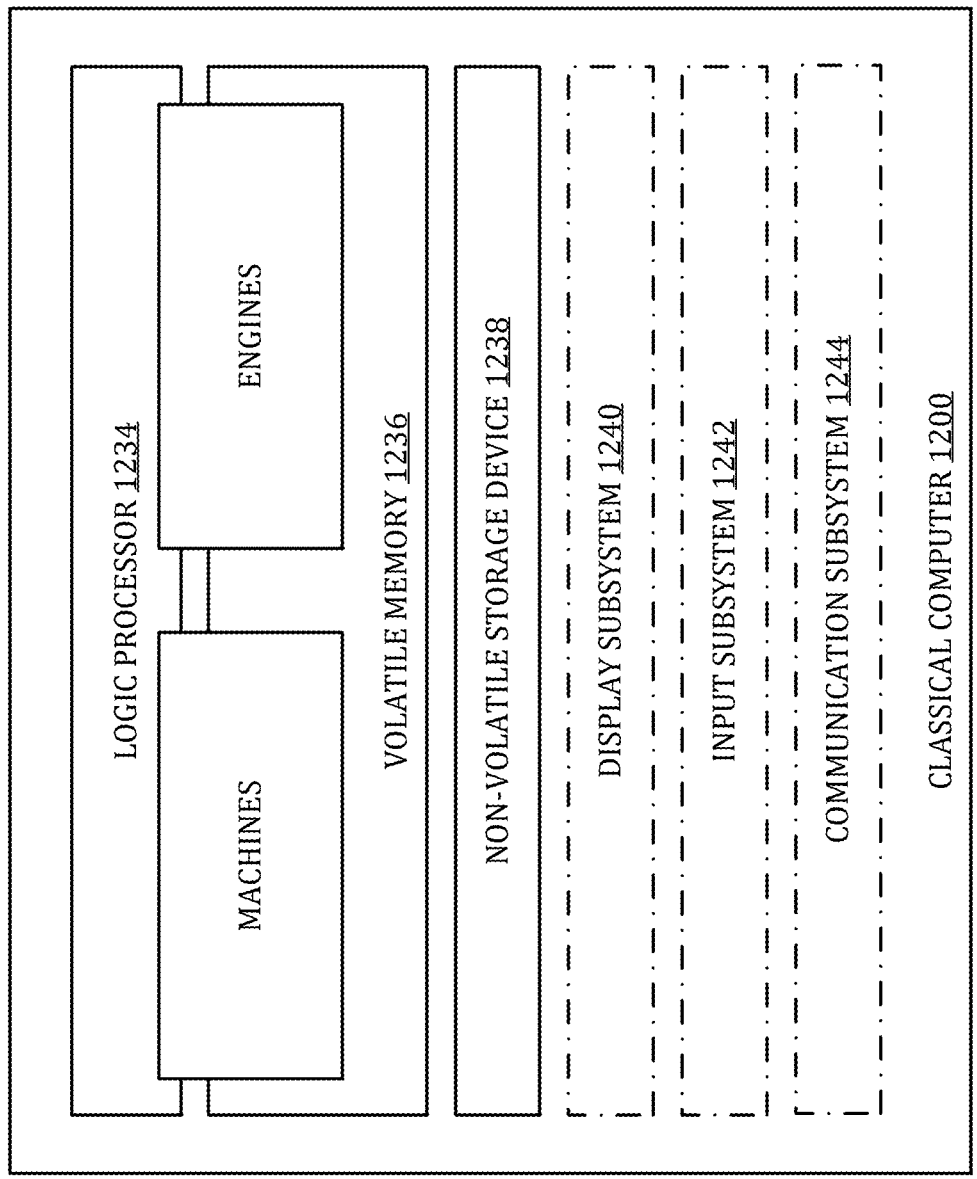
FIG. 42 is a simplified block diagram of an example classical computer, which can be used to implement the methods described herein.

FIG. 42 schematically shows a non-limiting embodiment of a classical computer 1200 that can enact one or more of the methods and processes described above, or be used to implement the classical computers described above. Classical computer 1200 is shown in simplified form. Components of the classical computer 1200 may be instantiated in one or more personal computers, server computers, network computing devices, and/or other computing devices.

Classical computer 1200 includes a logic processor 1234 volatile memory 1236, and a non-volatile storage device 1238. Classical computer 1200 may optionally include a display subsystem 1240, input subsystem 1242, communication subsystem 1244, and/or other components not shown in FIG. 42.

Logic processor 1234 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1234 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1238 includes one or more physical devices configured to hold instructions executable by the logic processors to implement the methods and processes described herein. When such methods and processes are implemented, the state of non-volatile storage device 1238 may be transformed—e.g., to hold different data.

Non-volatile storage device 1238 may include physical devices that are removable and/or built in. Non-volatile storage device 1238 may include optical memory, semiconductor memory, and/or magnetic memory, or other mass storage device technology. Non-volatile storage device 1238 may include nonvolatile, dynamic, static, read/write, read-only, sequential-access, location-addressable, file-addressable, and/or content-addressable devices. It will be appreciated that non-volatile storage device 1238 is configured to hold instructions even when power is cut to the non-volatile storage device 1238.

Volatile memory 1236 may include physical devices that include random access memory. Volatile memory 1236 is typically utilized by logic processor 1234 to temporarily store information during processing of software instructions. It will be appreciated that volatile memory 1236 typically does not continue to store instructions when power is cut to the volatile memory 1236.

Aspects of logic processor 1234, volatile memory 1236, and non-volatile storage device 1238 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms 'module,' 'program,' and 'engine' may be used to describe an aspect of classical computer 1200 typically implemented in software by a processor to perform a particular function using portions of volatile memory, which function involves transformative processing that specially configures the processor to perform the function. Thus, a module, program, or engine may be instantiated via logic processor 1234 executing instructions held by non-volatile storage device 1238, using portions of volatile memory 1236. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms 'module,' 'program,' and 'engine' may encompass individual or groups of executable files, data files, libraries, drivers, scripts, database records, etc.

When included, display subsystem 1240 may be used to present a visual representation of data held by non-volatile storage device 1238. The visual representation may take the form of a graphical user interface (GUI). As the herein described methods and processes change the data held by the non-volatile storage device, and thus transform the state of the non-volatile storage device, the state of display subsystem 1240 may likewise be transformed to visually represent changes in the underlying data. Display subsystem 1240 may include one or more display devices utilizing virtually any type of technology. Such display devices may be combined with logic processor 1234, volatile memory 1236, and/or non-volatile storage device 1238 in a shared enclosure, or such display devices may be peripheral display devices.

When included, input subsystem 1242 may comprise or interface with one or more user-input devices such as a keyboard, mouse, or touch screen. In some embodiments, the input subsystem may comprise or interface with selected natural user input (NUI) componentry.

When included, communication subsystem 1244 may be configured to communicatively couple various computing devices described herein with each other, and with other devices. Communication subsystem 1244 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow classical computer 1200 to send and/or receive messages to and/or from other devices via a network such as the Internet.

The following paragraphs discuss several aspects of the present disclosure. According to one aspect, a computing system is provided, including a processor configured to receive an indication of one or more dead data qubits and one or more dead auxiliary qubits among a plurality of qubits included in a quantum computing device. The plurality of qubits are arranged in a lattice that includes a plurality of plaquettes. Each of the plaquettes includes a plurality of data qubits and a plurality of auxiliary qubits. The one or more processing devices are further configured to compute a reduced lattice at least in part by, for each of the plaquettes that includes at least one dead data qubit of the one or more dead data qubits, computing a respective first reduced plaquette that omits the dead data qubit. For each of the plaquettes that includes at least one dead auxiliary qubit of the one or more dead auxiliary qubits, computing the reduced lattice further includes computing a respective second reduced plaquette that omits the dead auxiliary qubit. The one or more processing devices are further configured to output instructions to implement an error correction code on the reduced lattice by executing a reduced plaquette stabilizer measurement circuit.

According to this aspect, the processor may be configured to compute the one or more second reduced plaquettes subsequently to the one or more first reduced plaquettes. Computing the one or more second reduced plaquettes may include omitting the at least one respective dead auxiliary qubit from a first reduced plaquette of the one or more first reduced plaquettes.

According to this aspect, the one or more dead data qubits and the one or more dead auxiliary qubits specified by the indication may be faulty qubits. The processor may be further configured to identify one or more collateral loss auxiliary qubits for inclusion among the dead auxiliary qubits with which the reduced lattice is computed. Each of the one or more collateral loss auxiliary qubits may be an auxiliary qubit that is not utilized in the reduced plaquette stabilizer measurement circuit after the one or more dead data qubits have been omitted from the lattice.

According to this aspect, the lattice may be a rectangular lattice. Each of the one or more first reduced plaquettes may be a data qubit 3-gon that includes three data qubits, a data qubit 2-gon that includes two data qubits, or a data qubit 1-gon that includes one data qubit.

According to this aspect, computing the one or more second reduced plaquettes may include dividing at least one plaquette into one or more data qubit 2-gons and/or one or more data qubit 1-gons.

According to this aspect, the indication may further specify one or more dead connections between one or more respective pairs of qubits. During computation of the reduced lattice, for each of the plaquettes that includes at least one dead connection of the one or more dead connections, the processor may be further configured to compute a respective third reduced plaquette that omits the at least one dead connection.

According to this aspect, the processor may be configured to compute the one or more third reduced plaquettes subsequently to the one or more second reduced plaquettes. Computing the one or more third reduced plaquettes may include omitting the at least one respective dead connection from a second reduced plaquette of the one or more second reduced plaquettes.

According to this aspect, the processor may be further configured to identify one or more collateral loss auxiliary qubits for inclusion among the dead auxiliary qubits with which the reduced lattice is computed. Each of the one or more collateral loss auxiliary qubits may be an auxiliary qubit that is not utilized in the reduced plaquette stabilizer measurement circuit after the one or more dead qubits and the one or more dead connections have been omitted from the lattice.

According to this aspect, the plurality of second reduced plaquettes may include two or more non-commuting second reduced plaquettes. The reduced plaquette stabilizer measurement circuit may include X-type operators and Z-type operators measured at the non-commuting second reduced plaquettes in alternating measurement rounds.

According to this aspect, the reduced plaquette stabilizer measurement circuit may include a same number of measurement timesteps as a plaquette stabilizer measurement circuit configured to be implemented on an all-live-qubit lattice.

According to this aspect, the error correction code may be a surface code.

According to another aspect of the present disclosure, a method for use with a computing system is provided. The method includes receiving an indication of one or more dead data qubits and one or more dead auxiliary qubits among a plurality of qubits included in a quantum computing device. The plurality of qubits are arranged in a lattice that includes a plurality of plaquettes. Each of the plaquettes includes a plurality of data qubits and a plurality of auxiliary qubits. The method further includes computing a reduced lattice at least in part by, for each of the plaquettes that includes at least one dead data qubit of the one or more dead data qubits, computing a respective first reduced plaquette that omits the dead data qubit. For each of the plaquettes that includes at least one dead auxiliary qubit of the one or more dead auxiliary qubits, the method further includes computing a respective second reduced plaquette that omits the dead auxiliary qubit. The method further includes outputting instructions to implement an error correction code on the reduced lattice by executing a reduced plaquette stabilizer measurement circuit.

According to this aspect, the one or more second reduced plaquettes may be computed subsequently to the one or more first reduced plaquettes. Computing the one or more second reduced plaquettes may include omitting the at least one respective dead auxiliary qubit from a first reduced plaquette of the one or more first reduced plaquettes.

According to this aspect, the one or more dead data qubits and the one or more dead auxiliary qubits specified by the indication may be faulty qubits. The method may further include identifying one or more collateral loss auxiliary qubits for inclusion among the dead auxiliary qubits with which the reduced lattice is computed. Each of the one or more collateral loss auxiliary qubits may be an auxiliary qubit that is not utilized in the reduced plaquette stabilizer measurement circuit after the one or more dead data qubits have been omitted from the lattice.

According to this aspect, the lattice may be a rectangular lattice. Each of the one or more first reduced plaquettes may be a data qubit 3-gon that includes three data qubits, a data qubit 2-gon that includes two data qubits, or a data qubit 1-gon that includes one data qubit.

According to this aspect, computing the one or more second reduced plaquettes may include dividing at least one plaquette into one or more data qubit 2-gons and/or one or more data qubit 1-gons.

According to this aspect, the indication may further specify one or more dead connections between one or more respective pairs of qubits. Computing the reduced lattice may further include, for each of the plaquettes that includes at least one dead connection of the one or more dead connections, computing a respective third reduced plaquette that omits the at least one dead connection.

According to this aspect, the method may further include identifying one or more collateral loss auxiliary qubits for inclusion among the dead auxiliary qubits with which the reduced lattice is computed. Each of the one or more collateral loss auxiliary qubits may be an auxiliary qubit that is not utilized in the reduced plaquette stabilizer measurement circuit after the one or more dead qubits and the one or more dead connections have been omitted from the lattice.

According to this aspect, the plurality of second reduced plaquettes may include two or more non-commuting second reduced plaquettes. The reduced plaquette stabilizer measurement circuit may include X-type operators and Z-type operators measured at the non-commuting second reduced plaquettes in alternating measurement rounds.

According to another aspect of the present disclosure, a computing system is provided, including a processor configured to, for a quantum computing device that includes a plurality of qubits, receive an indication of one or more dead data qubits, one or more dead auxiliary qubits, and one or more dead connections between one or more respective pairs of qubits among the plurality of qubits. The plurality of qubits are arranged in a lattice that includes a plurality of plaquettes. Each of the plaquettes includes a plurality of data qubits and a plurality of auxiliary qubits. The processor is further configured to compute a reduced lattice at least in part by, for each of the plaquettes that includes at least one dead data qubit of the one or more dead data qubits, computing a respective first reduced plaquette that omits the dead data qubit. Subsequently to computing the one or more first reduced plaquettes, for each of the plaquettes that includes at least one dead auxiliary qubit of the one or more dead auxiliary qubits, computing the reduced lattice further includes computing a respective second reduced plaquette that omits the dead auxiliary qubit. For each of the plaquettes that includes at least one dead connection of the one or more dead connections, computing the reduced lattice further includes computing a respective third reduced plaquette that omits the at least one dead connection. Computing the reduced lattice further includes identifying at least one auxiliary qubit as a collateral loss auxiliary qubit. Computing the reduced lattice further includes omitting the at least one collateral loss auxiliary qubit from the third reduced plaquette. The processor is further configured to output instructions to implement an error correction code on the reduced lattice by executing a reduced plaquette stabilizer measurement circuit.

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see. The plots shown in the drawings are theoretical unless otherwise noted.

'And/or' as used herein is defined as the inclusive or $\vee$, as specified by the following truth table:

| A | B | A $\vee$ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. In that spirit, the phrase 'based at least partly on' is intended to remind the reader that the functional and/or conditional logic illustrated herein neither requires nor excludes suitable additional logic, executing in combination with the illustrated logic, to provide additional benefits.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
a processor configured to:
receive an indication of one or more dead data qubits and one or more dead auxiliary qubits among a plurality of qubits included in a quantum computing device, wherein:
the plurality of qubits are arranged in a lattice that includes a plurality of plaquettes; and
each of the plaquettes includes a plurality of data qubits and a plurality of auxiliary qubits;
compute a reduced lattice at least in part by:
for each of the plaquettes that includes at least one dead data qubit of the one or more dead data qubits, computing a respective first reduced plaquette that omits the dead data qubit; and
for each of the plaquettes that includes at least one dead auxiliary qubit of the one or more dead auxiliary qubits, computing a respective second reduced plaquette that omits the dead auxiliary qubit; and
output instructions to implement an error correction code on the reduced lattice by executing a reduced plaquette stabilizer measurement circuit.

2. The computing system of claim 1, wherein:
the processor is configured to compute the one or more second reduced plaquettes subsequently to the one or more first reduced plaquettes; and
computing the one or more second reduced plaquettes includes omitting the at least one respective dead auxiliary qubit from a first reduced plaquette of the one or more first reduced plaquettes.

3. The computing system of claim 2, wherein:
the one or more dead data qubits and the one or more dead auxiliary qubits specified by the indication are faulty qubits;
the processor is further configured to identify one or more collateral loss auxiliary qubits for inclusion among the dead auxiliary qubits with which the reduced lattice is computed; and
each of the one or more collateral loss auxiliary qubits is an auxiliary qubit that is not utilized in the reduced plaquette stabilizer measurement circuit after the one or more dead data qubits have been omitted from the lattice.

4. The computing system of claim 1, wherein:
the lattice is a rectangular lattice; and
each of the one or more first reduced plaquettes is a data qubit 3-gon that includes three data qubits, a data qubit 2-gon that includes two data qubits, or a data qubit 1-gon that includes one data qubit.

5. The computing system of claim 4, wherein computing the one or more second reduced plaquettes includes dividing at least one plaquette into one or more data qubit 2-gons and/or one or more data qubit 1-gons.

6. The computing system of claim 1, wherein:
the indication further specifies one or more dead connections between one or more respective pairs of qubits; and
during computation of the reduced lattice, for each of the plaquettes that includes at least one dead connection of the one or more dead connections, the processor is further configured to compute a respective third reduced plaquette that omits the at least one dead connection.

39

7. The computing system of claim 6, wherein:
the processor is configured to compute the one or more third reduced plaquettes subsequently to the one or more second reduced plaquettes; and
computing the one or more third reduced plaquettes includes omitting the at least one respective dead connection from a second reduced plaquette of the one or more second reduced plaquettes.

8. The computing system of claim 6, wherein:
the processor is further configured to identify one or more collateral loss auxiliary qubits for inclusion among the dead auxiliary qubits with which the reduced lattice is computed; and
each of the one or more collateral loss auxiliary qubits is an auxiliary qubit that is not utilized in the reduced plaquette stabilizer measurement circuit after the one or more dead qubits and the one or more dead connections have been omitted from the lattice.

9. The computing system of claim 1, wherein:
the plurality of second reduced plaquettes include two or more non-commuting second reduced plaquettes; and
the reduced plaquette stabilizer measurement circuit includes X-type operators and Z-type operators measured at the non-commuting second reduced plaquettes in alternating measurement rounds.

10. The computing system of claim 9, wherein the reduced plaquette stabilizer measurement circuit includes a same number of measurement timesteps as a plaquette stabilizer measurement circuit configured to be implemented on an all-live-qubit lattice.

11. The computing system of claim 1, wherein the error correction code is a surface code.

12. A method for use with a computing system, the method comprising:
receiving an indication of one or more dead data qubits and one or more dead auxiliary qubits among a plurality of qubits included in a quantum computing device, wherein:
the plurality of qubits are arranged in a lattice that includes a plurality of plaquettes; and
each of the plaquettes includes a plurality of data qubits and a plurality of auxiliary qubits;
computing a reduced lattice at least in part by:
for each of the plaquettes that includes at least one dead data qubit of the one or more dead data qubits, computing a respective first reduced plaquette that omits the dead data qubit; and
for each of the plaquettes that includes at least one dead auxiliary qubit of the one or more dead auxiliary qubits, computing a respective second reduced plaquette that omits the dead auxiliary qubit; and
outputting instructions to implement an error correction code on the reduced lattice by executing a reduced plaquette stabilizer measurement circuit.

13. The method of claim 12, wherein:
the one or more second reduced plaquettes are computed subsequently to the one or more first reduced plaquettes; and
computing the one or more second reduced plaquettes includes omitting the at least one respective dead auxiliary qubit from a first reduced plaquette of the one or more first reduced plaquettes.

14. The method of claim 13, wherein:
the one or more dead data qubits and the one or more dead auxiliary qubits specified by the indication are faulty qubits;

40 the method further includes identifying one or more collateral loss auxiliary qubits for inclusion among the dead auxiliary qubits with which the reduced lattice is computed; and
each of the one or more collateral loss auxiliary qubits is an auxiliary qubit that is not utilized in the reduced plaquette stabilizer measurement circuit after the one or more dead data qubits have been omitted from the lattice.

15. The method of claim 12, wherein:
the lattice is a rectangular lattice; and
each of the one or more first reduced plaquettes is a data qubit 3-gon that includes three data qubits, a data qubit 2-gon that includes two data qubits, or a data qubit 1-gon that includes one data qubit.

16. The method of claim 15, wherein computing the one or more second reduced plaquettes includes dividing at least one plaquette into one or more data qubit 2-gons and/or one or more data qubit 1-gons.

17. The method of claim 12, wherein:
the indication further specifies one or more dead connections between one or more respective pairs of qubits; and
computing the reduced lattice further includes, for each of the plaquettes that includes at least one dead connection of the one or more dead connections, computing a respective third reduced plaquette that omits the at least one dead connection.

18. The method of claim 17, further comprising identifying one or more collateral loss auxiliary qubits for inclusion among the dead auxiliary qubits with which the reduced lattice is computed, wherein each of the one or more collateral loss auxiliary qubits is an auxiliary qubit that is not utilized in the reduced plaquette stabilizer measurement circuit after the one or more dead qubits and the one or more dead connections have been omitted from the lattice.

19. The method of claim 12, wherein:
the plurality of second reduced plaquettes include two or more non-commuting second reduced plaquettes; and
the reduced plaquette stabilizer measurement circuit includes X-type operators and Z-type operators measured at the non-commuting second reduced plaquettes in alternating measurement rounds.

20. A computing system comprising:
a processor configured to:
for a quantum computing device that includes a plurality of qubits, receive an indication of one or more dead data qubits, one or more dead auxiliary qubits, and one or more dead connections between one or more respective pairs of qubits among the plurality of qubits, wherein:
the plurality of qubits are arranged in a lattice that includes a plurality of plaquettes; and
each of the plaquettes includes a plurality of data qubits and a plurality of auxiliary qubits;
compute a reduced lattice at least in part by:
for each of the plaquettes that includes at least one dead data qubit of the one or more dead data qubits, computing a respective first reduced plaquette that omits the dead data qubit; and
subsequently to computing the one or more first reduced plaquettes, for each of the plaquettes that includes at least one dead auxiliary qubit of the one or more dead auxiliary qubits, computing a respective second reduced plaquette that omits the dead auxiliary qubit;
for each of the plaquettes that includes at least one dead connection of the one or more dead connections, computing a respective third reduced plaquette that omits the at least one dead connection;
identifying at least one auxiliary qubit as a collateral loss auxiliary qubit; and
omitting the at least one collateral loss auxiliary qubit from the third reduced plaquette; and
output instructions to implement an error correction code on the reduced lattice by executing a reduced plaquette stabilizer measurement circuit.

* * * * *